(12) United States Patent
Jones et al.

(10) Patent No.: US 6,584,489 B1
(45) Date of Patent: Jun. 24, 2003

(54) METHOD AND SYSTEM FOR SCHEDULING THE USE OF A COMPUTER SYSTEM RESOURCE USING A RESOURCE PLANNER AND A RESOURCE PROVIDER

(75) Inventors: Michael B. Jones, Redmond, WA (US); Paul J. Leach, Seattle, WA (US); Richard P. Draves, Jr., Seattle, WA (US); Joseph S. Barrera, III, Belmont, CA (US); Steven P. Levi, Redmond, WA (US); Richard F. Rashid, Woodinville, WA (US); Robert P. Fitzgerald, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/038,759

(22) Filed: Mar. 11, 1998

Related U.S. Application Data

(62) Division of application No. 08/569,048, filed on Dec. 7, 1995, now Pat. No. 6,003,061.

(51) Int. Cl.[7] .............................................. G06F 9/00
(52) U.S. Cl. ...................................... 709/104; 709/102
(58) Field of Search ................................ 709/100, 101, 709/102, 103, 104, 106, 310, 311, 315

(56) References Cited

U.S. PATENT DOCUMENTS

| 5,303,369 | A | | 4/1994 | Borcherding et al. | 395/650 |
| 5,388,097 | A | | 2/1995 | Baugher et al. | 370/85.5 |
| 5,581,703 | A | | 12/1996 | Baugher et al. | 395/200.06 |
| 5,586,264 | A | | 12/1996 | Belknap et al. | 395/200.08 |
| 5,640,595 | A | | 6/1997 | Baugher et al. | 395/830 |
| 6,282,561 | B1 | * | 8/2001 | Jones et al. | 709/104 |

FOREIGN PATENT DOCUMENTS

EP    0 415 515 A2    3/1991    ............. G06F/9/46

OTHER PUBLICATIONS

Anderson, David P., "Metascheduling for Continuous Media," *ACM Transactions on Computer Systems*, vol. 11(3): 226–252, 1993.

(List continued on next page.)

*Primary Examiner*—Majid Banankhah
(74) *Attorney, Agent, or Firm*—Leydig, Voit & Mayer, Ltd.

(57) ABSTRACT

A method and system for scheduling the use of a computer system resource using a resource planner and a resource provider are provided. In a preferred embodiment, a resource is scheduled for use by a plurality of consumer entities. Each consumer entity may request the commitment of a share of the resource. The method and system use representations of resource usage policy, present commitments of shares of the resource, and present commitments of specified amounts of the resource over a specified period of time. The method and system first receive a request from a consumer entity for the commitment of a specified share of the resource. In response, the method and system determine whether the specified share of the resource should be committed to the requesting consumer entity. This determination is based on the representations of resource usage policy and present commitments of shares of the resource. If it is determined that the specified share of the resource should be committed to the requesting consumer entity, then the method and system modify the representation of present commitments of shares of the resource to commit the specified share of the resource to the requesting consumer entity. The method and system then schedule the use of the resource by the plurality of consumer entities based on the modified representation of present commitments of shares of the resource.

15 Claims, 45 Drawing Sheets

OTHER PUBLICATIONS

Locke, Douglass C., *Best–Effort Decision Making for Real–Time Scheduling*, Computer Science Department, Carnegie Mellon University, Pittsburgh, PA, 1986, pp. 1–144.

Northcutt et al., *Decentralized Real–Time Scheduling*, Rome Air Development Center, Air Force Systems Command, Griffiss Air Force Base, NY, 1990, pp. A–1, A–3 through A–35, B–1 through B–24, C–1 through C–15, C–17 through C–37, C–41 through C–115, C–117 through C–141, C–143 through C–149, C–151 through C–163.

Northcutt, Duane J., "Mechanism for Reliable Distributed Real–Time Operating Systems: The Alpha Kernel," *Perspectives In Computing*, vol. 16; 1–29, 31–171, 173–217, 219–235, 1987.

Jones, Michael B., "Adaptive Real–Time Resource Management Supporting Modular Composition of Digital Multimedia Services," in *Proceedings of the Fourth International Workshop on Network and Operating System Support for Digital Audio and Video*, IEEE Computer Society, Lancaster, U.K., Nov., 1993, pp. 11–18.

* cited by examiner

METHOD AND SYSTEM FOR SCHEDULING THE USE OF A COMPUTER SYSTEM RESOURCE USING A RESOURCE PLANNER AND A RESOURCE PROVIDER

CROSS-REFEREMCE TO RELATED APPLICATIONS

This application is a divisional of U.S. patent application Ser. No. 08/569,048, filed Dec. 7, 1995, which resulted in U.S. Pat. No. 6,003,061 ("Method and System for Scheduling the Use of a Computer System Resource Using a Resource Planner and a Resource Provider"). This application contains subject matter related to that contained in U.S. patent application Ser. No. 08/568,577, filed Dec. 7, 1995, which resulted in U.S. Pat. No. 5,812,844 ("Method and System for Scheduling the Execution of Threads Using Optional Time-In Specific Scheduling Constraints"), and to that contained in U.S. patent application Ser. No. 08/568,578, filed Dec. 7, 1995, which resulted in U.S. Pat. No. 6,282,561 ("Method and System for Resource Management with Independent Real-Time Applications on a Common Set of Machines").

TECHNICAL FIELD

The invention relates generally to the field of resource scheduling, and, more specifically, to the field of scheduling the use of one or more microprocessors.

BACKGROUND OF THE INVENTION

Conventional resource management strategies for real-time application programs have been unsatisfactory. A "real-time application program" is an application program that must execute in a predictable and timely fashion in order to operate properly. Many current efforts to provide resource management for real-time application programs may only manage a static set of resources. In other words, the resource set may not change during the course of operation of the system. Another limitation of many conventional resource management strategies is that they only accommodate one type of resource (i.e., the resources must be homogeneous). An additional limitation of many conventional resource management strategies is that they rely upon the resource or the application program to determine which application program should be allocated a resource and what quantity of the resource should be allocated. Another conventional approach has been to rely upon human experts to correctly assign priorities to tasks within the system. Unfortunately, such human experts typically cannot accurately assign priorities for a dynamic mix of real-time application programs.

The process of determining which threads to execute at which times is generally termed "scheduling" a computer system's CPU. Conventional CPU scheduling is an example of an unsatisfactory conventional resource management strategy for real-time applications. A typical conventional scheduling strategy is to divide the processor time resource into "time slices" having a uniform length. At the expiration of a time slice, a conventional scheduler identifies a thread to execute during the next time slice. In a balanced allocation scheme, each ready thread receives one time slice in turn, so that the processor time is divided evenly among the ready threads. In a weighted allocation scheme, each thread specifies the percentage of total processor time it is to receive. The scheduler then uses an accounting process to keep track of the number of time slices each thread has received, and assigns the next time slice to the thread that is furthest from having received its specified percentage. Such time slice scheduling has two significant disadvantages. First, such time slice scheduling can be inefficient because it involves frequent reassignments of the processor. On the other hand, even the weighted allocation scheme does not take into account thread processing requirements finer than the overall percentage of processor time that must be used to successfully schedule multiple threads having significant processor time demands.

The way in which scheduling is performed can significantly impact a user's perception of whether individual threads are performing adequately. Modem multimedia applications, for example, often require substantial processor time, and appear to proceed slowly or jerkily if they do not receive it. To ensure adequate performance, conventional multimedia applications and other real-time applications typically secure exclusive use of the processor, to the exclusion of any other existing threads.

A hardware device connected to a computer system typically interacts with the computer system by raising an assigned one of a set of device interrupts. The computer system typically responds to the interrupt by executing an interrupt handling routine corresponding to the raised interrupt. In conventional operating systems, this device interrupt handling is typically performed preemptively by, when a device interrupt occurs, suspending the normal scheduled processing of threads while executing the interrupt processing routine. As a result, time-critical threads can be suspended for significant periods of time when their execution coincides with device interrupts.

SUMMARY OF THE INVENTION

The preferred embodiment of the present invention provides a resource management mechanism for arbitrating resource requests and resource usage among independent real-time application programs that run simultaneously on a single machine or set of machines. The resource management mechanism is adaptable to installation on a distributed system having separate computer systems by installing the mechanism on each of the computer systems within the distributed system. The resource management mechanism utilizes dynamic feedback to adapt to changing resource availability and resource requirements. In addition, the resource management mechanism is extensible so that the resource management employed in the system accounts for new resources that are added to the system and for resources that are removed from the system. The resource management mechanism separates resource management policy from resource management mechanism such that the mechanism is independent of the policy. The mechanism for implementing policy is generalized so as to facilitate any one of a number of different policies. In the preferred embodiment of the present invention, real-time application programs are resource self-aware in that they are aware of what resources they require and what quantity of those resources they require. The applications negotiate with the resource management mechanism to reserve resources and ensure predictable performance. Programs may perform one or more "activities," and reserve resources on behalf of a particular one of their activities. Reserved resources are provided to either that activity or to threads making up the activity as a whole by resource providers.

The present invention further provides a method and system for scheduling the execution of threads using optional time-specific scheduling constraints. In a preferred embodiment, a thread scheduling software facility ("the scheduler") uses a unified urgency indicator to schedule the execution of each of a plurality of threads producing predictable performance in which the threads are scheduled to execute when needed. The scheduler maintains an urgency indicator for each thread based either on a time-specific scheduling constraint that specifies an absolute deadline for a specified quantity of work or on a time-general scheduling constraint that specifies a percentage of processor time to be dedicated to the thread, depending on which type of scheduling constraint is specified for the thread. Modem multimedia applications demand time-specific scheduling for acceptable performance, and their threads are examples of threads for which time-specific scheduling constraints are specified. Modem applications generally also specify time-general scheduling constraints for their threads, which specify the percentage of processor time to be dedicated to the execution of the thread in the long term. Many older legacy programs, on the other hand, specify only time-general scheduling constraints for their threads. If no scheduling constraints are specified for a thread, the facility, or another entity such as the operating system, preferably specifies a default time-general scheduling constraint so that the scheduler permits the thread to execute. The threads scheduled by the scheduler preferably include threads for performing device interrupt handling, so that device interrupt handling is scheduled against the tasks performed by other executing programs.

DETAILED DESCRIPTION OF THE INVENTION

Figure 1:
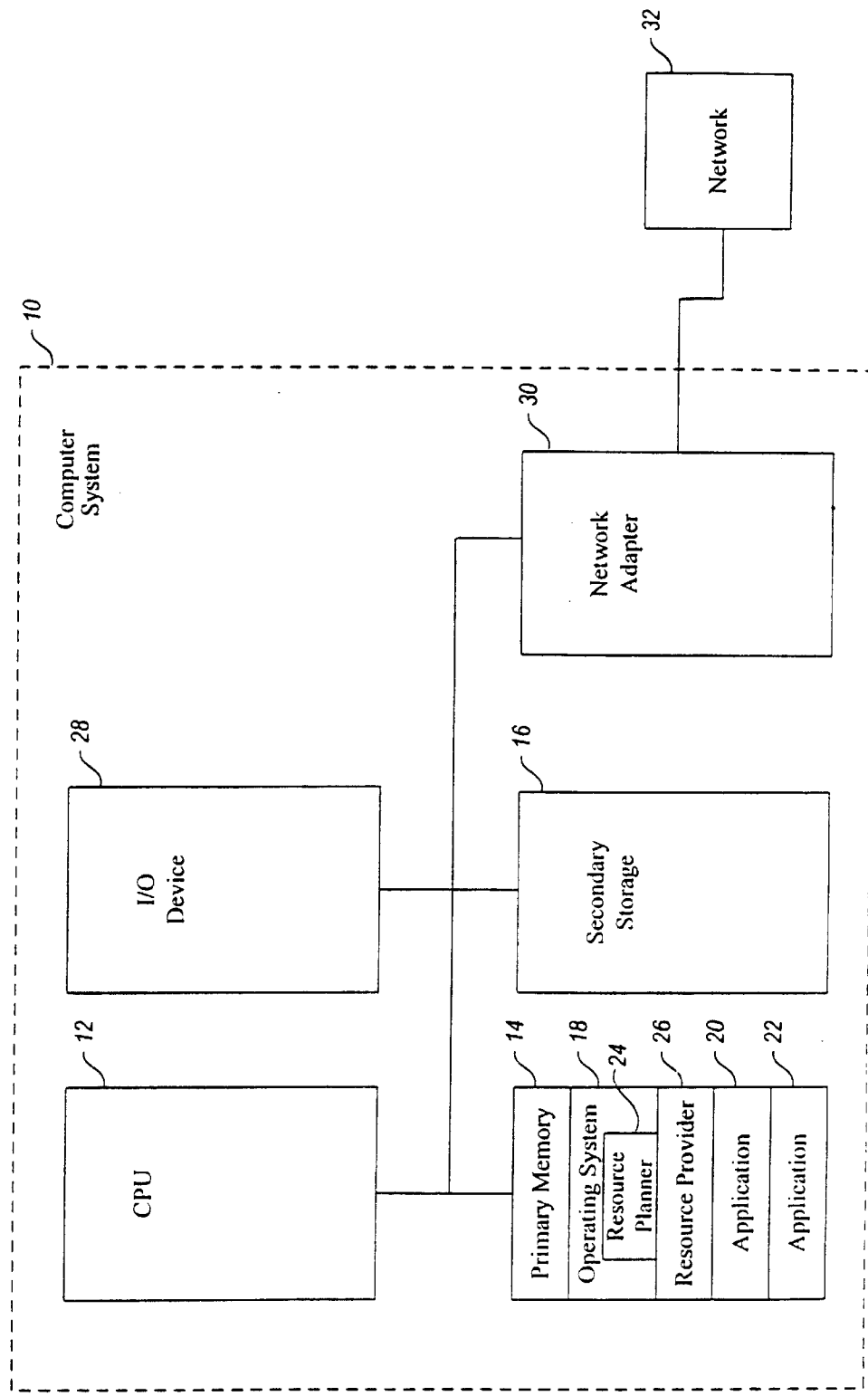
FIG. 1 is a block diagram depicting a computer system that is suitable for practicing the preferred embodiment of the present invention.

The preferred embodiment of the present invention provides a resource management mechanism for arbitrating resource requests and resource usage among independent real-time application programs that run simultaneously on a single machine or set of machines. The resource management mechanism is adaptable to installation on a distributed system having separate computer systems by installing the mechanism on each of the computer systems within the distributed system. The resource management mechanism utilizes dynamic feedback to adapt to changing resource availability and resource requirements. In addition, the resource management mechanism is extensible so that the resource management employed in the system accounts for new resources that are added to the system and for resources that are removed from the system. The resource management mechanism separates resource management policy from resource management mechanism such that the mechanism is independent of the policy. The mechanism for implementing policy is generalized so as to facilitate any one of a number of different policies. In the preferred embodiment of the present invention, real-time application programs are resource self-aware in that they are aware of what resources they require and what quantity of those resources they require. The applications negotiate with the resource management mechanism to reserve resources and ensure predictable performance.

A "resource," as used herein, refers to a limited hardware or software quantity that is provided by a machine. Examples of resources include CPU time, memory capacity, I/O bus bandwidth, network bandwidth, and devices, such as video frame buffers and sound cards. Resources may also encompass higher level software-defined resources that manage other resources. Resources are represented in the preferred embodiment of the present invention by objects that manage the resources. These objects are referred to as "resource providers." As will be described in more detail below, resource providers support operations such as allocating amounts of the resources, performing resource accounting, and providing notifications.

The preferred embodiment of the present invention also employs the notion of an "activity." An "activity" is an abstraction that serves as a generalization of a running program and is the unit of abstraction to which resources are allocated and against which resource usage is charged. Each activity is modeled by an activity object. It should be appreciated that an activity may span thread or process boundaries. Further, an activity may span address spaces and machines and may have multiple threads of control associated with it. Typically, however, each activity is associated with a single distinct executing program or application. For example, the operation of playing a video stream may constitute an activity. Similarly, the operation of recording and transmitting video for a video teleconferencing application may constitute an activity.

A "resource planner" is a program that arbitrates access to the resources of a machine amongst different activities. The resource planner tells an activity what amount of a resource, if any, is reserved for use by the activity. The resource planner is knowledgeable about all local resources. Each local resource is registered with the local resource planner. The resource planner monitors what activities are allowed to gain access to a resource and how much of the resource may be granted to each activity. The resource planner may manage multiple resources, and the resources it manages may be of different types. The set of resources managed by the resource planner may change over time. The resource planner, like other components of the resource management mechanism of the preferred embodiment, is implemented as an object.

In general, an activity seeks to reserve resources that it needs before it uses those resources. An activity reserves resources by requesting the reservation of a number of resources from the resource planner. The activity specifies the quantity of each resource it wishes to reserve. The resource planner applies a policy to the request and determines whether the resources should be granted or not in view of pending reservations. If the resources are granted to the activity, the activity may proceed to use the resources. As discussed below, the reservations are utilized in the scheduling of resources. If the request is not granted, the activity should not use the resource because the activity cannot be assured that adequate amounts of the resource will be available for the activity to run predictably.

If the request is granted, for each resource requested, the resource planner preferably conveys the identity of the activity and the amount of the resource requested to a resource provider for the resource. The resource provider then permits the activity to use the requested amount of the resource. In the case of some resources such as the processor resource which must be used on a per-thread basis, however, the resource provider does so by permitting each of the threads that make up the activity to use a portion of the requested amount of the resource. The preferred embodiment of the present invention further provides a thread scheduling software facility ("the scheduler") as a resource provider for scheduling the use of a resource corresponding to processor time. The scheduler uses a unified urgency indicator to schedule the execution of each of a plurality of threads present in a computer system. While the description that follows is directed to the use of the scheduler to schedule the use of one or more processors, it will be appreciated by those skilled in the art that the scheduler may be straight forwardly adapted to schedule the use of other resources comprising of either hardware or software. The scheduler maintains an urgency indicator for each thread based either on a time-specific scheduling constraint that specifies an absolute deadline for a specified quantity of work or on a time-general scheduling constraint that specifies a percentage of processor time to be dedicated to the thread, depending on which type of scheduling constraint is specified for the thread. Modem multimedia applications demand that particular quantities of work be consistently scheduled in a timely fashion for acceptable performance, and their threads are examples of threads for which time-specific scheduling constraints are specified. Modem applications generally also specify time-general scheduling constraints for their threads, which specify the percentage of processor time to be dedicated to the execution of the thread in the long term. Many older legacy programs, on the other hand, specify only time-general scheduling constraints for their threads. If no scheduling constraints are specified for a thread, the facility, or another entity such as the operating system, preferably specifies a default time general scheduling constraint so that the scheduler permits the thread to execute. The threads scheduled by the scheduler preferably include threads for performing device interrupt handling, so that device interrupt handling is scheduled against the tasks performed by other executing programs.

The indications of urgency used by the scheduler to prioritize the execution of threads are time-sensitive, and reflect the importance of executing a thread at a particular time rather than solely the overall importance of a thread. The scheduler preferably utilizes "restart times" as such indications of urgency. Restart times represent urgency in a time-sensitive way by measuring the time at which a thread needs to begin exclusive execution in order to satisfy a deadline specified for the thread. Given the likelihood that a particular thread will not be allowed to execute exclusively, a thread generally must begin execution substantially before its restart time in order to successfully complete its scheduling constraints. Restart times, however, do reflect the relative priority, or time-sensitive urgency, of a number of threads—the thread with the earliest restart time is the most urgent thread, the thread with the second earliest restart time is the second most urgent thread, etc. The scheduler's use of restart times as indications of urgency is consistent with a minimum laxity first approach, in which threads with the minimum scheduling flexibility are scheduled first. The indications of urgency used by the scheduler preferably also include an indication of criticality. If a thread is critical, it is more urgent than all non-critical threads. If two threads are both critical, the thread with the earlier restart time is more urgent. Criticality is generally used by threads to identify situations in which the degradation of their performance would be unacceptable.

Instead of allocating processor time in fixed-length time slices, the scheduler preferably utilizes custom timer interrupts to assign the processor to a thread for a period of time tailored to reduce the urgency of that thread to slightly below the urgency of the next most urgent thread, or until a more urgent thread becomes ready. This aspect of the invention minimizes the processor time spent scheduling the processor, or "scheduling latency," as the facility may efficiently allocate the processor to a thread for the appropriate amount of time without having to interrupt the thread to reevaluate the schedule.

The scheduler further supports the inheritance of urgency from threads for which a service is being performed (client threads) by threads that are performing that service (server threads). Server threads can include those threads invoked by local are a network remote procedure calls and those threads utilized to process device interrupts. Such inheritance may be applied in a transitive manner, such that a first thread inherits urgency from a second thread via a third thread. A thread may also inherit the urgencies of several other threads. Such inheritance has several important advantages. First, the scheduling result of such inheritance is equitable, in that all work done by or on behalf of the same thread is scheduled with the same urgency. Second, such inheritance obviates the need to specify urgencies for dedicated server threads, as such threads will always inherit the varying urgencies of their clients.

Further, in order to more quickly execute a relatively urgent thread that needs to use a resource, such as a mutex synchronization object, being used by a less urgent thread, the scheduler permits the less urgent thread to inherit the urgency of the more urgent thread until the less urgent thread releases the resource. This permits the thread that has inherited the urgency of the more urgent thread to run to the exclusion of more of the ready threads until it releases the resource, at which time the thread that has inherited the urgency of the more urgent thread loses the urgency of the more urgent thread, the more urgent thread becomes ready, and the more urgent thread replaces the less urgent thread as the new running thread.

Further, when operating in computer systems having more than one processor, the scheduler is preferably able to schedule the execution of threads on as many of the processors as desired.

FIG. 1 is a block diagram depicting a computer system 10 that is suitable for practicing the preferred embodiment of the present invention. The computer system 10 includes a central processing unit (CPU) 12 that has access to a primary memory 14 and a secondary storage 16. The primary memory 14 holds a copy of an operating system 18 that is well adapted for running real-time application programs 20 and 22. The operating system 18 provides an object-oriented environment and supports the Microsoft OLE 2.01 protocol. The operating system 18 also includes support for creating a resource planner 24. The primary memory 14 additionally holds a number of resource providers 26 corresponding to the local resources of the computer system 10. The computer system 10 may further include an input/output (I/O) device 28 and a network adapter 30 that connects the computer system 10 with a computer network 32.

Although FIG. 1 depicts a single processor computer system for practicing the preferred embodiment to the present invention, those skilled in the art will appreciate that the present invention may also be practiced in distributed environments. Moreover, the present invention may be practiced in computer systems that have configurations that differ from that depicted in FIG. 1. The depiction in FIG. 1 of the computer system 10 is intended to be merely illustrative and not limiting of the present invention. For example, more than two real-time application programs may be concurrently running on the computer system in some alternative embodiments.

Figure 2:
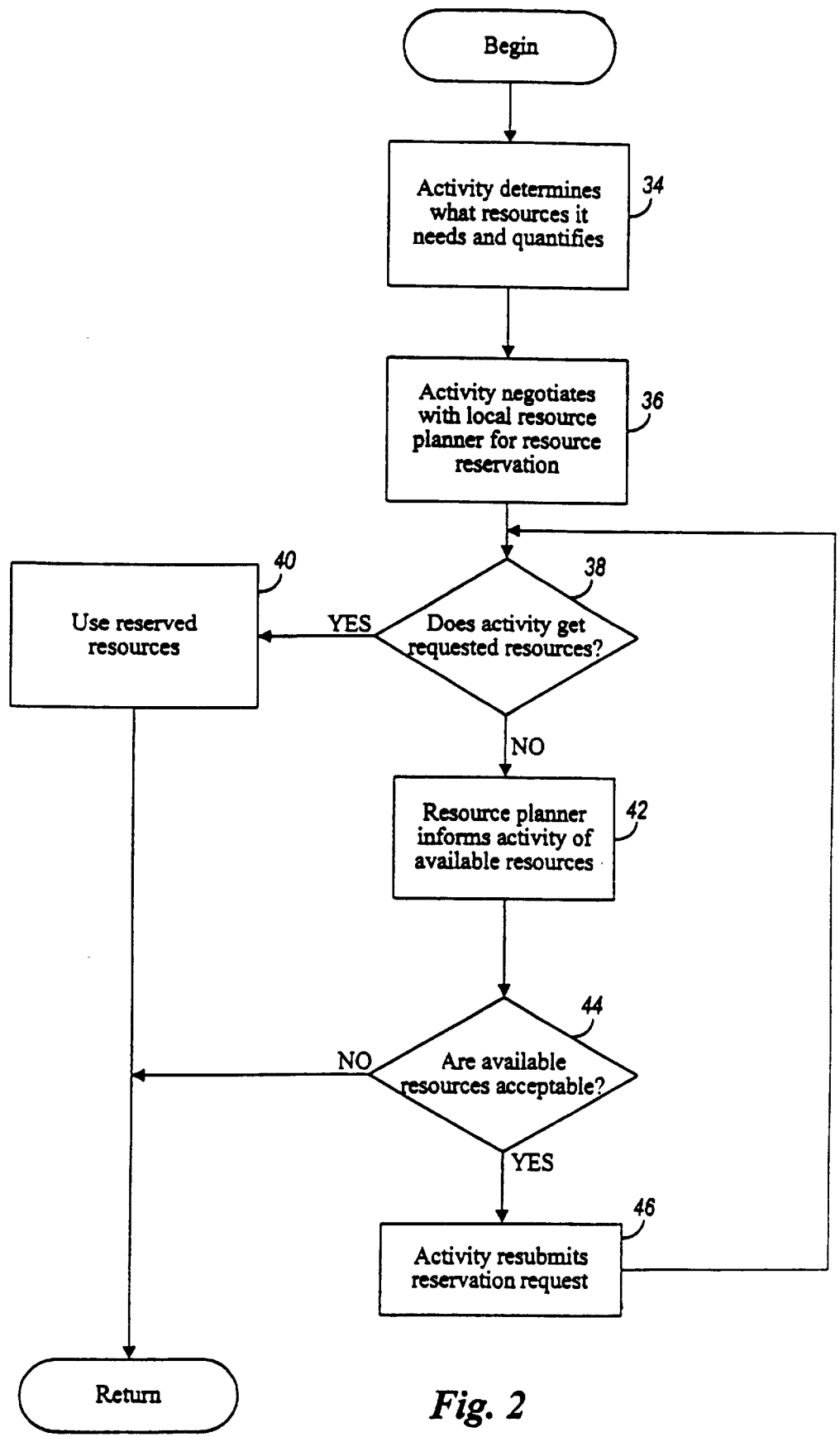
FIG. 2 is a flowchart illustrating the steps that are performed when an activity that is associated with an application program seeks to reserve resources.

As was mentioned above, in the preferred embodiment of the present invention real-time application programs are resource self-aware. The application programs 20 and 22 know what resources, as well as how much of those resources, they need to have to run properly and predictably. FIG. 2 is a flowchart illustrating the steps that are performed when an activity that is associated with an application program seeks to reserve resources. Initially, the activity determines what resources it needs (step 34 in FIG. 2). This determination involves an information gathering process. In the preferred embodiment of the present invention, the activity queries resource providers to determine what resources the activity needs. The activity is aware of what resource providers it uses, and the activity queries the resource providers it uses to determine what resources are, in turn, needed by those resource providers to perform their job and what quantities of resources are required for the resource providers to perform their job.

Figure 3:
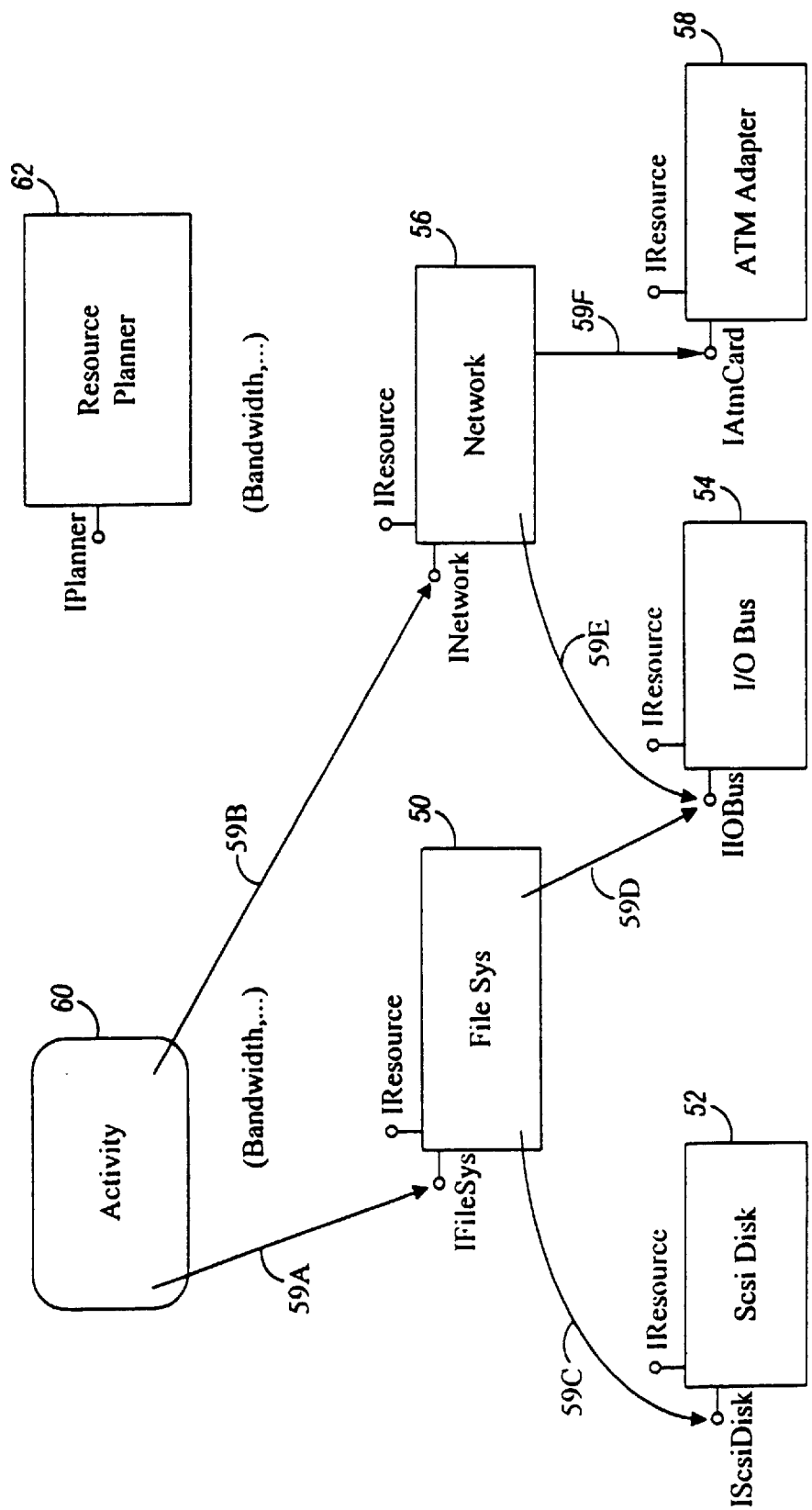
FIG. 3 is a block diagram illustrating an example of an activity querying resource providers to determine resource requirements in accordance with the preferred embodiment of the present invention.

In order to more fully understand the information gathering process, it is helpful to understand how the resource providers are logically organized. First, it should be appreciated that the resource providers are modularized. Resource providers may be components of larger modules. An example helps to illustrate this modularity. FIG. 3 depicts an example where an activity 60 needs to exploit disk bandwidth and network bandwidth to perform a network write operation. The activity knows that it must use the file system and the network to perform such a write operation. The file system has an associated file system resource provider 50, and the network has an associated network resource provider 56. In performing the disk read operation, the file system resource provider 50 recognizes that it must call upon the SCSI disk resource provider 52 and the PO bus resource provider 54 to perform the disk read operation. The network resource provider similarly recognizes that it must call upon the I/O bus resource provider 54 and the asynchronous transfer mode (ATM) adapter 58 to perform the network write operation. Thus, the activity 60 realizes it must use disk bandwidth and network bandwidth, but the activity 60 relies upon the file system resource provider 50 and the network resource provider 56 to determine what additional resources are required to obtain the disk bandwidth and network bandwidth, respectively.

Software components that have real-time resource requirements provide interfaces that expose those requirements to their clients. This allows the clients to query the components about the resources that are needed to perform operations that the client will use. In other words, resource providers support interfaces that allow clients of the resource providers to determine what resources are required for particular operations. An interface, as used herein, is a Microsoft OLE 2.01 interface and refers to a named group of semantically related methods. Objects that implement the code for all of the methods in an interface are said to "support" the interface. Examples of interfaces supported by resource providers that may be queried to obtain resource requirements are the IFileSys, IScsiDisk, IIOBus, INetwork and IAtmCard interfaces shown in FIG. 3.

Figure 4:
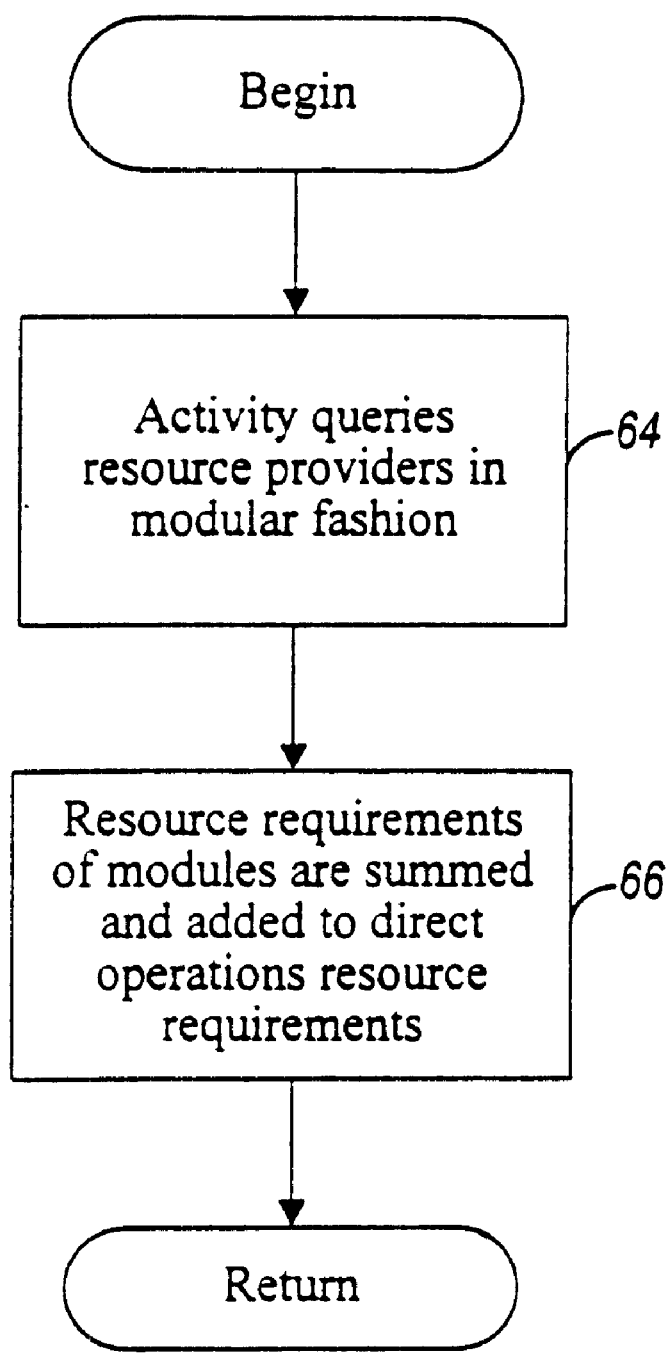
FIG. 4 is a flowchart illustrating the steps that are performed by an activity to determine its resource requirements.

FIG. 4 is a flowchart that illustrates the steps that are performed to determine what resources an activity needs (step 34 in FIG. 2). The activity queries the resource providers in a modular fashion (step 64 in FIG. 4). The queries are represented in FIG. 3 by arrows 59A, 59B, 59C, 59D, 59E and 59F. The queries are implemented as calls to methods in interfaces supported by the resource providers. The activity 60 sums the resources required by each of the resource providers it calls and adds any resources required by operations that it directly implements. Thus, for example in FIG. 3, the file system resource provider 50 is a client of the SCSI disk resource provider 52 and the I/0 bus resource provider 54. The resource requirements of the file system resource provider so to perform the network write operation requested by the activity 50 includes the resource requirements of both the SCSI disk resource provider to perform its role in the operation, the resource requirements of the I/O bus resource provider 54 to perform its role, and the separate resource requirements of the file system resource provider 50. The resource requirements of the activity 60 are the cumulative resource requirements of the file system resource provider 50 and the network resource provider 56 in performing the network write operation. The resource requirements of the file system resource provider 50 and the network resource provider 56 reflect resource requirements of the modular components that are called by those resource providers. Thus, in step 66 of FIG. 4, the resources requirements of the modules are summed along with the direct resource requirements to determine the cumulative resource requirements for the activity.

Another alternative for determining resource requirements is to empirically determine what resources are used by an activity and to use the empirical determination as the basis for the resource requirements that are later requested. Such empirical estimates may be cached by an activity 60, by the operating system 18 or even by the resource planner 62. This alternative has the benefit of using fewer resources by clients because the alternative does not require the querying that is used in the above-described approach.

The above discussion has assumed that an activity knows how to determine what resources it needs. It may be helpful, in some instances, to provide system support for assisting an activity in determining the activity's resource requirements. The operating system 18 may provide support for an activity to readily determine its resource requirements for system operations that are available in the operating system application program interface (API) set. For example, if the user requests a read operation, the operating system 18 may provide a mechanism for determining the appropriate resource requirements for such an operation. Another alternative is for the system to record what resources are utilized during a read and cache those values so that the values are returned to the activity for use in making a resource reservation request.

Once the activity determines what resources it needs and the quantity of those resources it needs, the activity sends a request for the determined quantities of resources to local resource planner to obtain a reservation (step 36 in FIG. 2). The request that is submitted by the activity holds a "resource set." The resource set specifies what resources are requested and what quantity of those resources are requested. The resource set includes a number of pairs of resources and resource amounts. More formally, each pair of a resource set includes a reference to an IResource interface supported by a particular resource along with an amount specified in terms of the units of that resource. The IResource interface will be described in more detail below.

The amount value in a resource set pair is resource specific. For example, for CPU time, which is modeled as a resource, the resource amount is specified as a number of units per second of total CPU capacity per second. The total CPU capacity is viewed as 10 million units per second.

Each resource set is implemented as an object that supports the IResource set interface. This interface is formally defined as follows:

interface IResource Set: IUnknown {
    import "mmtype.idl";
    import "actvty.idl";
    import "resour.idl";
    import "eresst.idl";
    SCODE AddAmount([in] IResource *Resource, [in] RESOURCE_AMOUNT Amount, [out] IResourceSet **pResSetResult);
    // Adds a resource and its amount to the set. Adds the resource to
    // the set if necessary, otherwise adjusts the amount. Returns a new
    // resource set with the addition included; original is unmodified.
    SCODE GetAmount([in] IResource *Resource, [out] RESOURCE_AMOUNT *Amount);
    // Gets the amount of a particular resource in the set.
    // IReturns =b 0.0as the amount if the resource is not in the set.
    SCODE Add([in] IResourceSet *Addend, [out] IResourceSet **Result);
    // Adds the contents of the specified set to this set and returns
    // the result. Resource amounts are added if present in both sets.
    // Returns a new resource set with the addition included; original is
    // unmodified.
    SCODE Subtract([In] IResourceSet *Subtrahend, [out] IResourceSet **Result);
    // Subtracts the contents of the subtrahend from this set. Used
    // e.g. to figure out what amount of a set of resources must become
    // available to satisfy a request. Returns a new resource set with
    // the modification included; original is unmodified.
    SCODE Enumerate([out] IEnumResourceSet **ppenm);
    // Returns enumerator for this resource set.
    SCODE CheckFree( );
    // Returns S_TRUE if enough of each resource in the set is free
    // to reserve the amount associated with that resource.
    SCODE GetFree([out] IResourceSet **Free);
    // Returns a resource set with the same resources as this one, with
    // the amount associated with each resource in the set equal to the
    // amount currently free.

```
SCODE Reserve([in] IActivity *Activity, [out] IRe-
    sourceSet **Available);
    // Tries to reserve each resource in the set, in the amount
    // associated with it. Returns S_OK if all succeeded;
      the output
    // resource set pointer is NULL. Returns S_FALSE
      otherwise; no
    // resources are allocated, and the output resource set
      contains the
    // amount currently available of each requested
      resource.
    // Note: Intended for use by the resource planner.
  SCODE TestIntersect([in] IResourceSet *IntersectWith);
    // Return S_TRUE if there are resources in common
      between the two
    // resource sets, S_FALSE otherwise.
}
```

Figure 5:
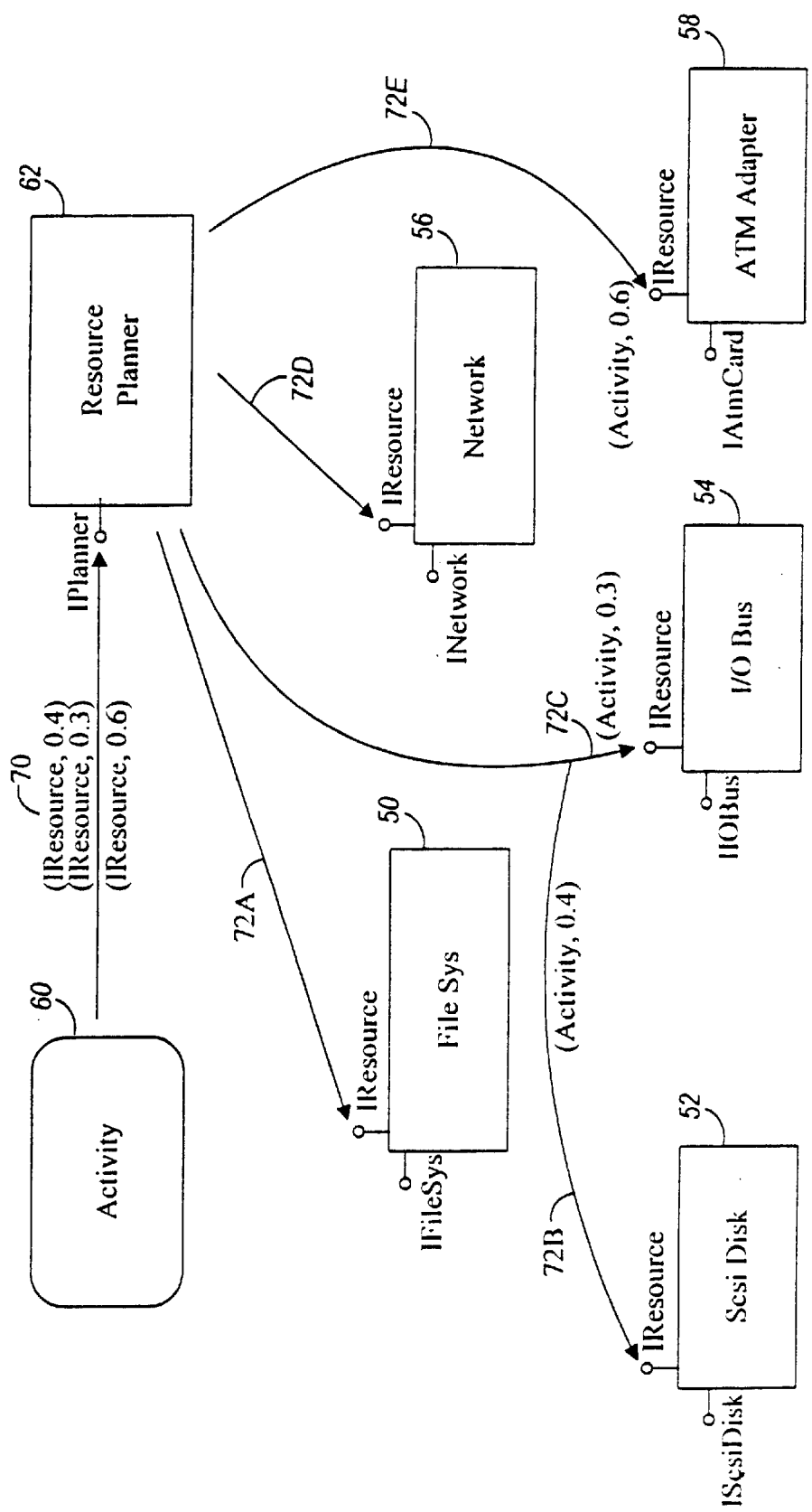
FIG. 5 is a block diagram illustrating the submission of a resource set in a reservation request to a resource planner and the resulting reservation calls when the request is granted in accordance with the preferred embodiment of the present invention.

FIG. 5 shows an example in which an activity 60 sends a resource set to the resource planner 62 to request quantities of resources. The resource planner 62 receives the resource set and applies an appropriate policy to determine whether the resources should be granted (step 38 in FIG. 2). If the resources are granted, the activity 60 may use the reserved resources (step 40 in FIG. 2). If, on the other hand, the resources are not granted, the resource planner 62 informs the activity 60 of the quantities of the requested resources that are available, if any (step 42 in FIG. 2). The activity 60 then may determine whether the available resources are acceptable (step 44 in FIG. 2). If such available resources are acceptable, the activity 60 may reformulate its reservation request to conform to the current availability of the resources (step 46 in FIG. 2). The negotiation process then is repeated by continuing execution at step 38 in FIG. 2. If, however, the available resources are not acceptable, the activity terminates.

Enforcement of the resource allocations in the preferred embodiment of the present invention is voluntary. It is assumed that an activity will comply with the decision of the resource planner 62 because the activity wishes to exhibit predictable performance. If the resource planner 62 indicates that the resources are not available and an activity decides to proceed anyway, it is likely that the activity will encounter serious problems while executing. The preferred embodiment also provides a mechanism for a resource to make known when a persistent overload condition exists. The resource provider may fail operations that exceed reservations. The resource planner may then force a renegotiation of resource reservations to more equitably distribute resource allocation. In other words, enforcement is voluntary but safety mechanisms are provided to help ensure good behavior.

As part of the process of granting resources to an activity 60, the resource planner 62 must contact each of the resource providers to reserve the appropriate portions of the resources that have been granted to the activity. Each resource, by definition, must support the IResource interface. This interface is formally defined as follows:

```
interface IResource: Iunknown {
  import "mmtype.idl";
  import "actvty.idl";
  import "respln.idl";
  SCODE TotalAmount([out] RESOURCE_
    AMOUNT*Total);
    // Get the total amount of a resource.
  SCODE Reserve([in] IActivity *Client, [in]
    RESOURCE_AMOUNT Amount, [out]
    RESOURCE_AMOUNT *Actual);
    // Set the amount reserved of a resource for a particular
      client.
    // Upon return, return value will be S_TRUE if the
      resource amount
    // was granted. In this case, Actual will return the actual
      amount
    // it of the resource granted. If the full amount requested
      could not
    // be granted, return value will be FALSE and Actual
      will return the
    // amount of the requested resource that is currently
      available. If
    // the amount reserved is less than the previous reser-
      vation then
    // some of the reservation will have been given back.
      The amount can
    // be zero, in which case the entire existing reservation
      is being
    // given back.
    // Note: This operation intended for use by the resource
      planner.
  SCODE GetReservation([in] IActivity *Client, [out]
    RESOURCE_AMOUNT *Amount);
    // Get the amount of the resource currently reserved for
      the client.
  SCODE GetUsage([in] IActivity *Client, [out]
    RESOURCE_AMOUNT *Amount)
    // Get the usage of the client since the last call to this
      method.
  SCODE GetFree([out] RESOURCE_AMOUNT
    *Amount);
    // Get the amount of the resource that is not currently
      reserved at
    // the time of the call.
}
```

The Reserve ( ) method allows the resource planner 62 to reserve a certain quantity of the resource. Hence, for the example shown in FIG. 5, the resource planner 62 makes calls 72A, 72B, 72C, 72D and 72E to call the Reserve ( ) methods of the IResource interfaces supported by the resource providers 50, 52, 54, 56 and 58, respectively.

The present invention preferably enables non-real-time programs that are not aware of the resource planner to utilize managed resources. A default reservation for a relatively small quantity of selected resources, such as the processor resource, is preferably made for activities of non-real-time programs that do not make a reservation on their own behalf. Default reservations are preferably made by the resource providers themselves instead of the resource planner. Further, the capacity of resource providers such as the scheduler often exceeds the total reservations for their resource. Resource providers preferably provide such surplus resource capacity to any activity that attempts to utilize the resource. Also, some activities do not use an amount of a resource as large as the amount of their reservation for the resource. Resource providers preferably also provide this unused resource capacity to any activity that attempts to utilize the resource. The present invention therefore enables non-real-time programs to execute on the same computer system with real-time programs.

As can be seen above, the IResource interface includes a TotalAmount( ) method that allows the resource planner 62 to determine the total amount or capacity of the resource in the resource specific units. The GetReservation( ) method returns the amount of the resource that is reserved for a particular activity that is specified in the parameters for the call to this method. The IResource interface also includes a GetFree( ) method that returns a value specifying a current amount of the resource that is available. The GetUsage( ) method returns the actual usage of the resource by an activity.

The above-described approach to requesting resources from a resource planner 62 is actually performed by calling the RequestResources( ) method that is supported by the IResourcePlanner interface of the resource planner 62. The IResourcePlanner interface is defined as follows.

interface IResourcePlanner: IUnknown {
   import "mmtype.idl";
   import "resset.idl";
   import "actvty.idl";
   import "actnfy.idl";
   //
   // Resource plan elements currently consist of a resource set.
   // May later be extended to pass additional information to the planner.
   typedef IResourceSet *PlanElement;
   SCODE RequestResources([in] IActivity *Activity, [in] long cPlanElements, [in, size_is(cPlanElements)] PlanElement PlanElements [ ], [in] IActivityNotify *NotificationInterface, [out] long *Granted, [out] IResourceSet **Actual);
     // Request resources for an activity. Upon return, if the resources
     // could not be granted, Granted will be −1 and Actual will return
     // the amounts of the requested resources that are currently
     // available. Otherwise, Granted will be the index of the plan element
     // corresponding to the resource set that was granted. In this case,
     // Actual will return the actual amount of each resource granted.
     // The plan elements requested are ordered in decreasing value to the
     // application. The activity also supplies its resource notification
     // interface pointer to the planner at this time.
   SCODE ReleaseResources([in] IActivity *Activity);
     // Frees all resources reserved by an activity.
   SCODE CreateResourceSet([in] IResource *Resource, [in] RESOURCE_AMOUNT Amount, [out] IResourceSet **ResourceSet);
     // Creates a resource set. If the resource provided is NULL then
     // an empty resource set is returned. If a resource is provided
     // then a singleton resource set with the resource and amount
     // specified is returned.
}

The RequestResources( ) method is passed a resource set and passes out a value that specifies either that the resource reservation for the input resource set was granted or was not granted. If the request was not granted, a resource set is passed out that specifies the amount of available resources of the type asked for. The ReleaseResources( ) method releases all the resources that are reserved by an activity, and the CreateResourceSet( ) method creates a resource set.

Figure 6A:
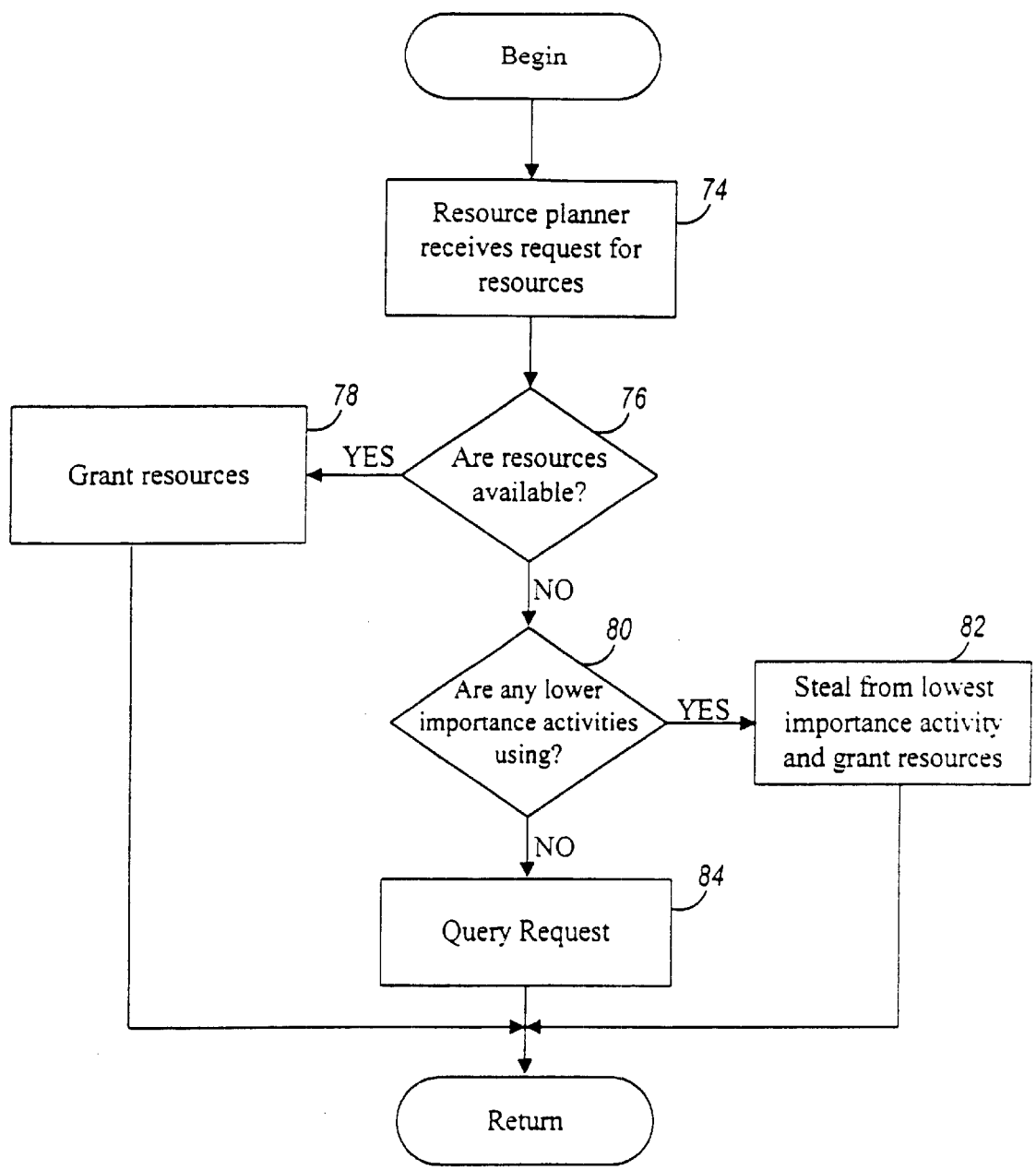
FIG. 6A is a flowchart illustrating the steps that are performed by the resource planner to implement the policy of the preferred embodiment of the present invention.

The above discussion has not focused on the policy that is adopted by the resource planner in the preferred embodiment of the present invention. FIG. 6A is a flowchart illustrating the steps that are performed by this policy. Nevertheless, those skilled in the art will appreciate that other policies may be implemented in practicing the present invention. In general, the resource planner implements the policy of the policy module it supports. This resource module may be changed and different embodiments of the present invention may employ different policy modules. Nevertheless, in the preferred embodiment, the policy module is implemented through the IResourcePlannerPolicy interface, which is defined as follows.

interface IResourcePlannerPolicy: IUnknown {
   import "mmtype.idl";
   import "resset.idl";
   import "actvty.idl";
   SCODE SetImportance([in] IActivity *Activity, [in] IMPORTANCE Importance);
     // Inform the resource planner that the indicated activity has
     // transitioned to the specified importance. This may trigger a
     // resource negotiation.
   SCODE GetImportance([in] IActivity *Activity, [out] IMPORTANCE *Importance);
     // Get the current importance level for an activity.
   SCODE OnOverload([in] IActivity *Activity, [in] IResource *Overloaded, [in] RESOURCE_AMOUNT AmountUsed);
     // Tell resource planner that an activity has consistently used more
     // of a resource than it has reserved.
}

Initially, the resource planner receives a request for resources from an activity (step 74 in FIG. 6A). The resource planner then checks whether the requested resources are currently available in the requested amounts (step 76 in FIG. 6A). If the resources are available in the requested amounts, the resources are granted to the activity (step 78 in FIG. 6A). If the resources are not all available in the requested quantities, the resource planner checks whether any lower importance activities are using resources that are requested so that the resources may be reassigned to complete the resource reservation of the requesting activity (step 80 in FIG. 6A). The policy of the preferred embodiment in the present invention employs the notion of importance where activities can be ranked according to importance, and the importance of activities may be compared. If lower importance activities are using sought resources that have been requested by the higher importance requesting activity, these resources are reassigned to be granted to the higher importance requesting activity in order to completely satisfy the resource reservation request (step 82 in FIG. 6A).

Figure 6B:
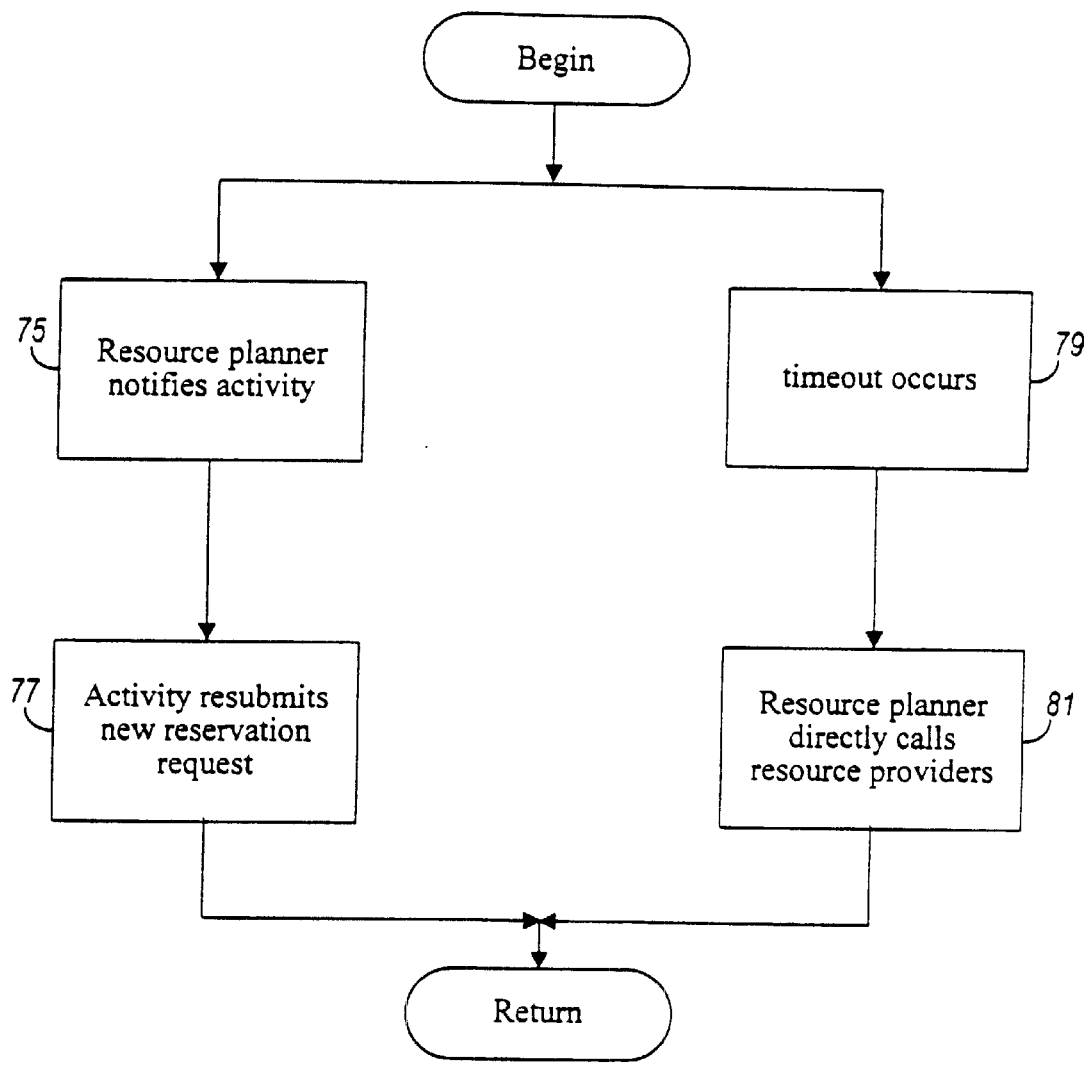
FIG. 6B is a flowchart illustrating the sub-steps that are performed to perform step 82 of FIG. 6A.

The reassignment of resource reservations is realized by either direct resource provider activity or by prompting renegotiations by lower importance activities. FIG. 6B is a flowchart illustrating the steps that are performed in performing step 82 of FIG. 6A. Typically, the resource planner notifies the lower importance activity that another activity needs some of the resources it is using more than the informed activity does (step 75 in FIG. 6B). The resource planner performs such notification by calling a method on the IActivityNotify interface which each activity supports. This interface is formally defined as follows.

```
interface IActivityNotify: IUnknown {
    import "mmtype.idl";
    import "resset.idl";
    import "actvty.idl";
    SCODE OnOverload([in] IActivity *Activity, [in] IRe-
        source *Overloaded, [in] RESOURCE_AMOUNT
        AmountUsed);
        // Tell an activity that it has consistently used more of
            a
        // resource than it has reserved.
    SCODE OnNeed([in] IActivity *Activity, [in] IRe-
        sourceSet *Shortage);
        // Tell an activity that other activities need a set of
            resources
        // more than it does. The Shortage resource set says
            which resources
        // are needed, and how much.
    SCODE OnAvailable([in] IActivity *Activity, [in] IRe-
        sourceSet *Available);
        // Tell an activity that additional resources have become
            available
        // that it may wish to negotiate for. The Available
            resource set
        // says which additional resources are now available,
            and how much.
}
```

The resource planner calls the OnNeed( ) method to inform the lower importance activity of the quantity of resources that are reserved by that activity that are needed by other activities. The lower importance activity then resubmits a new reservation request relinquishing the resources that are needed by the higher importance activity (step 77 in FIG. 6B).

Alternatively, the resource planner may directly intervene when activities are poorly behaved. In such an instance, a time-out occurs (step 79 in FIG. 6B), and the resource planner directly calls resource providers on behalf of an activity to change the resource reservations for the activity (step 81 in FIG. 6B). Specifically, the resource planner calls the Reserve( ) method to alter the resource reservations of the lower importance activities that are poorly behaved to relinquish the resources for use by the higher importance activities.

If there are no lower importance activities using the resources that have been requested but are unavailable, the resource reservation request is denied (step 84 in FIG. 6A). The GetImportance( ) method is used to determine the importance of activities in the above-described process.

Figure 7A:
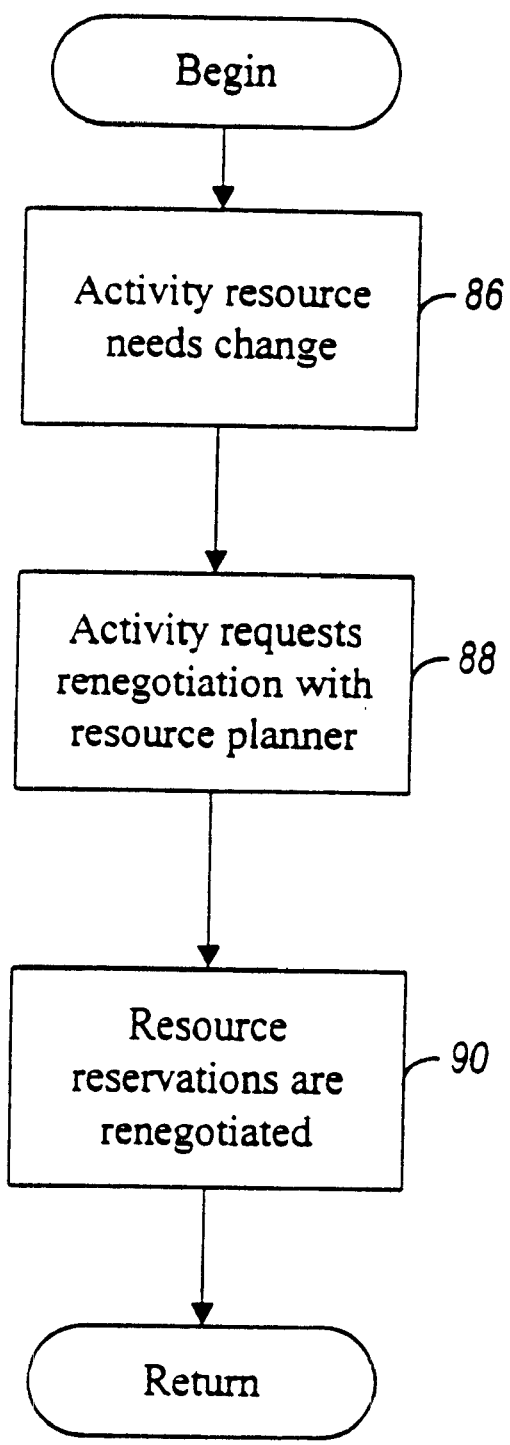
FIG. 7A shows a flowchart of the steps that are performed when an activity changes mode or execution such that its resource needs change substantially enough to want renegotiation.

The preferred embodiment of the present invention assumes that resource reservations do not need to be frequently renegotiated. Nevertheless, in order to provide flexibility and adaptability to changing resource needs, the preferred embodiment facilitates the renegotiation of resource reservations. A number of different events may trigger such renegotiation. This dynamic feedback helps to keep the resource management mechanism self-aware. For example, the changing resource needs of an activity may trigger a renegotiation. FIG. 7A shows a flowchart of the steps that are performed when an activity changes its mode of execution such that its resource needs change substantially enough to warrant renegotiation. Initially, the activity resource needs change enough to warrant renegotiation (step 86 in FIG. 7A). The activity then contacts the resource planner to request renegotiation to change the activity's resource reservations (step 88 in FIG. 7A). One example of such a contact is a new call to RequestResources( ) specifying a set of resource amounts different from the set currently granted. The resource planner then performs renegotiation with the activity to change the resource reservations granted to the activity (step 90 in FIG. 7A).

Figure 7B:
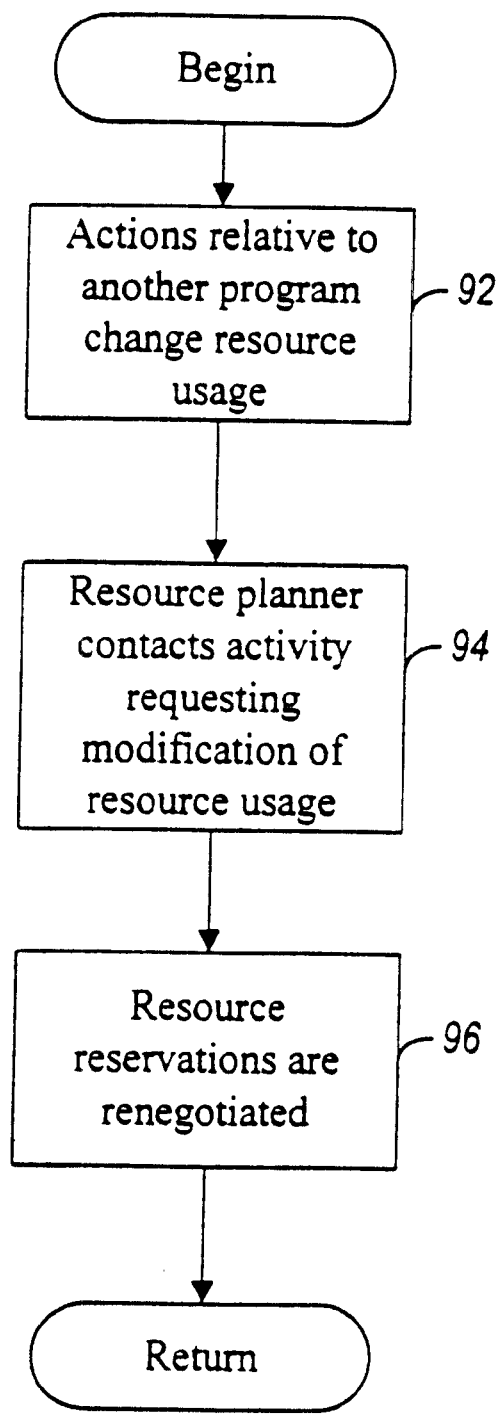
FIG. 7B shows a flowchart of the steps that are performed when events relating to another program change resource usage.

Resource reservation renegotiation may be also triggered by the actions of other programs. For example, if other programs begin executing, cease executing or substantially change their resource usage, resource availability may change substantially enough to warrant resource reservation renegotiation. As shown in FIG. 7B, events relating to another program change resource usage (step 92). The resource planner then contacts a selected activity to request a modification of the activity's resource usages (step 94 in FIG. 7B). For example, the resource planner may call the OnNeed( ) method of an activity to indicate that the activity needs to relinquish resources or the resource planner may call the OnAvailable( ) method to cause an activity to seek more resources. Further, policy may change, causing the SetImportance( ) method to be called, which may trigger renegotiation. Resource reservations are then renegotiated using the negotiation process described above relative to FIG. 2 (step 96 in FIG. 7B).

Figure 7C:
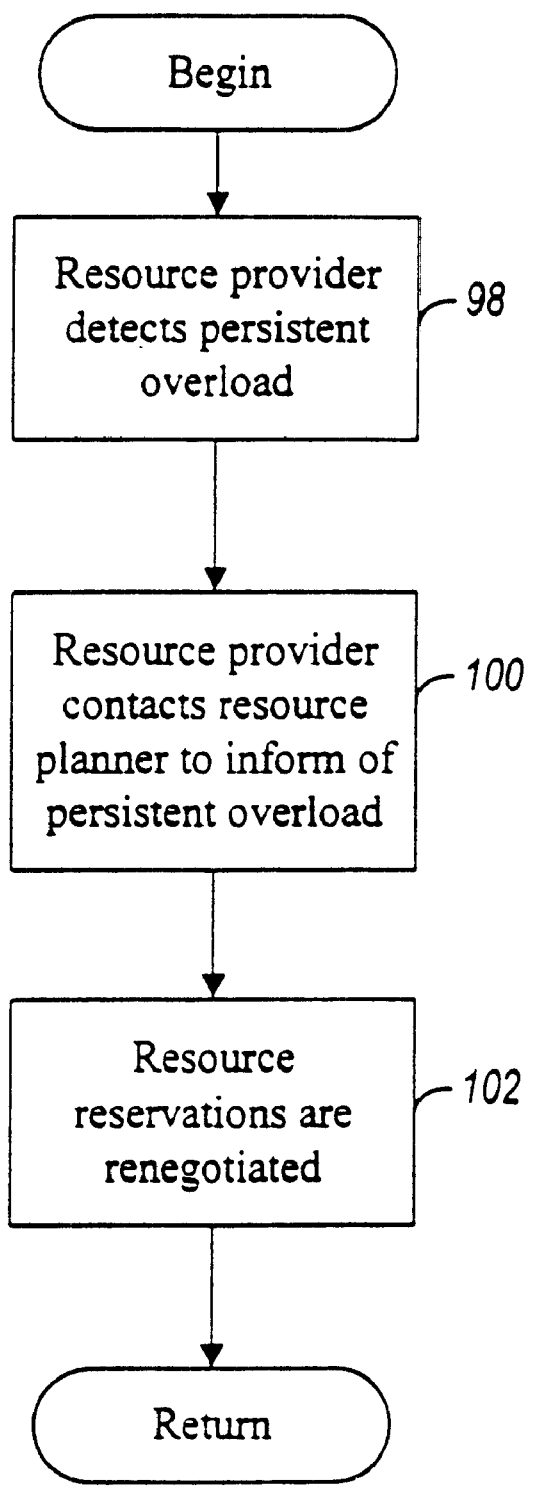
FIG. 7C is a flowchart that illustrates the steps that are performed when a resource provider experiences persistent overload.

A final type of event that may trigger resource reservation renegotiation arises when a resource provider experiences persistent overload. FIG. 7C is a flowchart that illustrates the steps that are performed in such an instance.

Initially, the resource provider detects a persistent overload condition (step 98 in FIG. 7C). The resource provider then contacts the resource planner to inform the resource planner of the persistent overload condition (step 100 in FIG. 7C). The resource planner may inform an activity that it has consistently overused a resource and initiate a renegotiation by calling the OnOverload( ) method of the activity. The renegotiation process is subsequently performed (step 102 in FIG. 7C).

Figure 8:
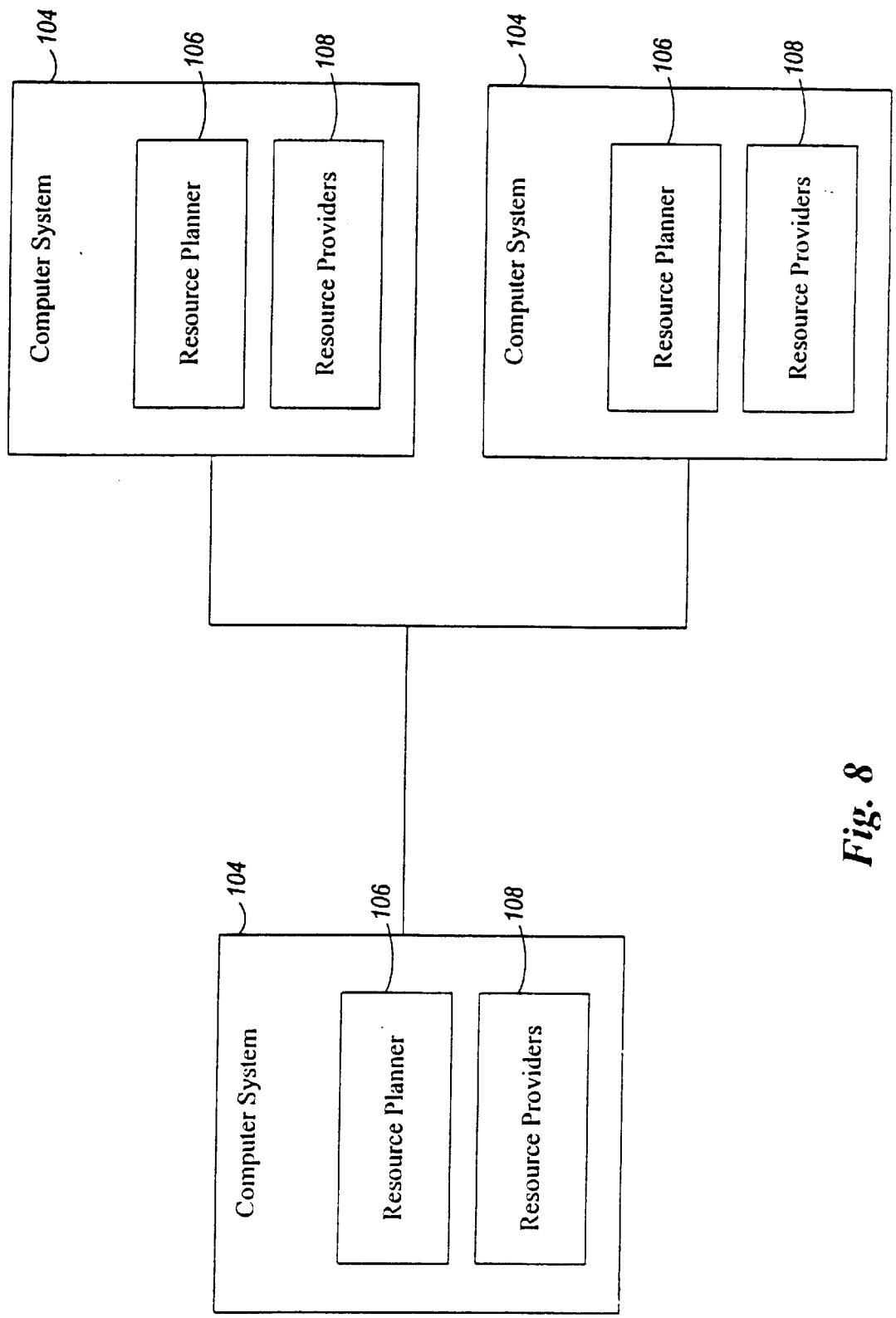
FIG. 8 is a block diagram depicting a distributed environment containing multiple computer systems that each contain a separate resource planner.

The above-described examples have dealt with instances where activities request local resources. The preferred embodiment of the present invention also enables activities to request remote resources. This capability is in large part realized by maintaining separate but cooperating resource planners on each computer system within a distributed environment. For example, as shown in FIG. 8, each of the computer systems 104 in the illustrated distributed environment includes its own resource planner 106 that is responsible for managing the resources that are local to the computer system 104. Each computer system 104 includes local resource providers 108 that are associated with local resources and managed by the local resource planner 106.

Figure 9:
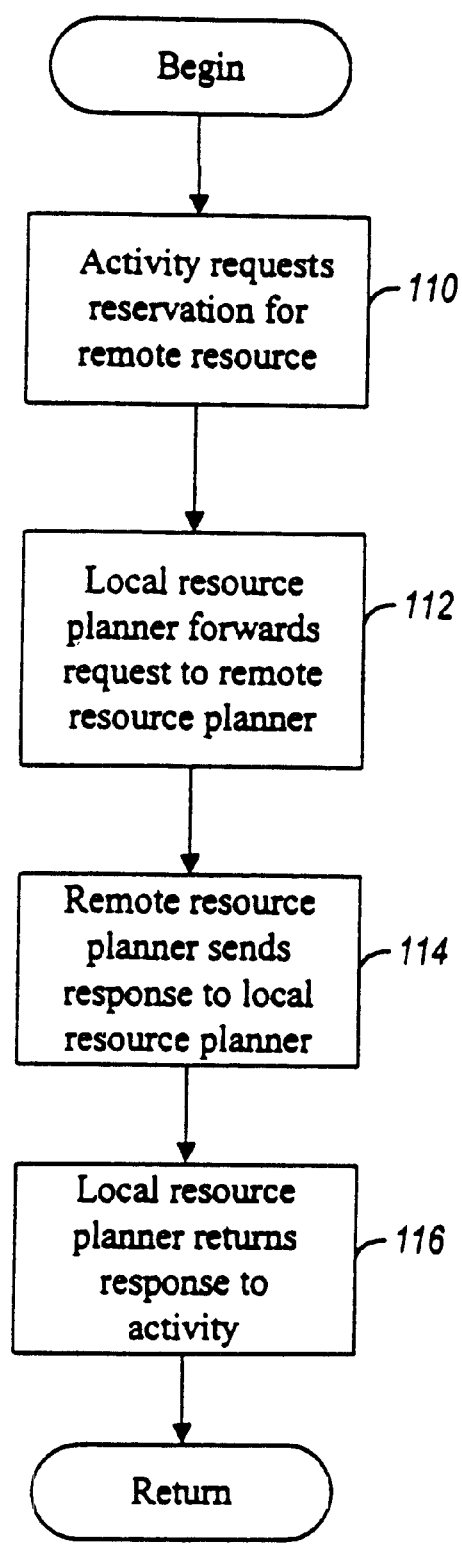
FIG. 9 is a flowchart illustrating the steps that are performed when an activity requests a resource reservation for a remote resource.

FIG. 9 is a flowchart illustrating the steps that are performed when an activity requests a resource reservation for a remote resource. The process begins with a local activity requesting a reservation for a remote resource (step 110 in FIG. 9). This may occur, for instance, when a resource set that contains references to some remote resources (as well as possibly some local resources) is a passed in a RequestResources( ) call to the local resource planner. Such sets may result from resource query calls to modules implemented by remote objects or via remote procedure calls. The local resource planner receives the request and forwards the request to the remote resource planner for the machine on which the remote resource is found (step 112 in FIG. 9). The remote resource planner processes the request and sends a response back to the local resource planner (step 114 in FIG. 9). The local resource planner receives the response and forwards it to the requesting activity (step 116 in FIG. 9).

The present invention is particularly useful in a networked environment, like the Internet, when data are to be transferred over the network. The preferred embodiment of the present invention ensures that the transmission of data, such as audio data or video data, that have real-time delivery requirements are delivered in a timely fashion. Specifically, the preferred embodiment of the present invention ensures that the resources that are required to ensure timely delivery of the data are guaranteed to the activity that is associated with delivering the data. Hence, the preferred embodiment of the present invention guarantees the fidelity of application programs in a distributed environment.

As discussed above, each application is preferably able to define one or more "activities" that correspond to one or more different behaviors of an application. Examples of behaviors that may be regarded as separate activities are playing a video stream, recording voice input, and tracking the movement of a pointing device. Each activity, in turn, is preferably composed of one or more threads. An application preferably calls a CreateActivity API supported by the resource planner to define each activity of the application. In each case, the CreateActivity API creates an activity object that represents the activity and stores the identities of the threads belonging to the activity. The CreateActivity API returns to the application a pointer to the activity object, which identifies the activity. An application program subsequently creates a new thread by calling a CreateThread API. The CreateThread API takes as an input parameter a pointer to the activity object representing the activity to which the thread shall belong, and stores the identity of the created thread in the activity object pointed to by the in parameter, in addition to actually creating the thread. For example, if an activity for recording voice input utilized one thread for collecting voice input and another thread for storing the collected voice input, the application would first call the CreateActivity API to create an activity object representing the voice input recording activity. This application would subsequently call the CreateThread API twice with the pointer to the activity object returned by the CreateActivity API to create the voice input collection thread and the voice input storage thread.

As is also discussed above, once an application creates an activity, it can obtain a reservation for a resource set from the resource planner for the activity by calling the Reserved method of the resource planner with a pointer to the activity object representing the activity for which a resource set is to be reserved. When the resource planner approves such a request, the resource planner conveys to the resource providers for the resources reserved as part of the resource set the amount of their resources that have been reserved and the pointer to the activity for which they have been reserved. Many resource providers are able to provide a resource on a per-activity basis using only this conveyed information. In other cases in which a resource provider, such as the scheduler that is the resource provider for the processor resource, cannot provide its resource on a per-activity basis and must instead provide its resource on a per-thread basis, the resource provider uses the pointer to the activity conveyed by the resource planner to retrieve the identity of the threads that belong to the activity from the activity object representing the activity. The resource provider then uses the identity of these threads to distribute the amount of the activity's reservation for the per-thread resource among the threads belonging to the activity.

Figure 10:
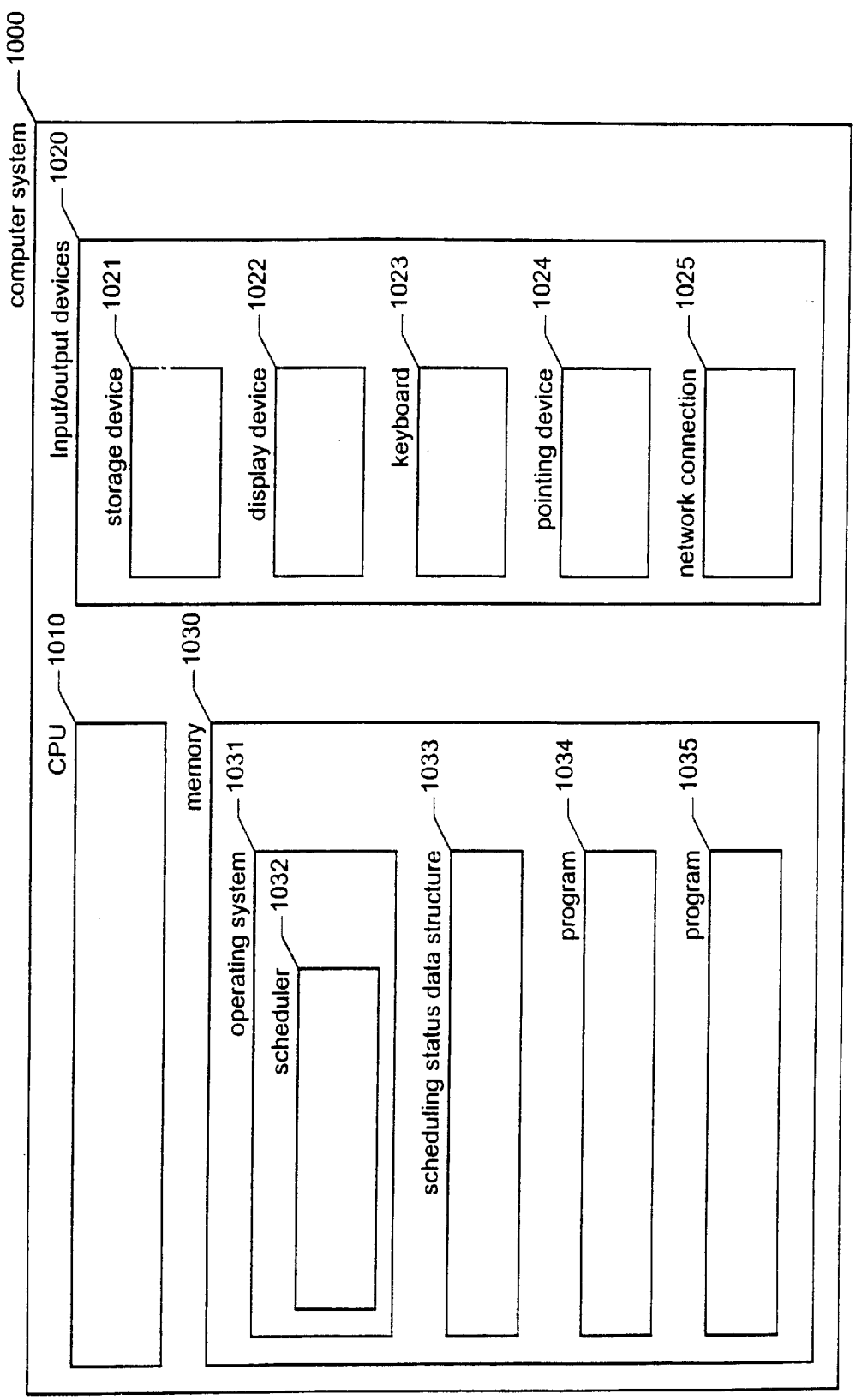
FIG. 10 is a high-level block diagram of the general-purpose computer system upon which the scheduler preferably operates.

FIG. 10 is a high-level block diagram of the general-purpose computer system upon which the scheduler preferably operates. The computer system 1000 contains one or more central processing units (CPU) 1010, input/output devices 1020, and a computer memory (memory) 1030. Among the input/output devices 1020 is a storage device 1021, such as a hard disk drive; a display device 1022, such as a video monitor; a keyboard 1023; a pointing device 1024, such as a mouse; and a network connection 1025, through which the computer system 1000 may communicate with other connected computer systems (not shown). The memory 1030 preferably contains an operating system 1031, which preferably executes on the CPU 1010 and includes the thread scheduling facility (the scheduler) 1032. The memory 1030 further contains a scheduling status data structure 1033 used by the scheduler 1032, as well as additional programs such as programs 1034 and 1035 whose threads are executed by the computer system. While the scheduler is preferably implemented on a computer system configured as described above, one skilled in the art will recognize that it may also be implemented on computer systems having different configurations.

When each thread is created, the scheduler generally receives a time-general scheduling constraint identifying the thread and specifying an overall percentage of processing time to be committed to the thread (or "CPU reservation"). Programs that were developed to support a scheduler utilizing time-general scheduling constraints generally submit a time-general scheduling constraint for each of their threads. In some cases, such programs submit a single time-general scheduling constraint specifying a single CPU reservation for all of its threads to a central resource manager program, which passes this information to the scheduler. The scheduler then assigns individual threads within the program CPU reservations out of the program's reservations, for instance, by evenly dividing the program reservation among the program's threads. For programs that were not developed to support a scheduler utilizing time-general scheduling constraints, the operating system (or whatever entity is used within the computer system to launch such programs) preferably submits a time-general scheduling constraint for each of the program's threads. A thread may preferably submit updated time-general scheduling constraints specifying new CPU reservations at any time during its execution.

Subsequent to receiving a time-general scheduling constraint for a thread, if the program that created the thread was developed to support a scheduler utilizing time-specific scheduling constraints, the scheduler may receive one or more time-specific scheduling constraints for the thread. Such time-specific scheduling constraints are preferably submitted to the scheduler by calling a BeginConstraint API supported by the scheduler, and each constraint in a identify the thread for which it is submitted and specifying, for a block of code about to be executed by that thread, a deadline by which the block of code must complete execution ("deadline"), an estimate of the amount of dedicated processor time the block of code will require to complete execution ("estimate"), an indication of whether the thread is critical ("criticality"), i.e., whether failure to complete the execution of the block of code would be unacceptable to the user, and a start time before which the thread should not be further executed. The scheduler may decline a time-specific scheduling constraint where it would be impossible to complete the time-specific scheduling constraint within the bounds of the thread's time-general scheduling constraint, or, less restrictively, where it would be impossible to complete the time-specific scheduling constraint utilizing a larger percentage of processor time than is specified by the CPU reservation of the thread's time-general scheduling constraint. A thread that submits a time-specific scheduling constraint is expected to withdraw the time-specific scheduling constraint when the block of code to which it corresponds completes execution. A thread preferably withdraws a time-specific scheduling constraint by calling an EndConstraint API supported by the scheduler. In a preferred embodiment, the scheduler autonomously withdraws time-specific scheduling constraints when the processor time expended on them significantly exceeds their estimates.

Figure 11:
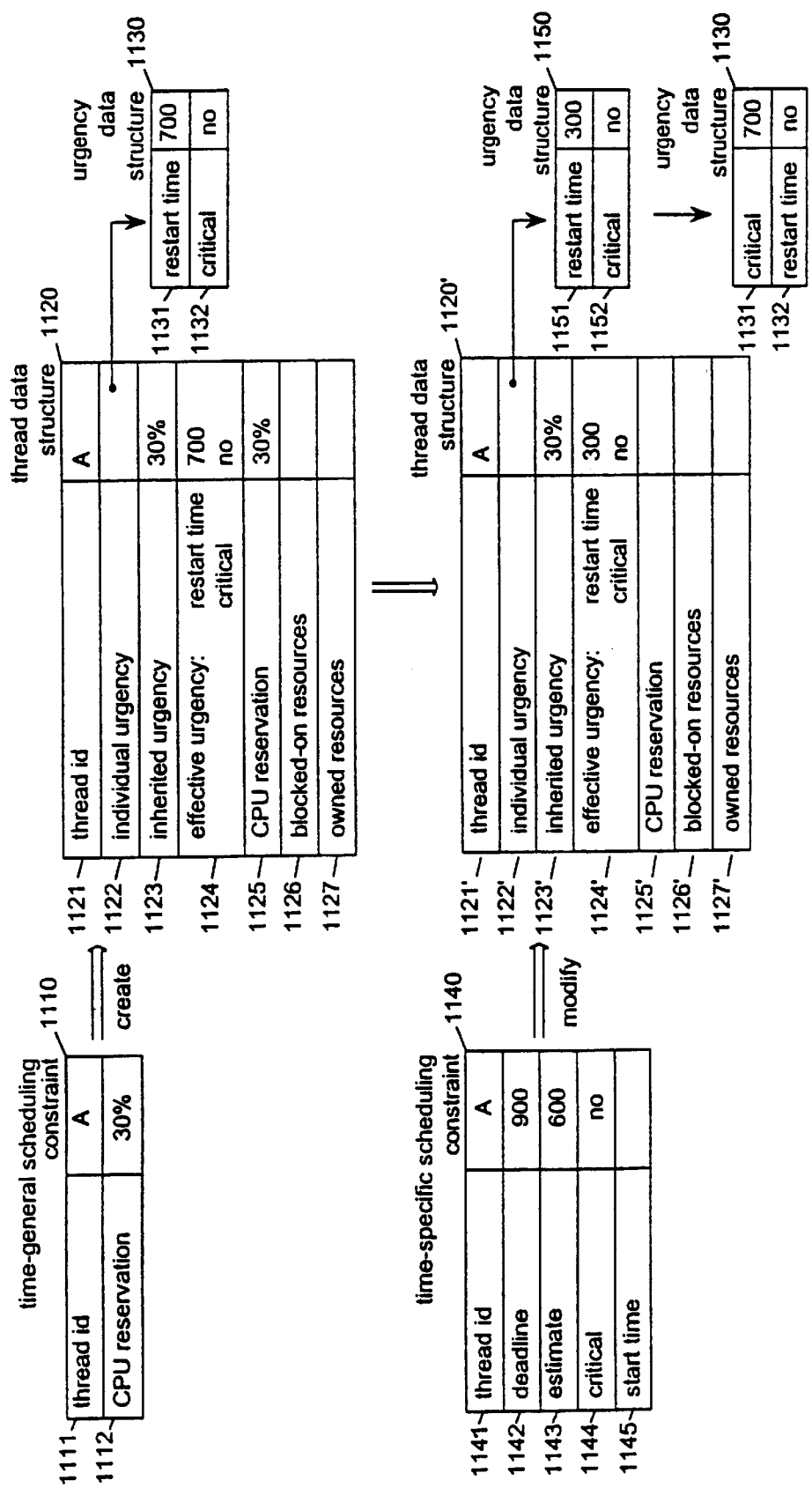
FIG. 11 is a data structure diagram showing the creation and modification of a thread data structure in response to receiving a time-general and a time-specific time constraint for a sample thread.
Figure 12:
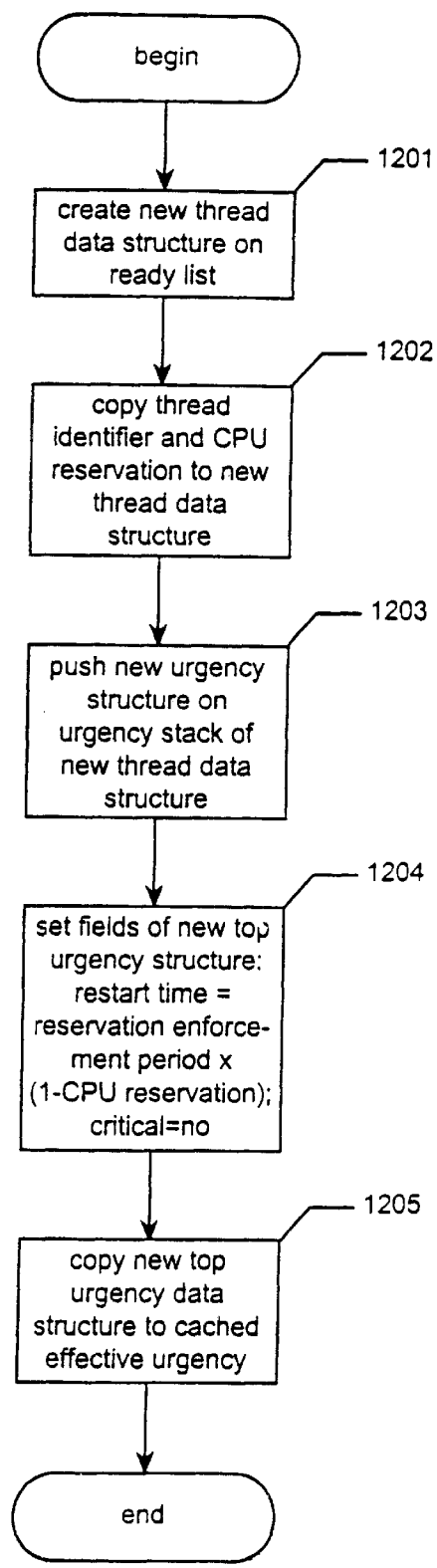
FIG. 12 is a flow diagram showing the steps preferably performed by the scheduler to create a thread data structure when the scheduler receives a time-general scheduling constraint.
Figure 13:
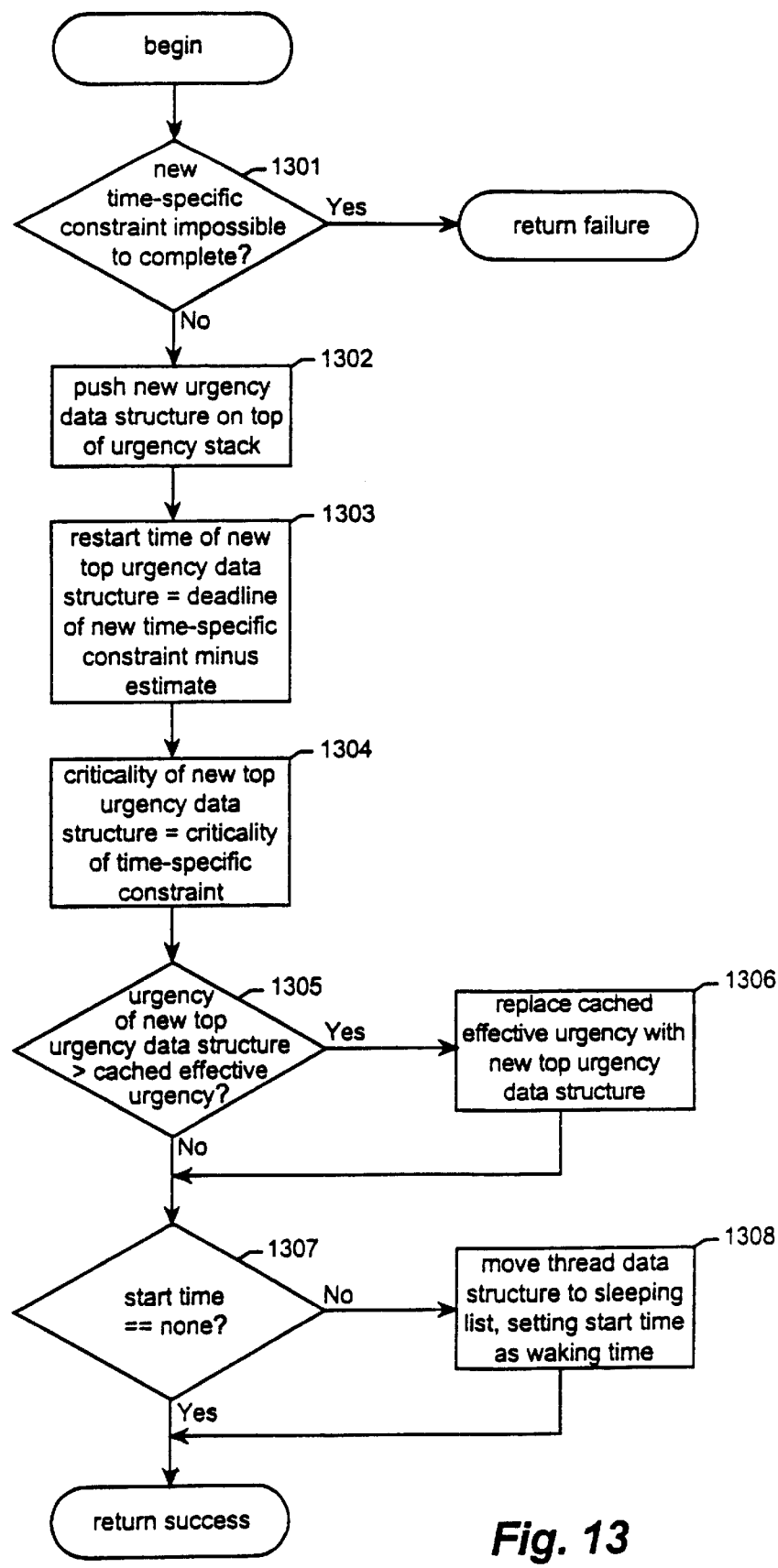
FIG. 13 is a flow diagram showing the steps preferably performed by the scheduler to modify a thread data structure when the scheduler receives a time-specific scheduling constraint.

FIGS. 11–16 illustrate the process of submitting constraints to the scheduler. FIG. 11 is a data structure diagram showing the creation and modification of a thread data structure in response to receiving a time-general and a time-specific time constraint for a sample thread. FIGS. 12 and 13, discussed in detail below, show the steps preferably performed by the scheduler to process new time-general and time-specific time constraints, respectively.

FIG. 11 shows a time-general scheduling constraint 1110 submitted to the scheduler for a sample thread. The sample thread preferably submits the time-general scheduling constraint on its own behalf by calling the BeginConstraint API.

The time-general scheduling constraint 1110 specifies a thread identifier ("thread i.d.") 1111 identifying the thread (in the case of the sample thread, "A") and a CPU reservation 1112 representing an overall percentage of processing time to be committed to the thread (in the case of the sample thread, 30%). In response to receiving the time-general scheduling constraint 1110, the scheduler creates a thread data structure 1120.

FIG. 12 is a flow diagram showing the steps preferably performed by the scheduler to create a thread data structure when the scheduler receives a time-general scheduling constraint. In step 1201, the scheduler creates a new thread data structure such as thread data structure 1120 (FIG. 11). As is discussed in greater detail below, the new thread data structure is created on a list of data structures corresponding to threads that are ready to be executed ("the ready list"), which forms a part of a scheduling status data structure used by the scheduler to maintain the status of each thread for scheduling purposes. In step 1202, the scheduler copies the thread identifier of the time-general scheduling constraint (such as thread identifier 1111) to the thread identifier of the created thread data structure (such as thread identifier 1121).

In step 1203, the scheduler creates an urgency data structure (such as urgency data structure 1130) and pushes it on an individual urgency stack of the created thread data structure (such as individual urgency stack 1122). The individual urgency stack of the created thread data structure is a stack of one or more urgency data structures each corresponding to a scheduling constraint submitted by the thread.

The most recently stored ("pushed") urgency data structure is said to be the "top" urgency data structure on the individual urgency stack and is used by the scheduler, along with any inherited urgencies, to direct the scheduling of the thread. When the scheduling constraint represented by the top urgency data structure on the individual urgency stack is withdrawn, the top urgency data structure is removed ("popped") from the stack, and the next-most recently pushed urgency data structure becomes the top urgency data structure and is used by the facility, along with any inherited urgencies, to direct the scheduling of the thread. The created urgency data structure specifies a restart time (such as restart time 1131) and a criticality (such as criticality 1132). In step 1204, the scheduler sets the components of the created urgency data structure. The scheduler preferably sets the restart time to a time given by the expression (current time)+((CPU reservation enforcement period)×
(1−(CPU reservation))), where (current time) is the time at which the steps are being performed (here 0); (CPU reservation enforcement period) is a constant period of time over which CPU reservations specified in time-general scheduling constraints are observed by the scheduler, preferably set at or near 1 millisecond (ms) or 1000 microseconds ($\mu$s); and (CPU reservation) is the CPU reservation value of the thread data structure (such as CPU reservation 1125, 30% or 0.3). For the sample thread, therefore, the restart time 1131 is (0+1000×(1−0.3)) $\mu$s=700 $\mu$s.

The scheduler preferably sets the criticality (such as criticality 1132) of the urgency data structure to not critical ("no"), since time-general scheduling constraints are not generally considered to be critical by the scheduler. The thread data structure 1120 further includes an inherited urgency component 1123, which preferably contains a reference to the effective urgency component (discussed below) of the thread data structures for any threads from which the thread inherits urgency. For clarity, however, the thread identifiers of threads from which this thread inherits urgency are shown instead of such references. The thread data structure 1120 further includes a cached effective urgency component, in which is cached the highest urgency that applies to the thread. The cached effective urgency component is composed of a restart time and a criticality, and is identified by determining the highest urgency represented by the top individual urgency data structure 1130 and the cached effective urgencies of any threads from which this thread inherits urgency. The cached effective urgency is preferably invalidated and recalculated when the highest urgency among the individual and inherited urgencies changes. In step 1205, the scheduler copies the new top urgency data structure to the cached effective urgency (such as cached effective urgency 1124). The steps shown in FIG. 12 then conclude. The thread data structure 1120 further contains a blocked-on resources component 1126 and an owned resources component 1127, which identify resources that are blocked-on and owned by the thread, respectively.

FIG. 11 further shows a time-specific scheduling constraint 1140 submitted to the scheduler for the sample thread. The time-specific scheduling constraint 1140 specifies a thread identifier 1141 identifying the thread (in the case of the sample thread, "A"), a deadline 1142 (in the case of the sample thread, 900 $\mu$s), an estimate 1143 (in the case of the sample thread, 600 $\mu$s), a criticality 1144 (in the case of the sample thread, "no"), and optionally, a start time 1145 before which the thread should not be further executed. In response to receiving the time-specific scheduling constraint 1140, the scheduler modifies thread data structure 1120 to create thread data structure 1120'.

FIG. 13 is a flow diagram showing the steps preferably performed by the scheduler to modify a thread data structure when the scheduler receives a time-specific scheduling constraint. In step 1301, if the new time-specific constraint is impossible to complete, then the scheduler returns failure for the submission of the time-specific scheduling constraint, else the scheduler continues in step 1302. In a first preferred embodiment, the scheduler makes the determination in step 1301 by determining whether it would be impossible to complete the time-specific scheduling constraint within the bounds of the thread's time-general scheduling constraint. For example, if a time-specific scheduling constraint that would require 70% of the processing time before its deadline is submitted for a thread having a 15% CPU reservation, the time-specific scheduling constraint is impossible to complete within the thread's time-general scheduling constraint. In a second preferred embodiment, the scheduler makes the determination in step 1301 by determining whether it would be impossible to complete the time-specific scheduling constraint utilizing a larger percentage of processor time than is specified by the CPU reservation of the thread's time-general scheduling constraint.

In step 1302, the scheduler pushes a new urgency structure (such as new urgency structure 1150) onto the top of the individual urgency stack (such as individual urgency stack 1122'). In step 1303, the scheduler sets the restart time (such as restart time 1151) of the new top urgency structure (such as the new top urgency structure 1150) to a time given by the expression (deadline)−(estimate).

For the sample thread, therefore, the restart time 1151 is (900−600)μs=300 μs.

In step 1304, the scheduler sets the criticality (such as criticality 1152) of the new top urgency data structure (such as the new top urgency data structure 1150) to the criticality (such as criticality 1144) of the time-specific scheduling constraint (such as time-specific scheduling constraint 1140). In step 1305, if the urgency represented by the new top urgency data structure is higher than the cached effective urgency for the thread, then the scheduler continues at step 1306 to replace the cached effective urgency with the new top urgency data structure. In step 1307, if a start time is specified in the time-specific scheduling constraint, then the scheduler continues at step 1308. In step 1308, the scheduler moves the thread data structure for this thread to a sleeping list, which contains any thread that has made an implicit or explicit request to "sleep," or not be scheduled for execution, until a future time. In step 1308, the scheduler further sets the time at which the thread will be woken and moved from the sleeping list to the ready list as the start time specified in the time-specific scheduling constraint. The scheduler then returns success for the submission of the time-specific scheduling constraint, and the steps shown in FIG. 13 conclude. When the scheduler receives multiple time-specific scheduling constraints for the same thread, it nests urgency data structures corresponding to each time-specific scheduling constraint on the individual urgency stack for the thread.

Figure 14:
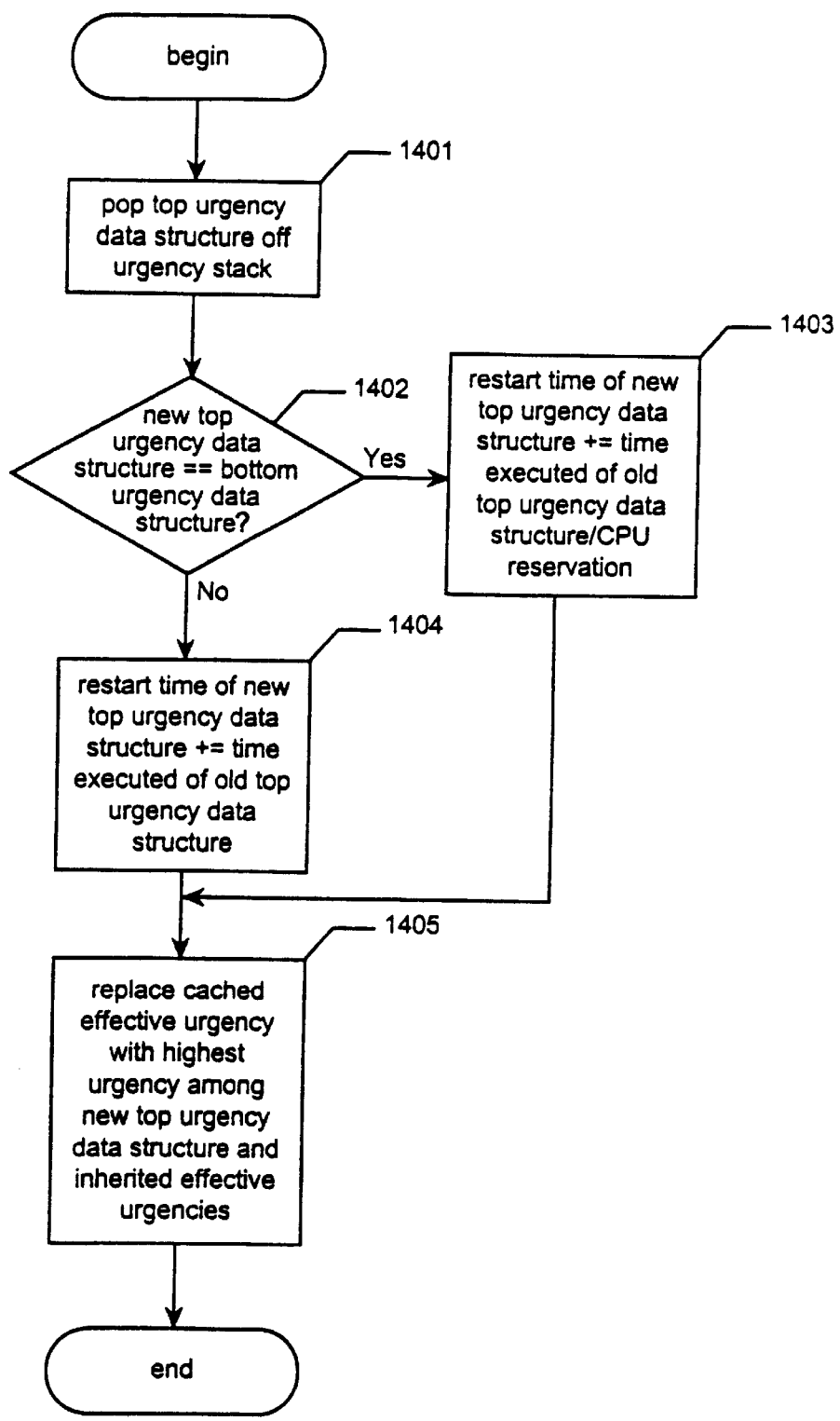
FIG. 14 is a flow diagram showing the steps preferably performed by the scheduler to withdraw a time-specific scheduling constraint when the scheduler receives a request to do so.

FIG. 14 is a flow diagram showing the steps preferably performed by the scheduler to withdraw a time-specific scheduling constraint when the scheduler receives a request to do so. A thread submits such a request when it completes the execution of the block of code to which the time-specific scheduling constraint corresponds. In step 1401, the scheduler pops the top urgency data structure off of the individual urgency stack for the thread identified in the request to withdraw the time-specific scheduling constraint. In step 1402, if the new top urgency data structure on the individual urgency stack is also the bottom urgency data structure on the individual urgency stack, and is therefore the urgency data structure corresponding to the time-general scheduling constraint, then the scheduler continues in step 1403, else the new top urgency data structure corresponds to a time-specific scheduling constraint and the scheduler continues in step 1404. In step 1403, the scheduler increments the restart time of the new top urgency structure (corresponding to the time-general scheduling constraint) by the time executed for the old top urgency data structure divided by the CPU reservation for the thread. In step 1404, the scheduler increments the restart time of the new top urgency structure (corresponding to a time-specific scheduling constraint) by the time executed for the old top urgency data structure. In step 1405, the scheduler replaces the cached effective urgency of the thread with the highest urgency among the thread's new top urgency data structure and the inherited effective urgencies. After step 1405, the steps shown in FIG. 14 conclude.

Figure 15A:
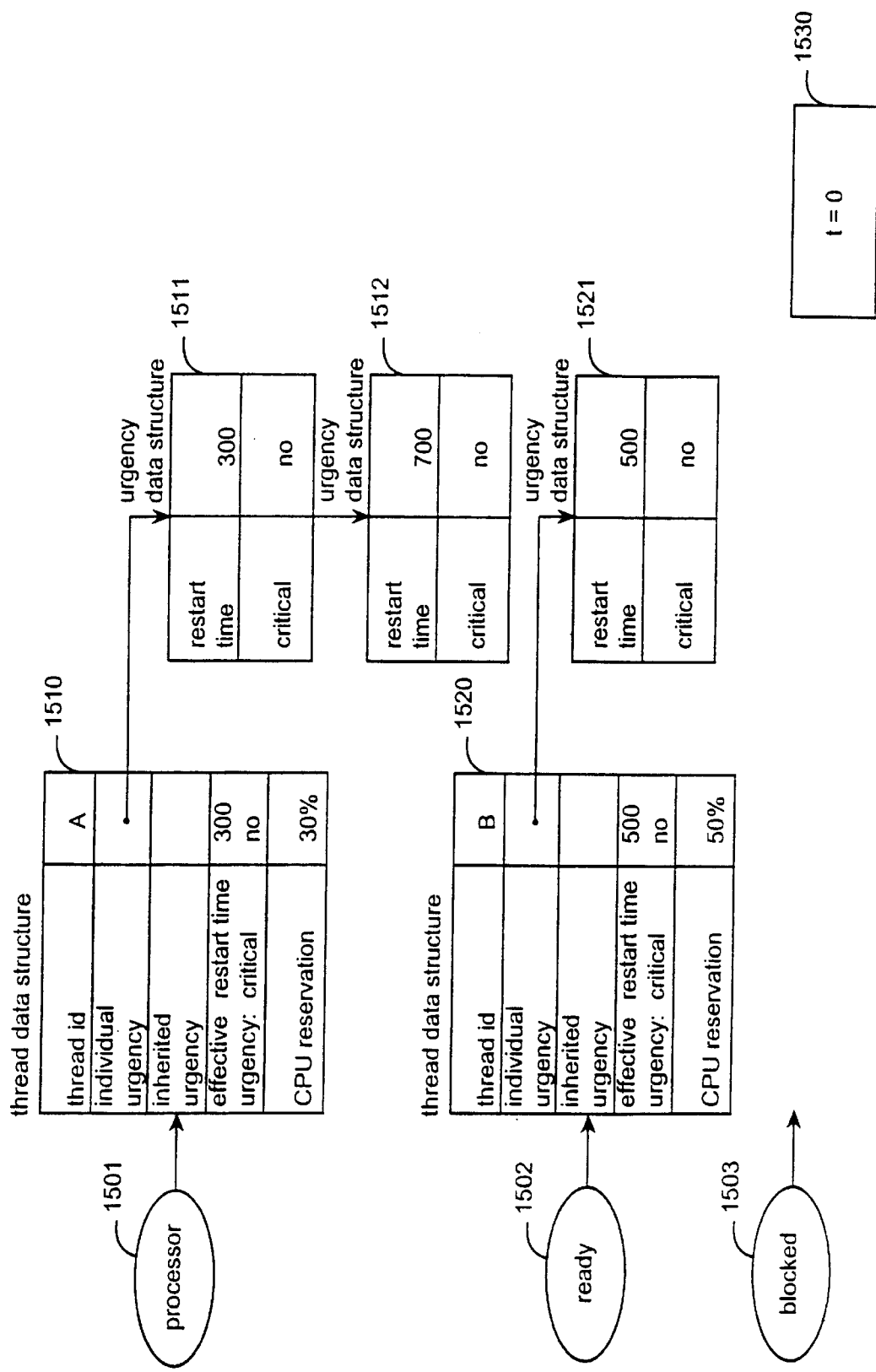
FIGS. 15A–15M are data structure diagrams showing the contents of the scheduling status data structure at various times during the scheduling of two sample threads.

The facility equitably schedules both threads for which time-specific scheduling constraints have been submitted and threads for which time-specific scheduling constraints have not been submitted. FIGS. 15A–15M are data structure diagrams showing the contents of the scheduling status data structure at various times during the scheduling of two sample threads. FIG. 15A is a data structure diagram showing the initial contents of the scheduling status data structure. The scheduling status data structure comprises three linked lists of thread data structures: a processor list 1501 containing the one thread presently being executed on the processor; a blocked list 1503 containing the threads that are blocked on one or more resources; and a ready list 1502 containing any thread not on the processor list or the blocked list, i.e., any thread that is ready to execute but not currently executing. The scheduling status data structure also preferably contains a sleeping list (not shown) containing threads that have requested to sleep until a specified future wake-up time. At the specified future wake-up time, the scheduler preferably moves such a thread from the sleeping list to the ready list. In computer systems in which the scheduler is scheduling multiple processors, the scheduler preferably maintains one processor list like processor list 1501 for each such processor. For n such processors, the processor lists together contain the n most urgent ready threads.

The thread data structures shown on lists 1501, 1502, and 1503 and their urgency data structures are abbreviated to show only their relevant components. The diagram shows that the thread data structure 1510 for thread A is on the processor list, and the thread data structure 1520 for thread B is on the ready list. Thread A has a CPU reservation of 30%, does not have any inherited urgencies, and is operating under a time-specific scheduling constraint. Its restart time is 300 μs, and it is not critical. Thread B has a higher CPU reservation of 50%, it does not have any inherited urgencies, its restart time is 500 μs, and it is not critical. A current time indication 1530 shows that FIG. 15A represents the contents of the scheduling status data structure at time 0 μs.

Figure 16:
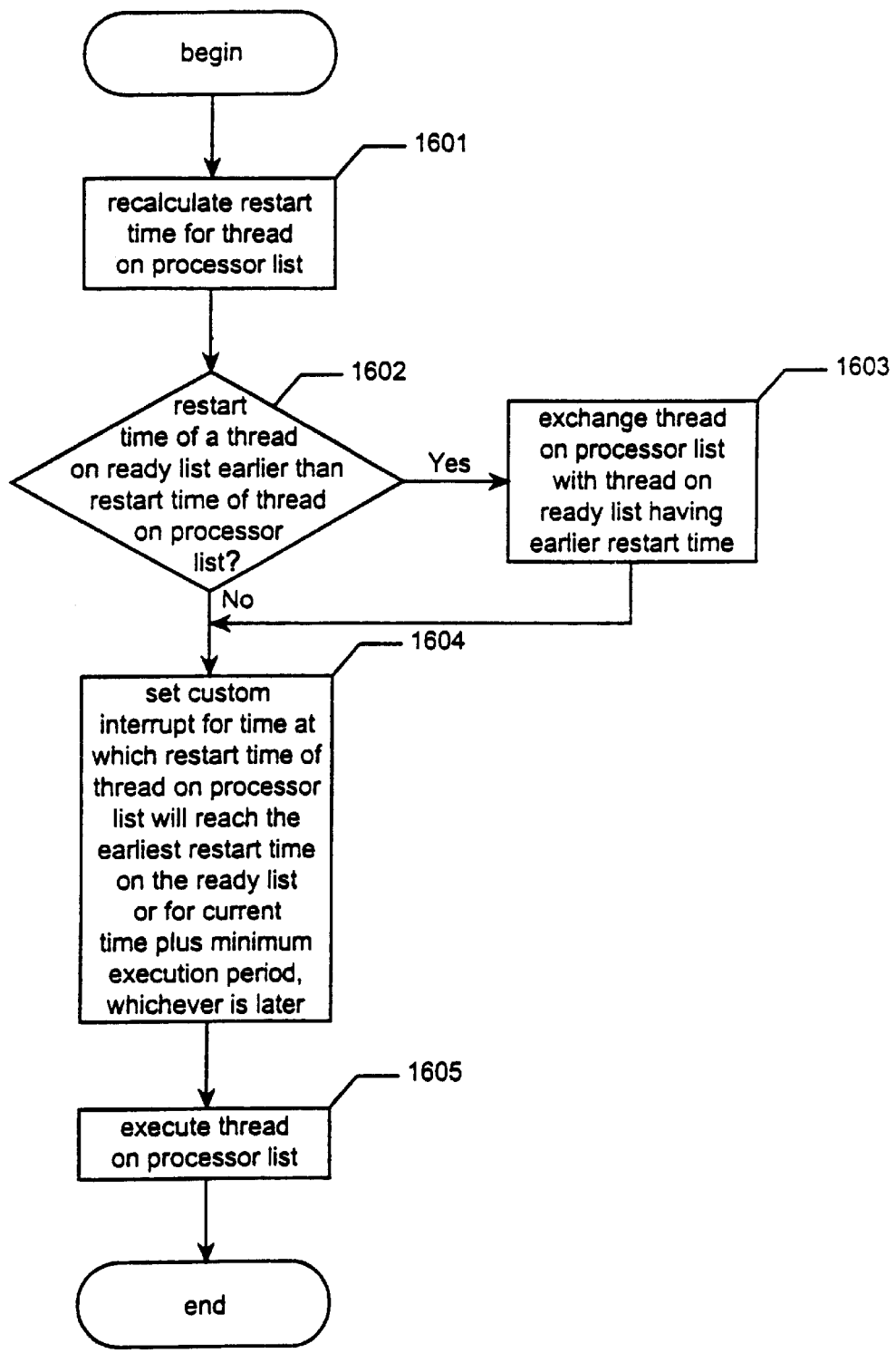
FIG. 16 is a flow diagram showing the steps preferably performed by the scheduler to update the scheduling status data structure.

FIG. 16 is a flow diagram showing the steps preferably performed by the scheduler to update the scheduling status data structure. The scheduler preferably performs the steps shown in FIG. 16 when an event occurs that could make a thread a thread ready or increase its urgency. Such events include the submission or withdrawal of a scheduling constraint for a new or existing thread and the release of a resource, including the signaling of a condition. In cases in which the scheduler is scheduling multiple processors, the steps shown in FIG. 16 are performed at different times for each such processor. In cases in which the scheduler is scheduling multiple processors and an event that could make a thread ready occurs on a processor other than the processor that is executing the lowest-urgency thread, however, instead of self-performing the steps shown in FIG. 16, the processor on which the event occurs preferably directs an inter-processor interrupt to the processor that is executing the lowest urgency thread, causing the processor that is executing the lowest urgency thread to perform the steps shown in FIG. 16. In step 1601, the scheduler recalculates the restart time for the thread on the processor list. If the top urgency data structure on the individual urgency stack for the thread on the processor list is also the bottom urgency data structure on the individual urgency stack, this urgency data structure corresponds to the thread's time-general scheduling constraint, and its restart time is incremented in step 1601 by a time given by the expression (time executed)/(CPU reservation), where (time executed) is the time that the thread executed since the last time its restart time was recalculated, and where (CPU reservation) is the CPU reservation value of the thread. If, on the other hand, the top urgency data structure on the individual urgency stack for the thread on the processor list is not also the bottom urgency data structure on the individual urgency stack, this top urgency data structure corresponds to a time-specific scheduling constraint, and the thread's restart time is incremented in step 1601 by a time given by the expression (time executed).

In step 1602, if the earliest restart time among the threads on the ready list is earlier than the restart time of the thread on the processor list, then the scheduler continues at step 1603, else the scheduler continues at step 1604. In step 1603, the scheduler moves the thread on the processor list to the ready list, and moves the thread having the earliest restart time on the ready list to the processor list. In step 1604, the scheduler sets a custom interrupt to interrupt the execution of the thread on the processor list to allow a different thread to be executed. The scheduler sets the custom interrupt for the later of: (1) the time at which the restart time of the thread on the processor will exceed the next earliest restart time among the threads on the ready list (2) the current time plus a minimum execution period. The minimum execution period is preferably chosen short enough so that the ready threads all execute within a reasonably short period of time and long enough to minimize the processor time expended on executing the steps shown in FIG. 16. The minimum execution period is therefore preferably chosen at or near 100 $\mu$s. In step 1605, the scheduler executes the thread on the processor list. The steps shown in FIG. 16 then conclude. While the thread on the processor list is executing, the custom interrupt could occur, causing the scheduler to again perform the steps shown in FIG. 16. Alternatively, the thread on the processor list could block on or release a resource, causing the scheduler to perform the steps shown in FIGS. 19 and 20 respectively, which are discussed in greater detail below.

Because the restart time of thread A, 300 $\mu$s, is earlier than the restart time of thread B, 500 $\mu$s, the scheduler retains thread A on the processor list and sets a custom interrupt for the time at which the restart time of thread A will be later than the restart time of thread B. Because thread A is operating under a time-specific scheduling constraint, after it is executed, the scheduler increments its restart time by (time executed).

In order to advance thread A's restart time to 500 $\mu$s, the scheduler executes thread A for 200 $\mu$s (target restart time 500 $\mu$s−current restart time 300 $\mu$s). The scheduler therefore sets a custom interrupt for 200 $\mu$s in the future, or t=200 $\mu$s (t=current time 0 $\mu$s+200 $\mu$s).

Figure 15B:
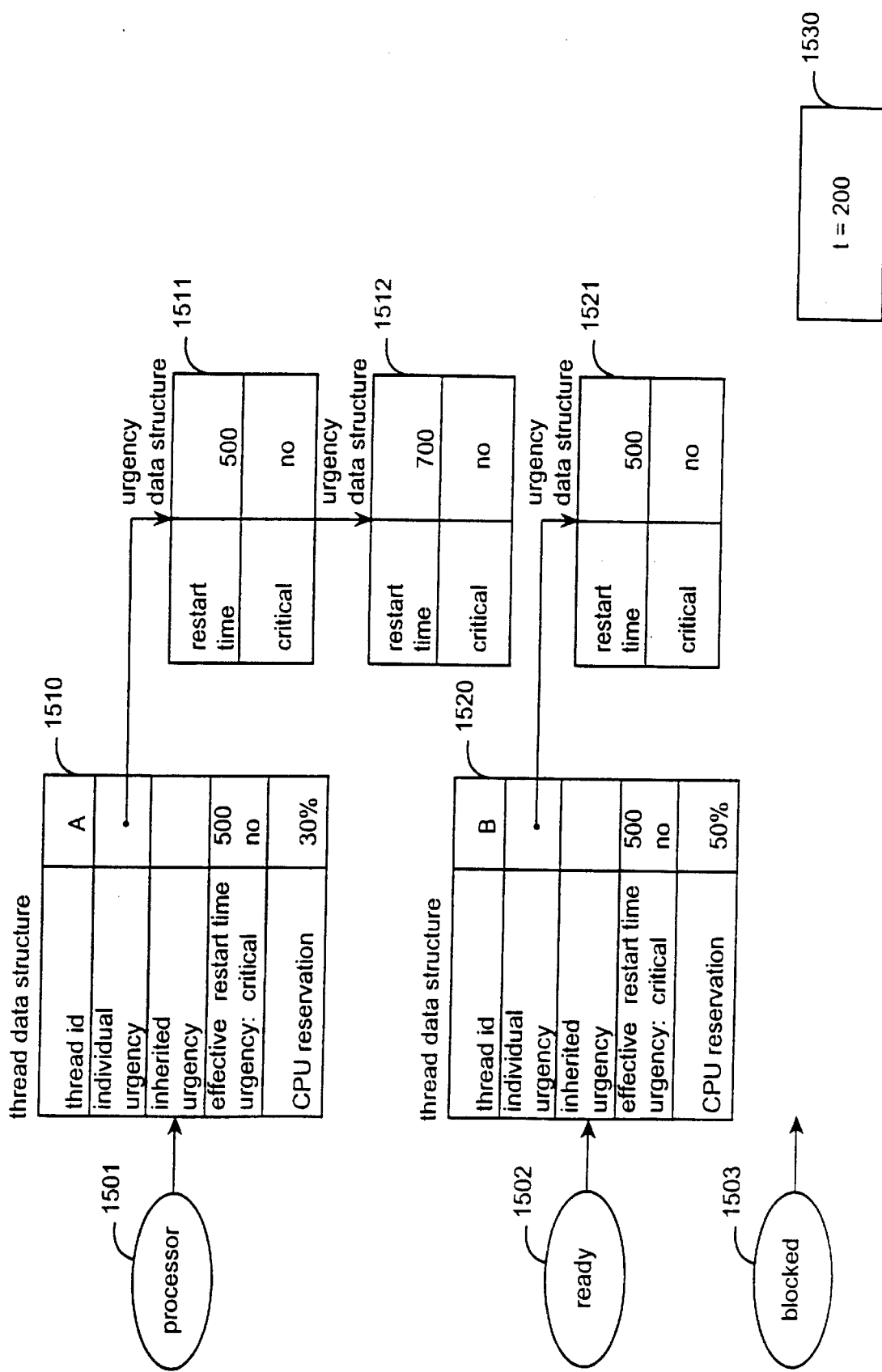

FIG. 15B is a data structure diagram showing the scheduling status data structure after the scheduler has executed thread A for 200 $\mu$s. FIG. 15B shows that, after executing thread A for 200 $\mu$s, the scheduler has incremented thread A's restart time by 200 $\mu$s to 500 $\mu$s.

Figure 17:
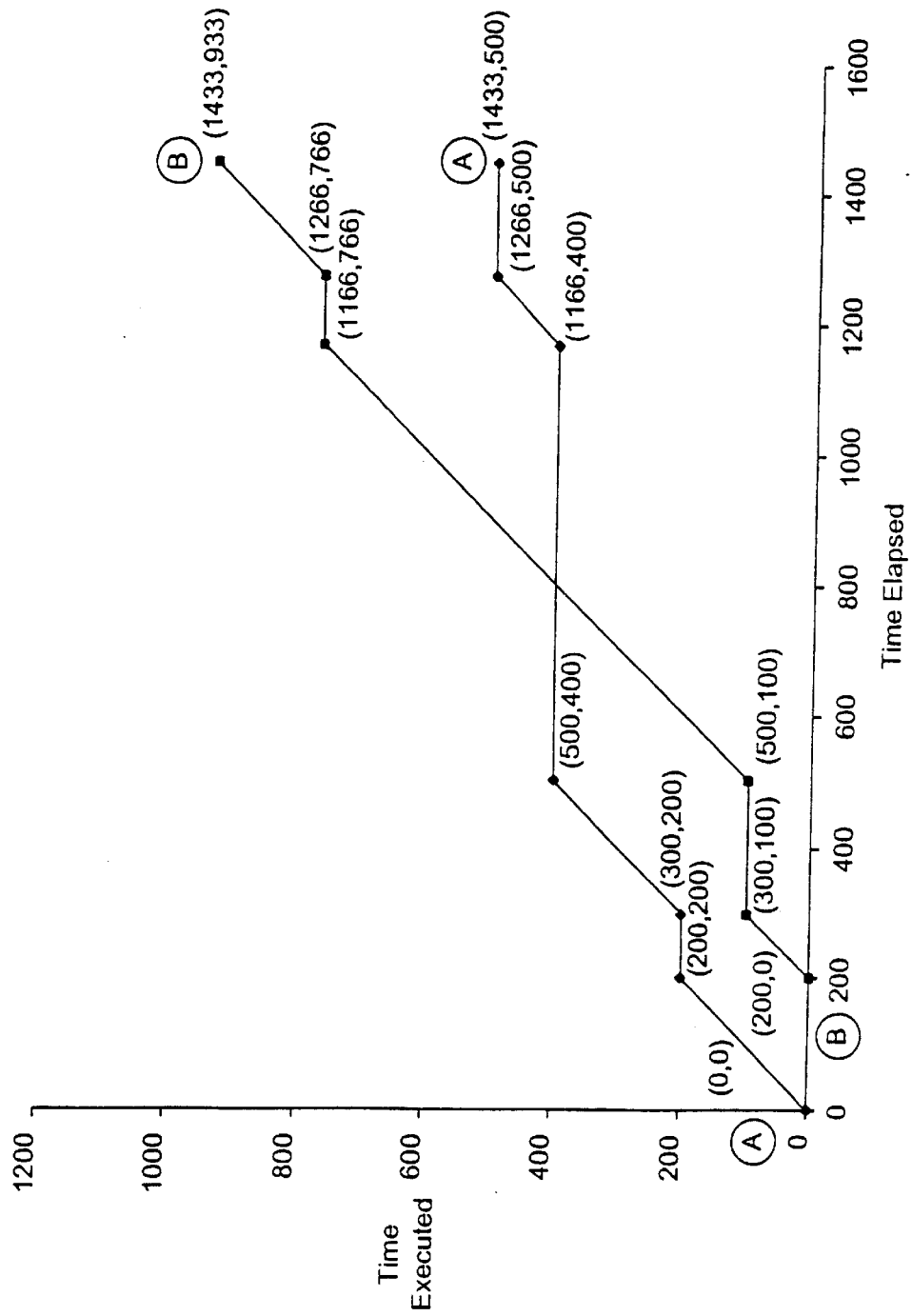
FIG. 17 is a timing graph showing the time executed of the threads whose scheduling is shown in FIGS. 15A–15M.

FIG. 17 is a timing graph showing the time executed of the threads whose scheduling is shown in FIGS. 15A–15M. The graph shows time executed on the vertical axis versus time elapsed on the horizontal axis for threads A and B. While a thread is being executed (i.e., on the processor list), its time executed grows at the same rate as time elapsed. For example, while thread A is executing during the period of t=0 to 200 $\mu$s, its time executed increases from 0 $\mu$s to 200 $\mu$s. While a thread is not being executed (e.g., on the ready list), its time executed remains constant. For example, while thread A is not being executed during the period of t=200 to 300 $\mu$s, its time executed remains at 200 $\mu$s. The graph conveys time executed data from the scheduling example shown in FIGS. 15A–15M in this manner as an overview of the example.

Figure 15C:
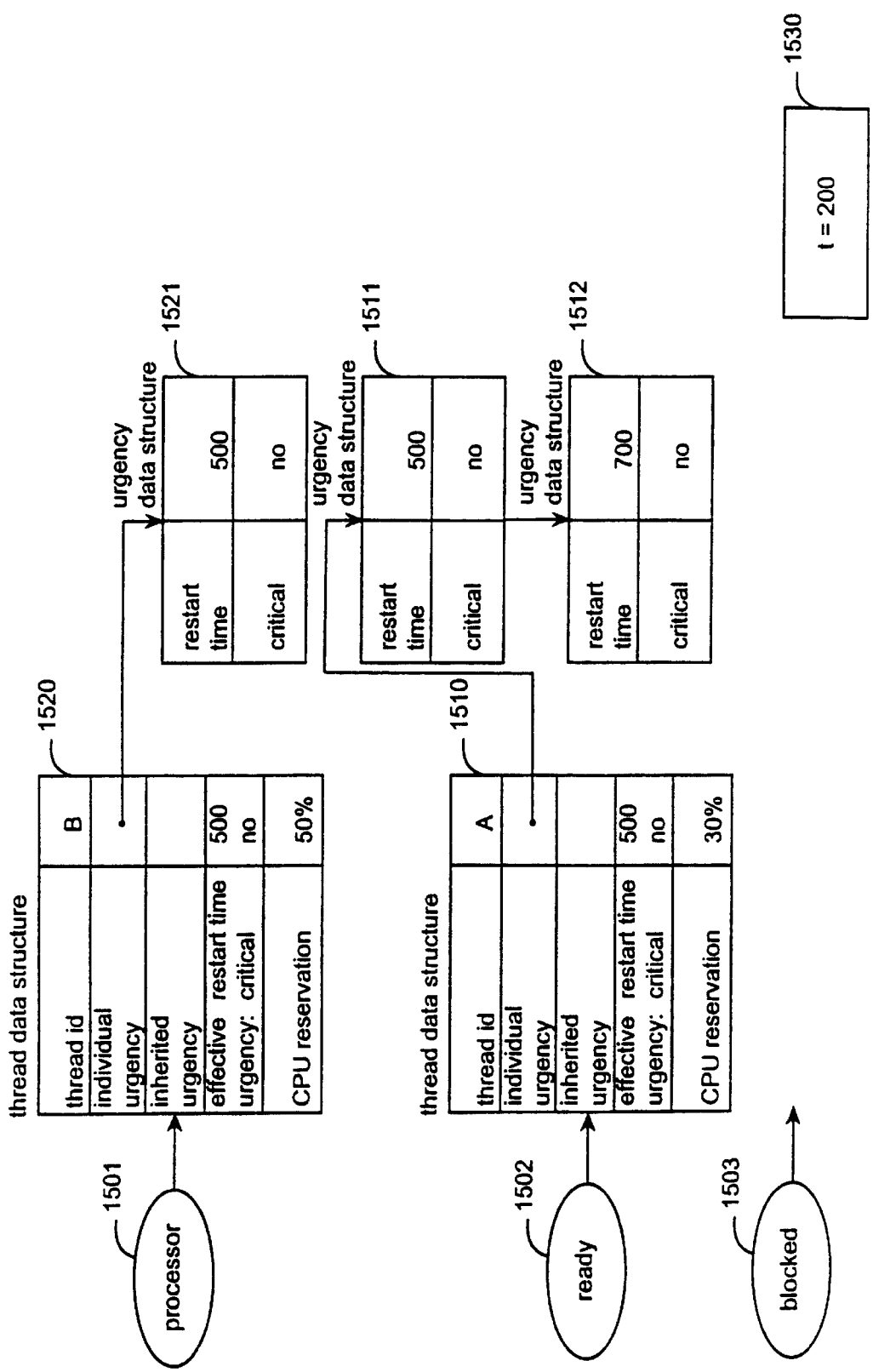
Figure 15D:
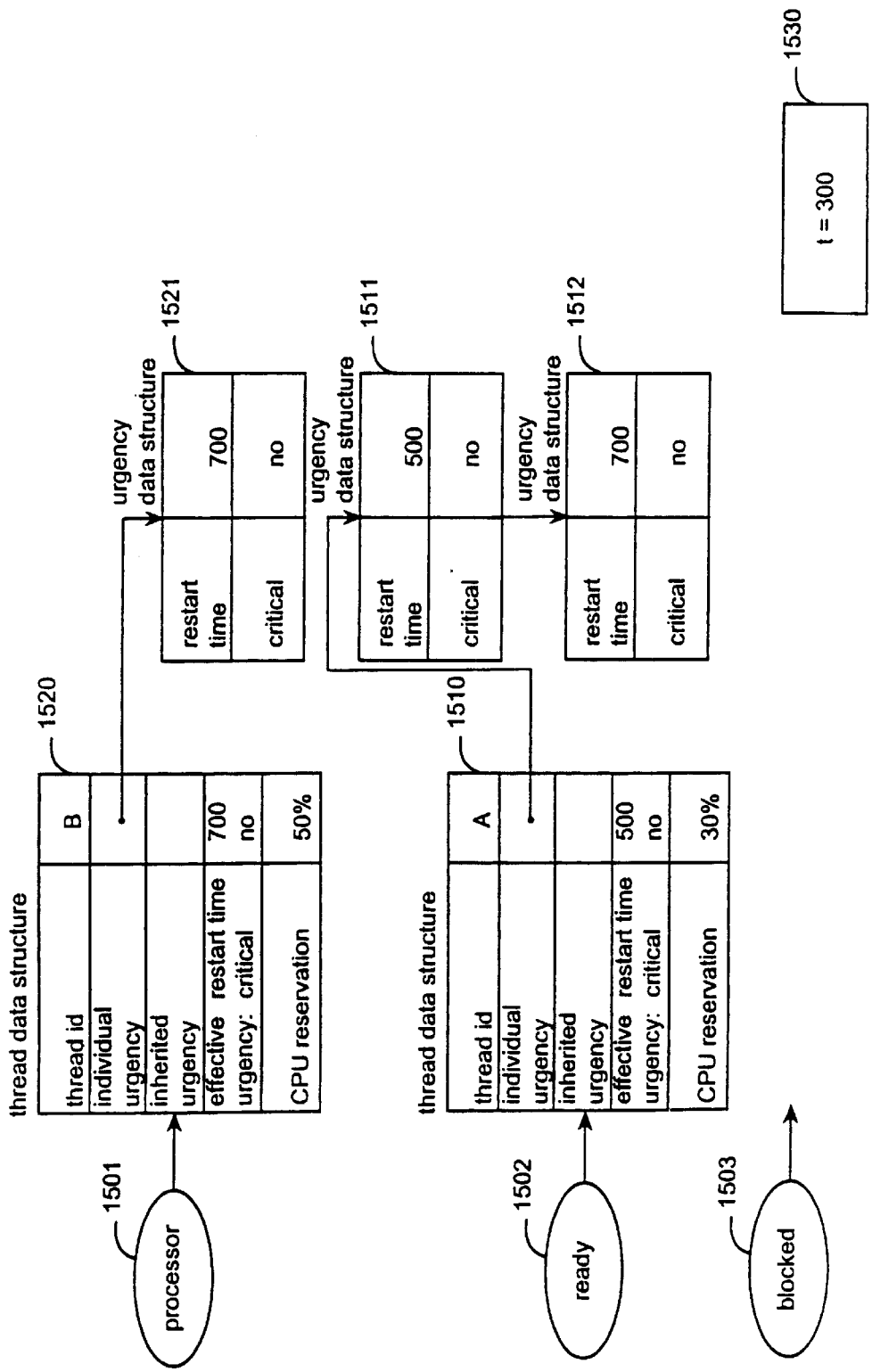

FIG. 15C is a data structure diagram showing the scheduling status data structure after the scheduler has moved thread B from the ready list to the processor list and thread A from the processor list to the ready list. FIG. 15D is a data structure diagram showing the scheduling status data structure after the scheduler has executed thread B for the minimum execution period, 100 $\mu$s (at t=200 $\mu$s setting a custom interrupt for t=300 $\mu$s). At t=200 $\mu$s, the scheduler has incremented thread B's restart time by, because B is not subject to a time-specific scheduling constraint, (time executed)/(CPU reservation), or 100 $\mu$s/50%=200 $\mu$s, from 500 $\mu$s to 700 $\mu$s.

Figure 15E:
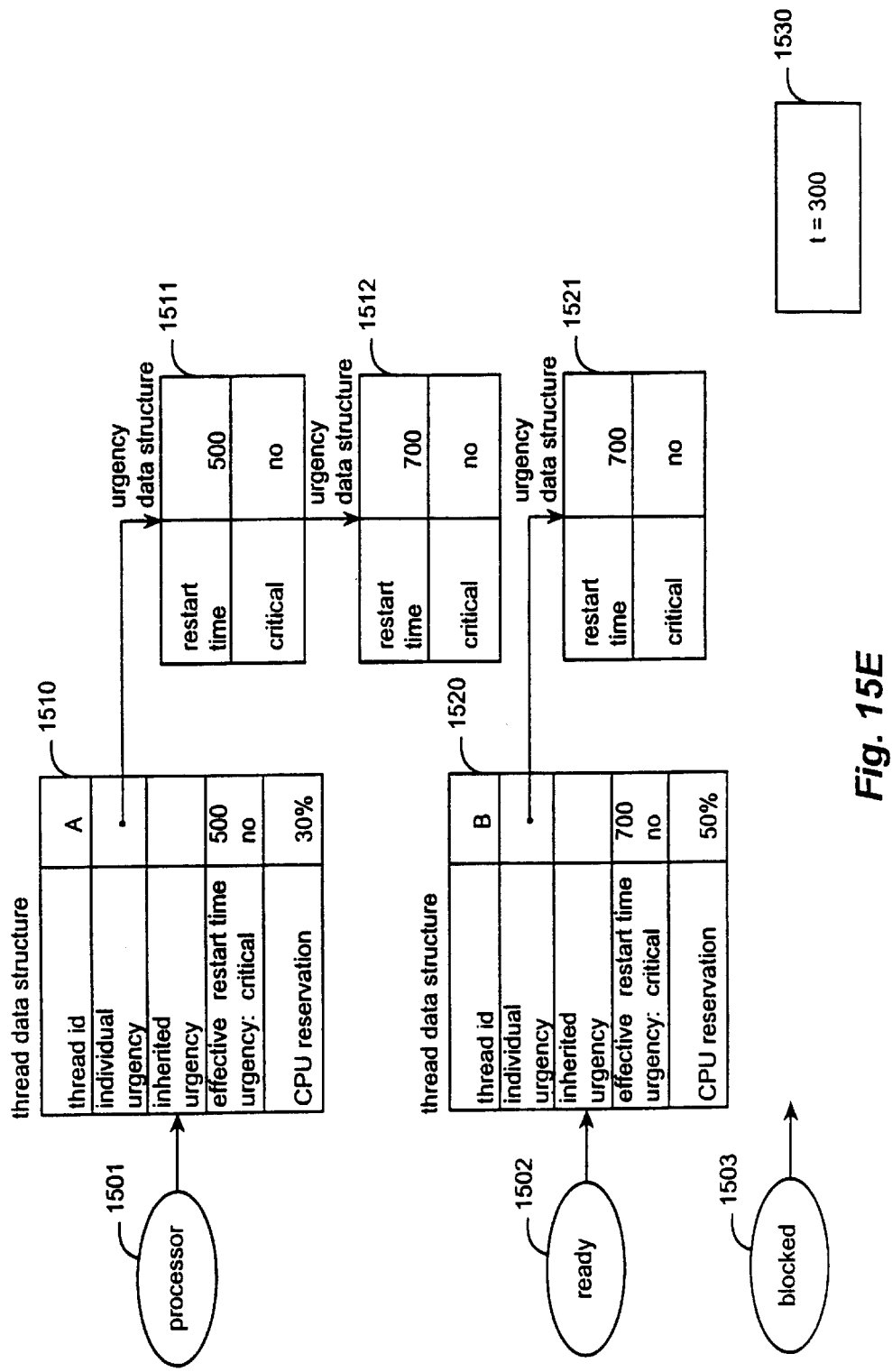
Figure 15F:
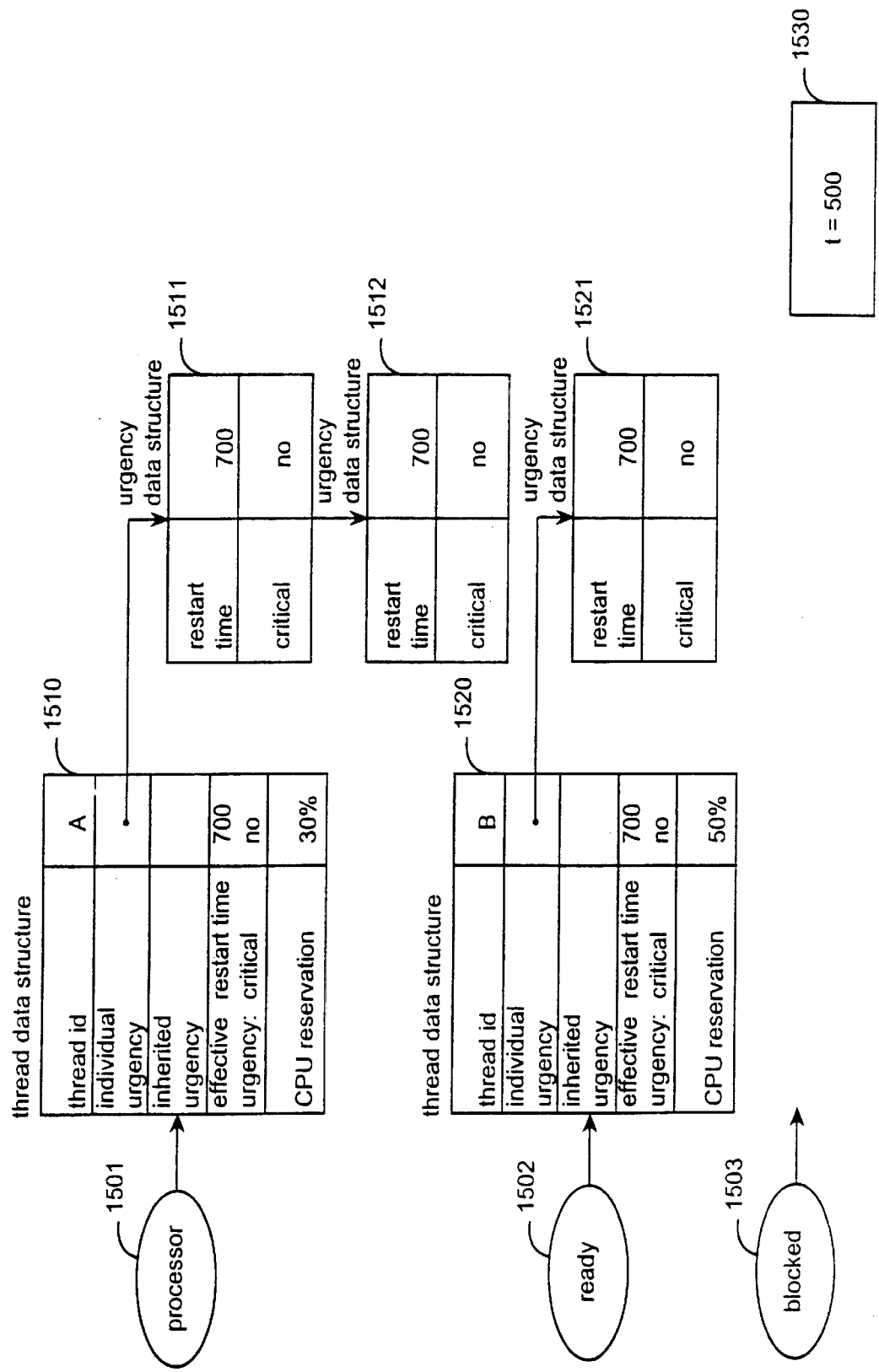

FIG. 15E is a data structure diagram showing the scheduling status data structure after the scheduler has moved thread A from the ready list to the processor list and thread B from the processor list to the ready list. FIG. 15F is a data structure diagram showing the scheduling status data structure after the scheduler has executed thread A for 200 $\mu$s to increase the restart time of thread A from 500 $\mu$s at t=300 $\mu$s to 700 $\mu$s at t=500 $\mu$s.

Figure 15G:
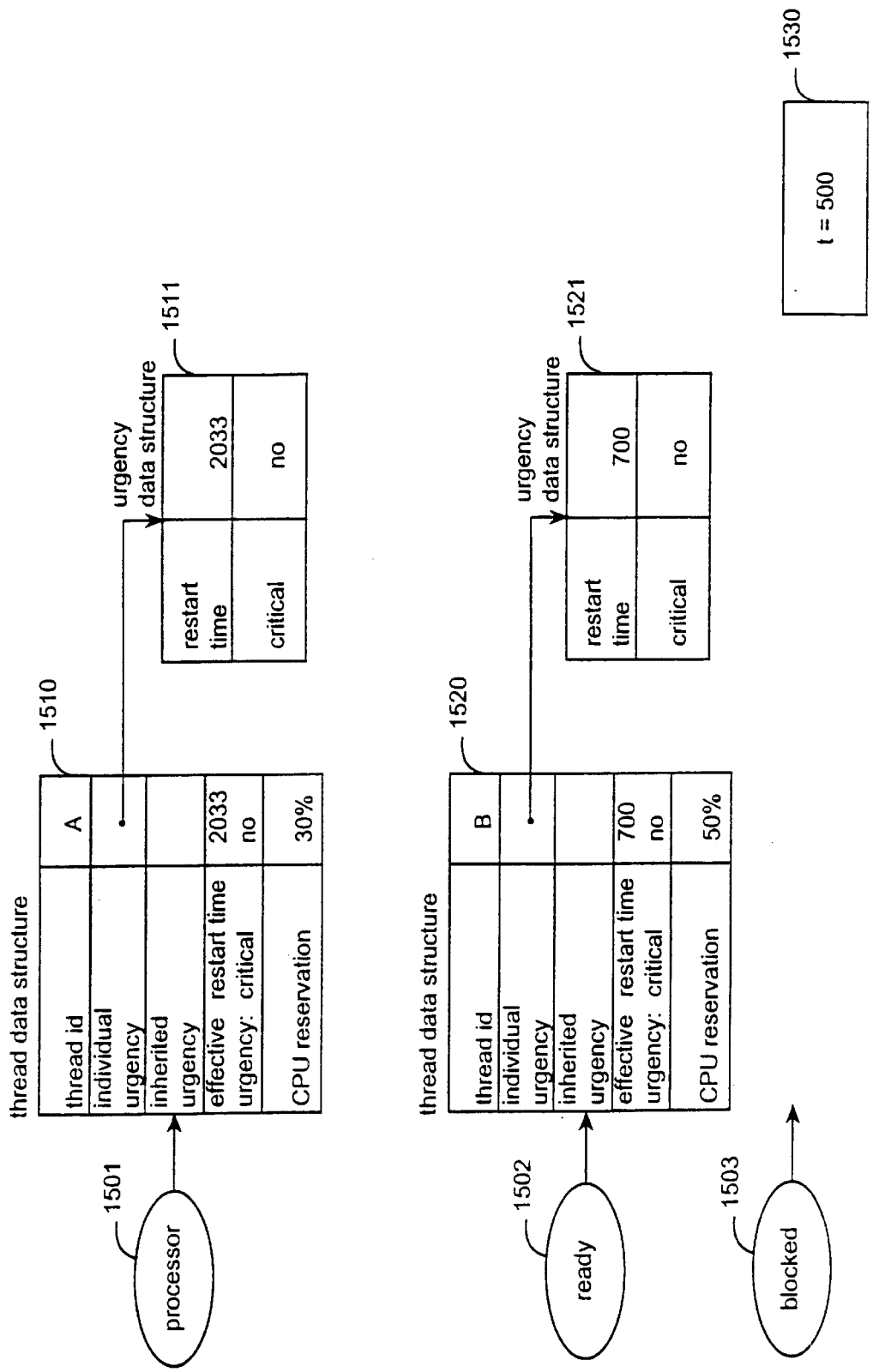

At t=500 $\mu$s, thread A completes its time-specific scheduling constraint. FIG. 15G is a data structure diagram showing the scheduling status data structure after the scheduler has removed the urgency data structure corresponding to thread A's only time-specific scheduling constraint and adjusted the remaining urgency data structure accordingly. FIG. 15G shows that the scheduler incremented the restart time of the bottom urgency data structure of thread A's individual urgency stack by (time executed)/(CPU reservation), or 400 $\mu$s/30%=1333 $\mu$s, from 700 $\mu$s to 2033 $\mu$s.

Figure 15H:
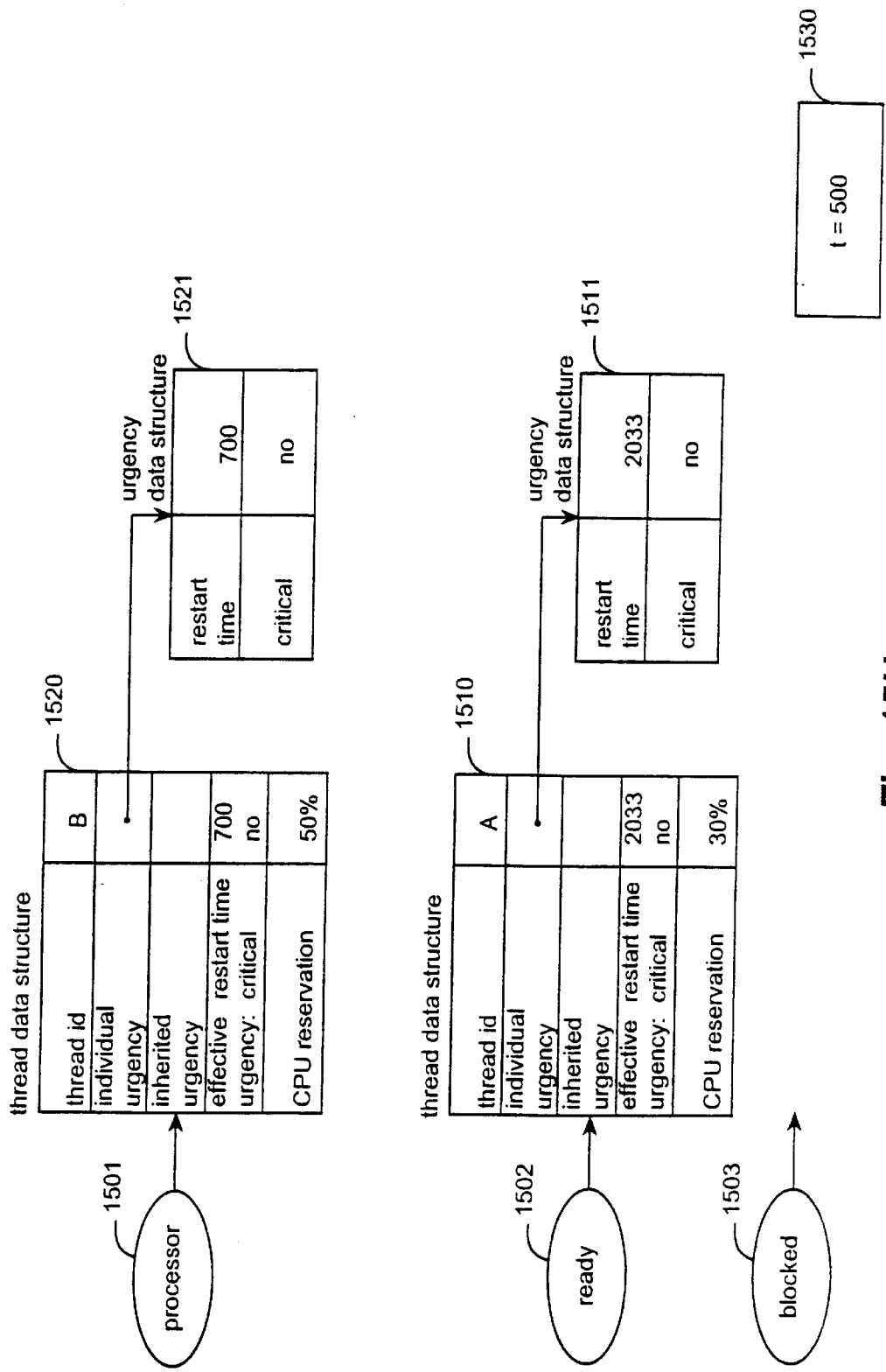
Figure 15I:
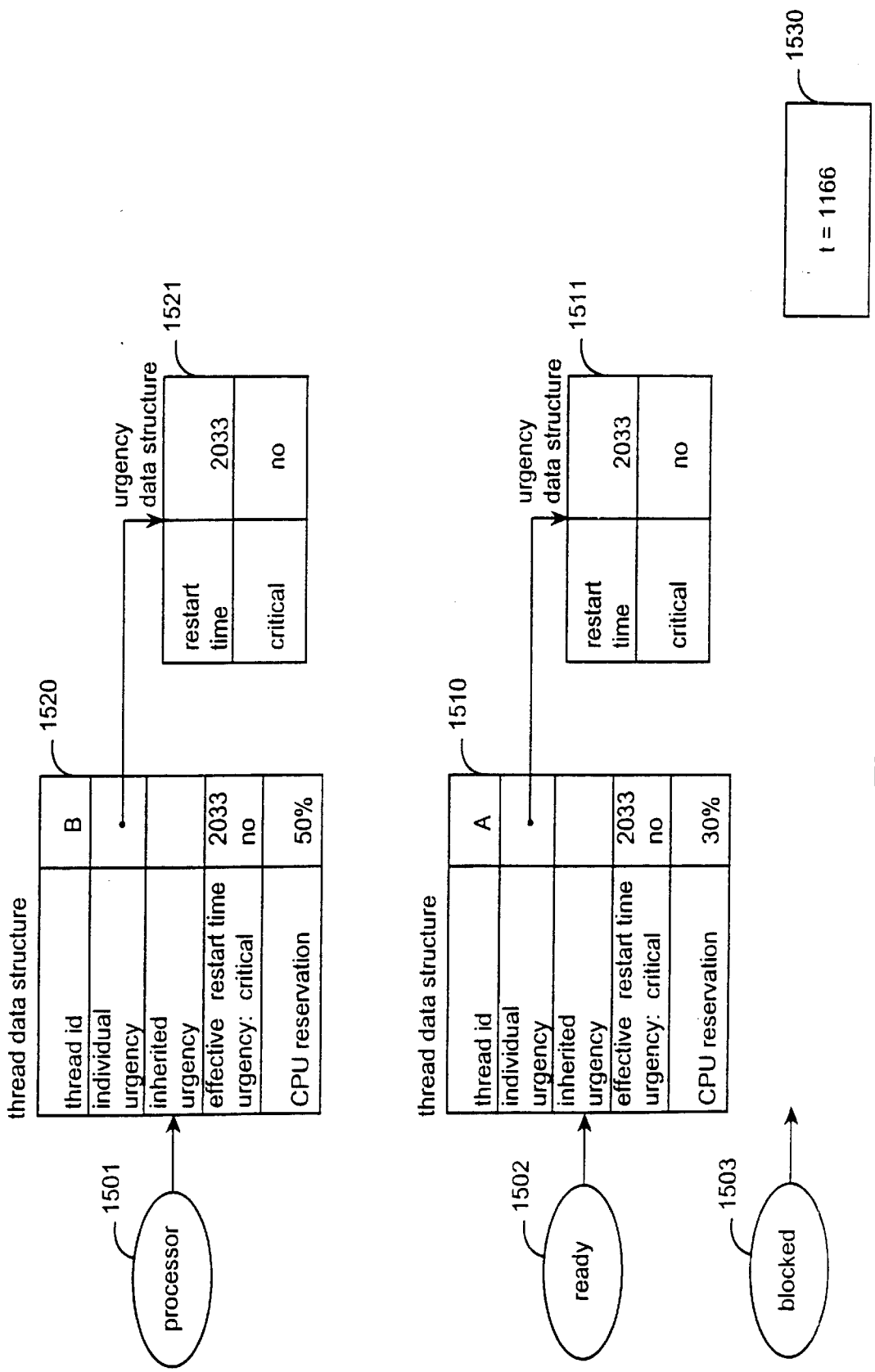

FIG. 15H is a data structure diagram showing the scheduling status data structure after the scheduler has moved thread B from the ready list to the processor list and thread A from the processor list to the ready list. FIG. 15I is a data structure diagram showing the scheduling status data structure after the scheduler has executed thread B for 666 $\mu$s to increase the restart time of thread B by 1333 $\mu$s (666 $\mu$s/50%), from 700 $\mu$s at t=500 $\mu$s to 2033 $\mu$s at t=1166 $\mu$s.

Figure 15J:
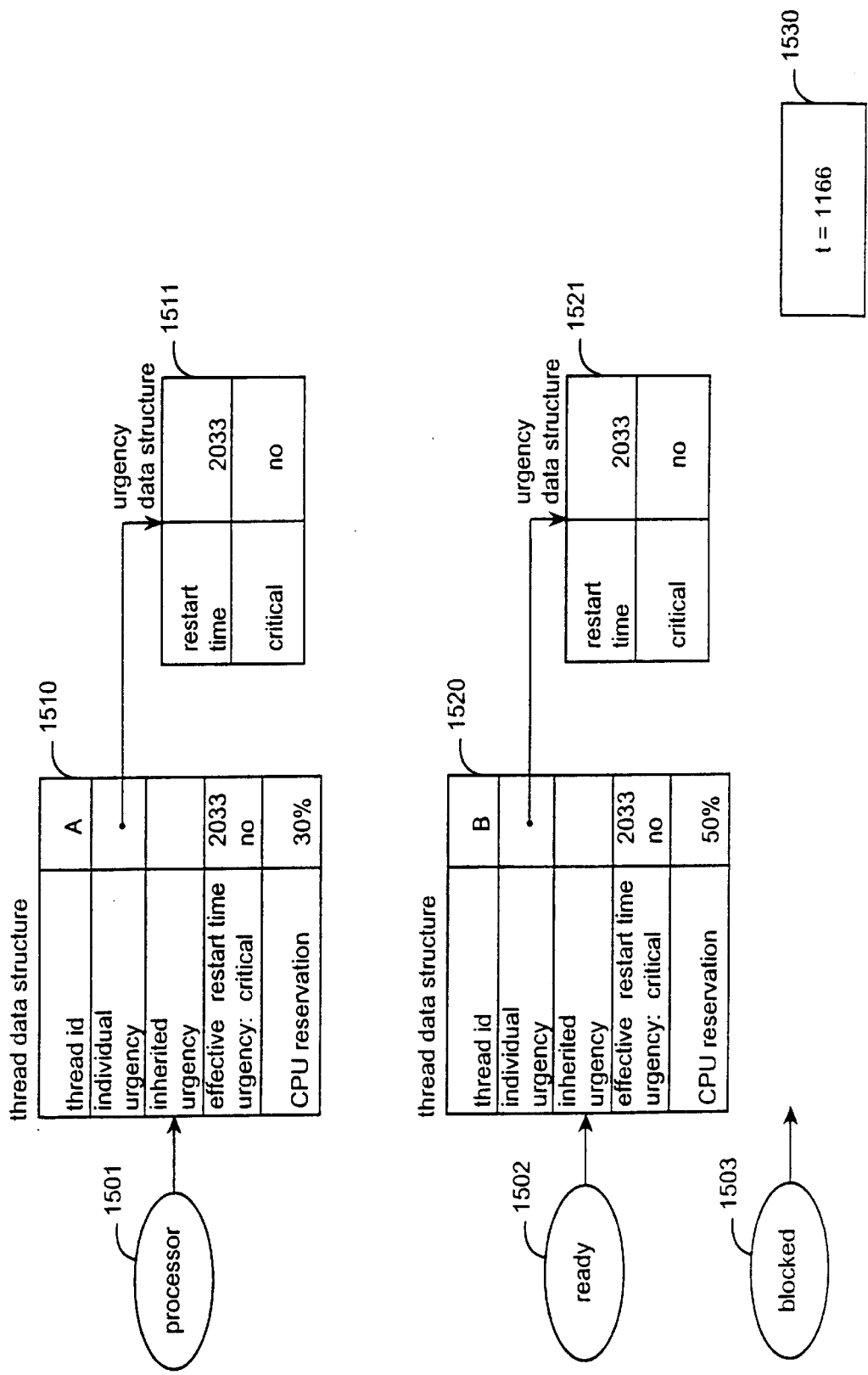
Figure 15K:
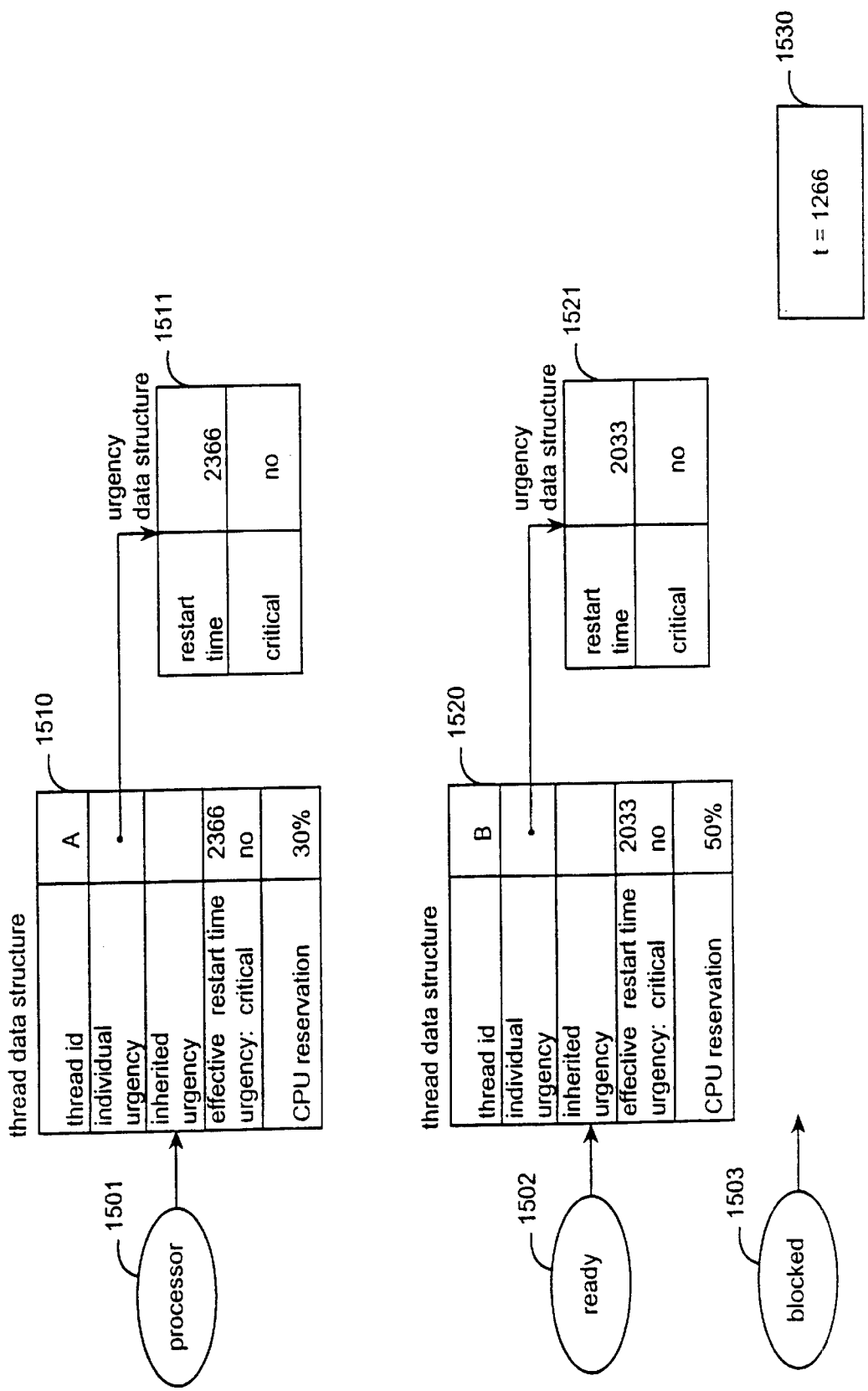

FIG. 15J is a data structure diagram showing the scheduling status data structure after the scheduler has moved thread A from the ready list to the processor list and thread B from the processor list to the ready list. FIG. 15K is a data structure diagram showing the scheduling status data structure after the scheduler has executed thread A for the minimum execution period, 100 $\mu$s. FIG. 15K shows that the scheduler has incremented thread A's restart time by 333 $\mu$s (100 $\mu$s/30%), from 2036 $\mu$s at t=1166 $\mu$s to 2366 $\mu$s at t=1266 $\mu$s.

Figure 15L:
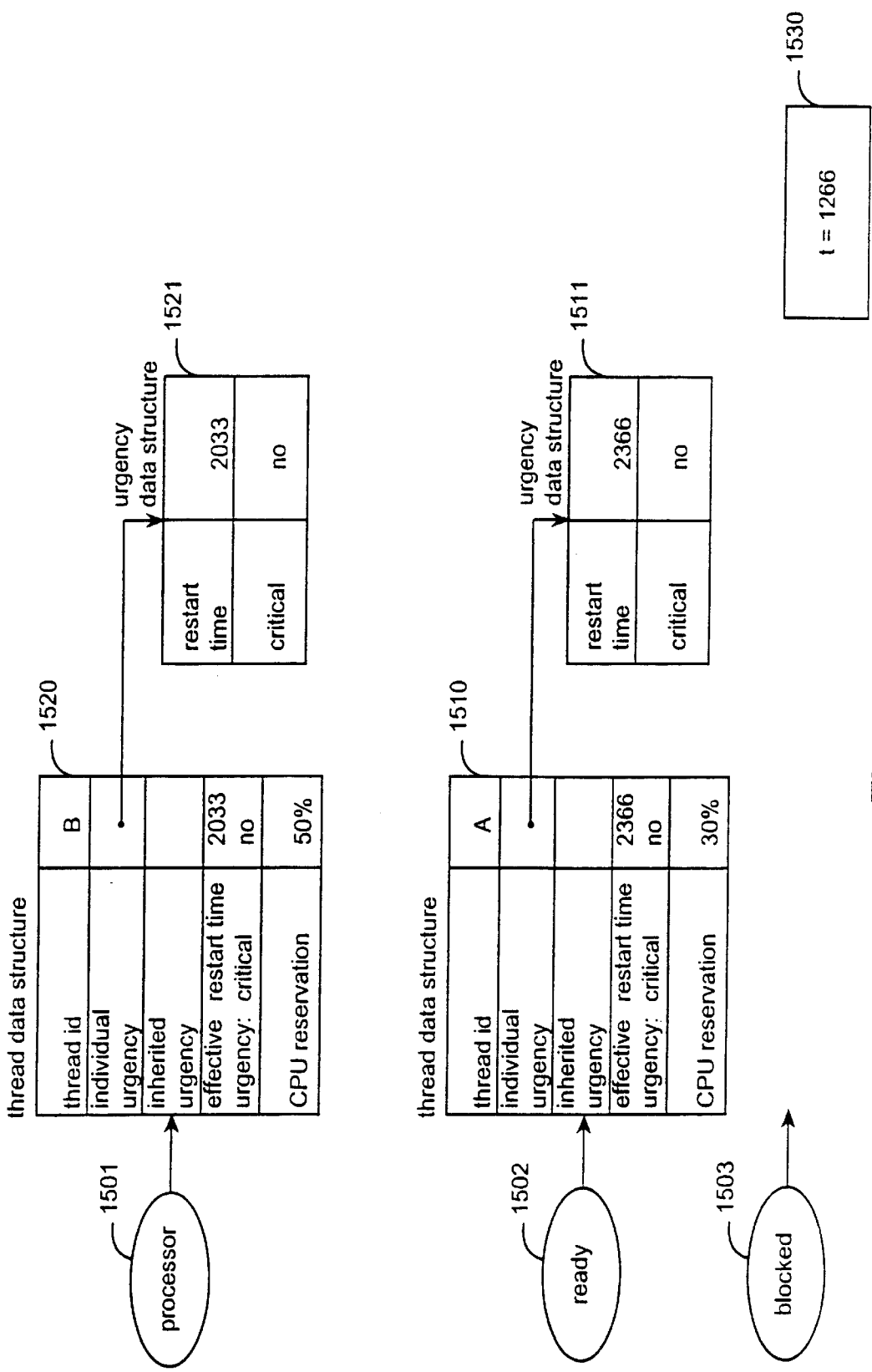
Figure 15M:
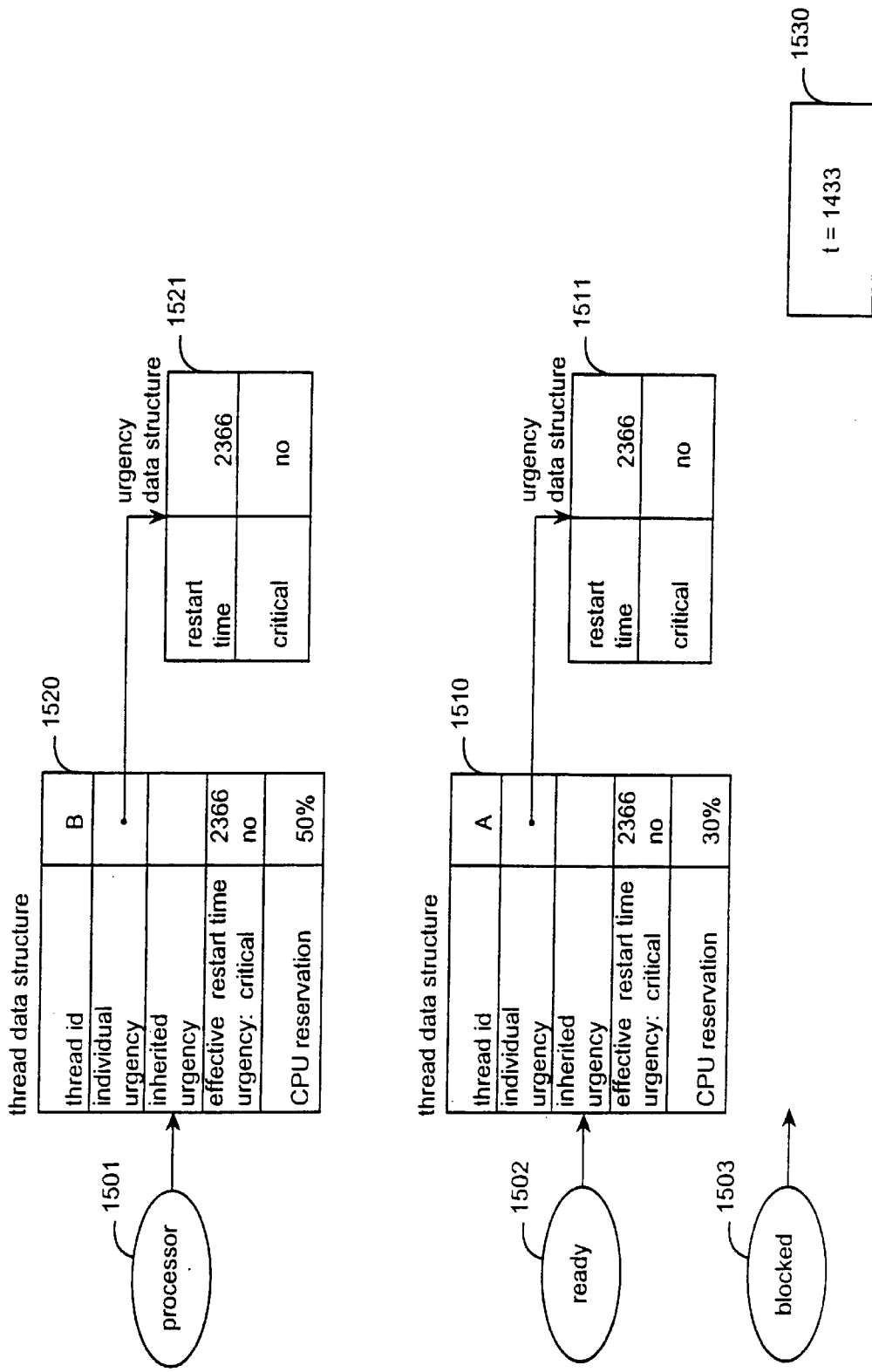

FIG. 15L is a data structure diagram showing the scheduling status data structure after the scheduler has moved thread B from the ready list to the processor list and thread A from the processor list to the ready list. FIG. 15M is a data structure diagram showing the scheduling status data structure after the scheduler has executed thread B for 167 μs to increase the restart time of thread B by 333 μs (167 μs/50%), from 2033 μs at t=1266 μs to 2366 μs at t=1433 μs.

When reviewing the performance of the facility during the scheduling example shown in FIGS. 15A–15M, FIG. 17 shows that, though thread B has a higher CPU reservation (50%) than thread A (30%), thread A received more processor time (400 μs) than thread B (100 μs) during the period during which thread A was subject to a time-specific scheduling constraint (t=0 to 500 μs). When thread A's time-specific scheduling constraint ended at t=500 μs, thread B quickly received exclusive use of the processor until its total processor time bore approximately the same relationship to thread A's total processor time (766 μs: 400 μs) borne by thread A's CPU reservation to thread B's CPU reservation (50%: 30%) at t=1166 μs. After this point, threads A and B continued to receive processor time at a rate approximately proportional to their respective CPU reservations. As such, the scheduler succeeded at both of the competing goals of (1) allocating the processor time necessary to a thread to meet a time-specific scheduling constraint, and (2) balancing overall processor time to threads in proportion to their CPU reservations.

Figure 18A:
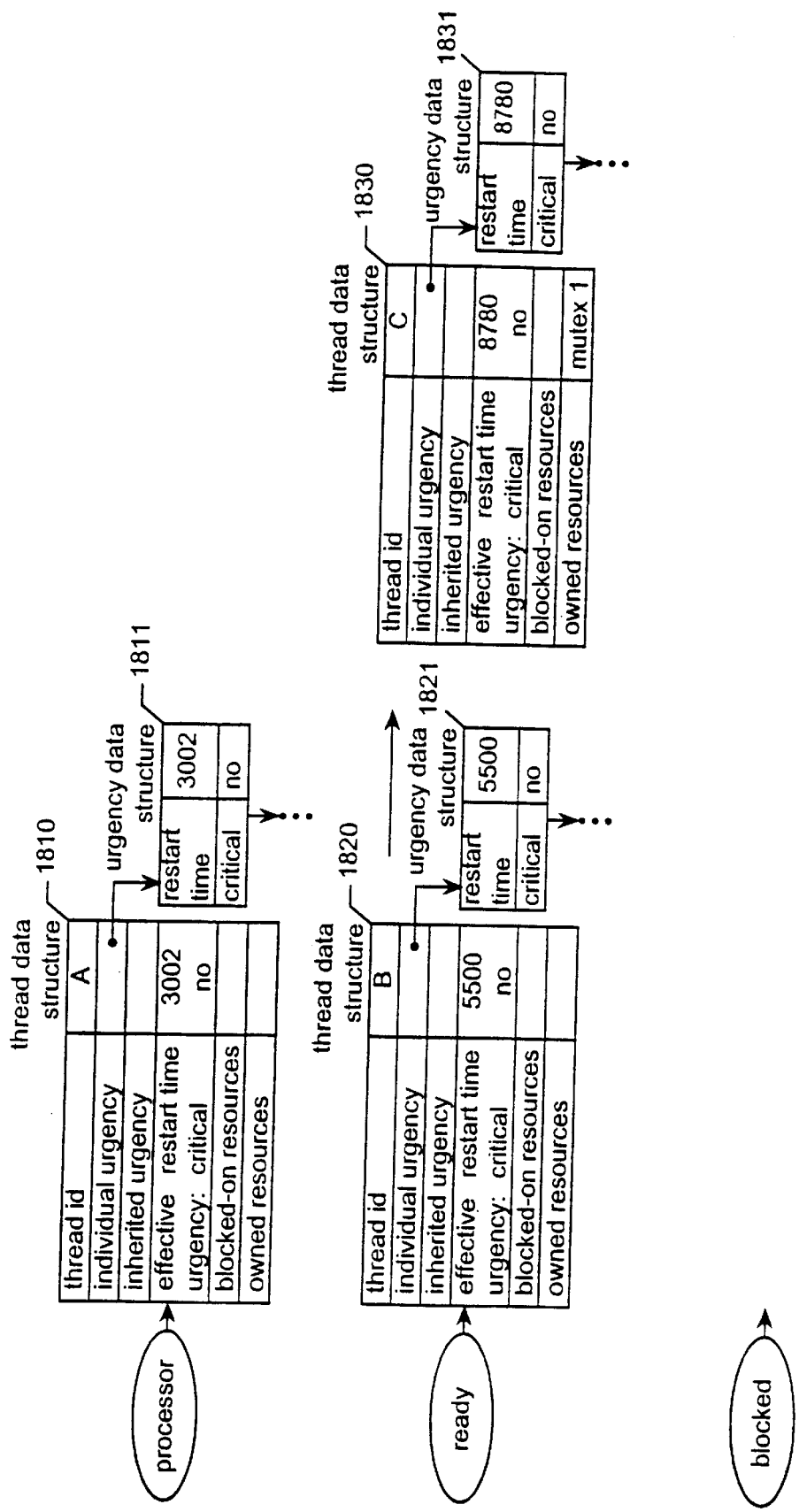
FIGS. 18A–18F are data structure diagrams showing the contents of the scheduling status data structure that illustrate the inheritance of urgency from a thread that blocks on a resource to the thread that owns the resource.
Figure 18B:
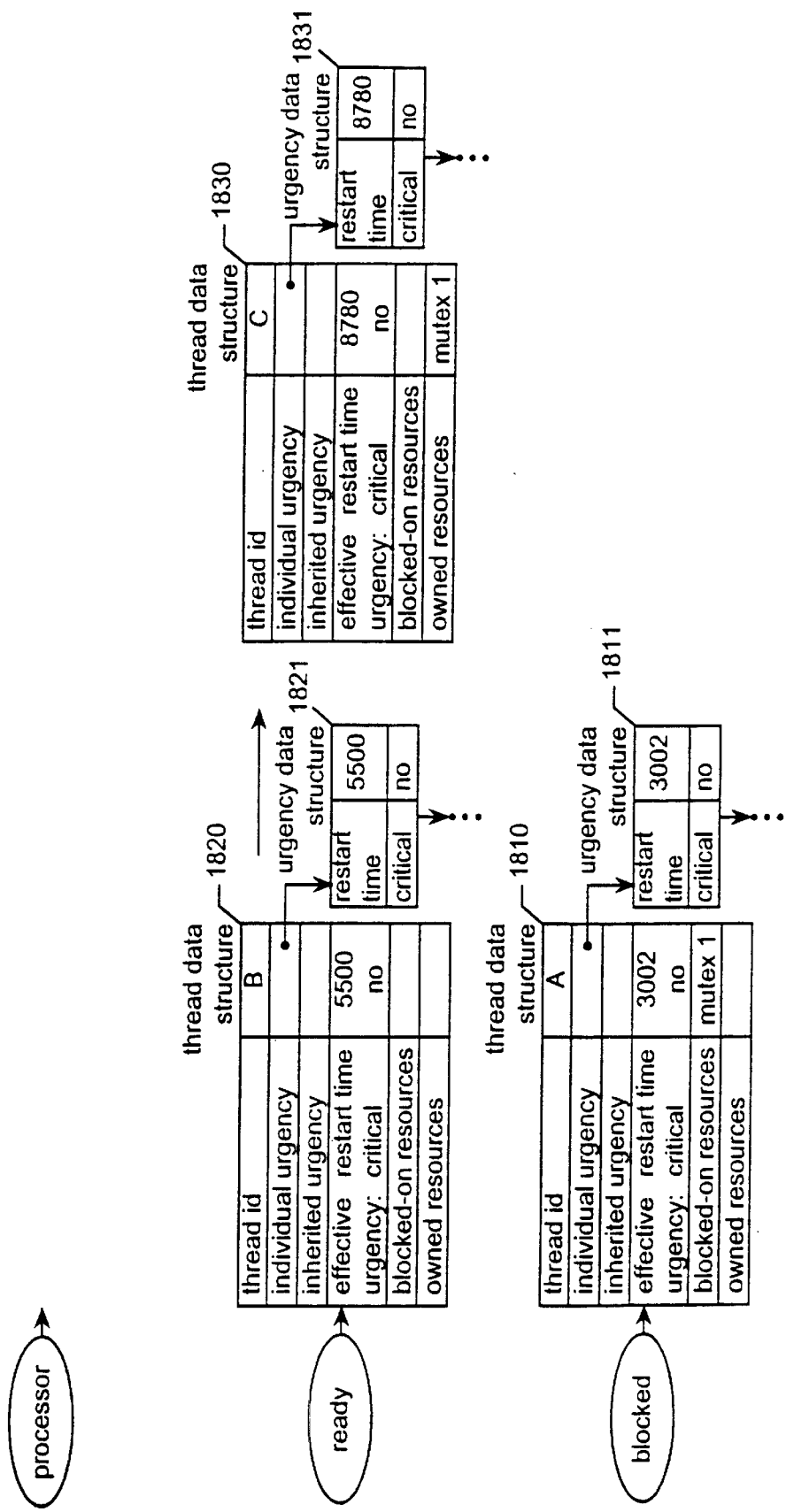
Figure 18C:
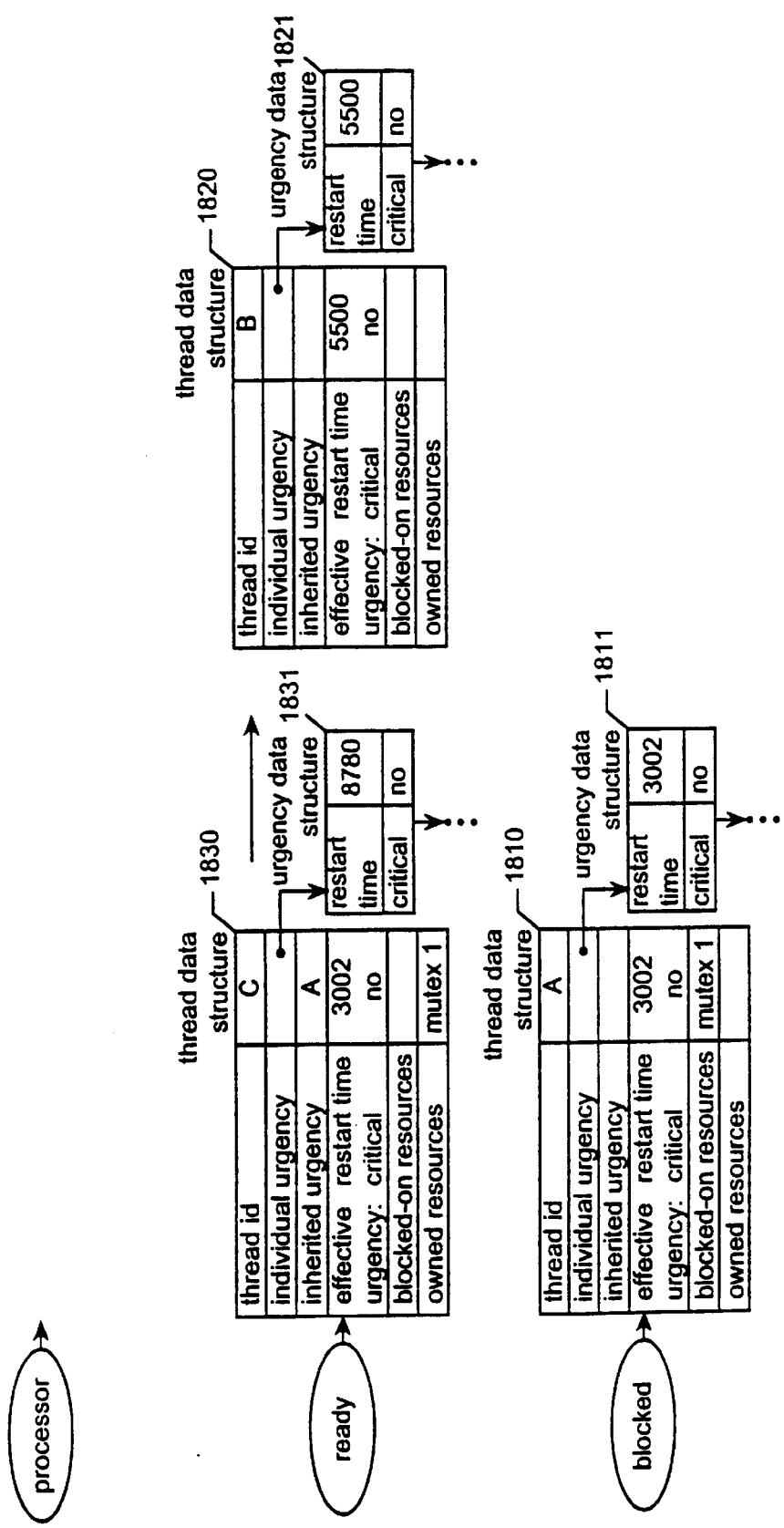
Figure 18D:
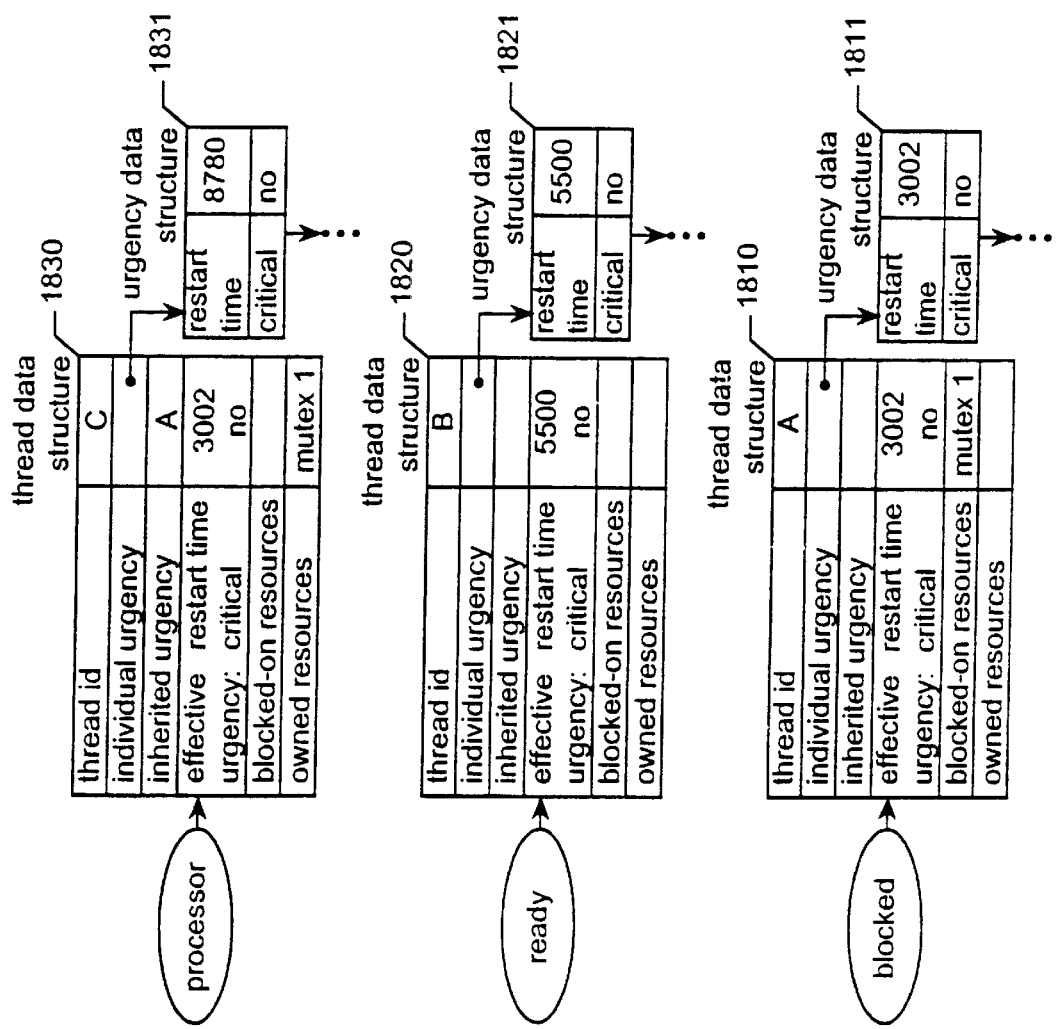
Figure 18E:
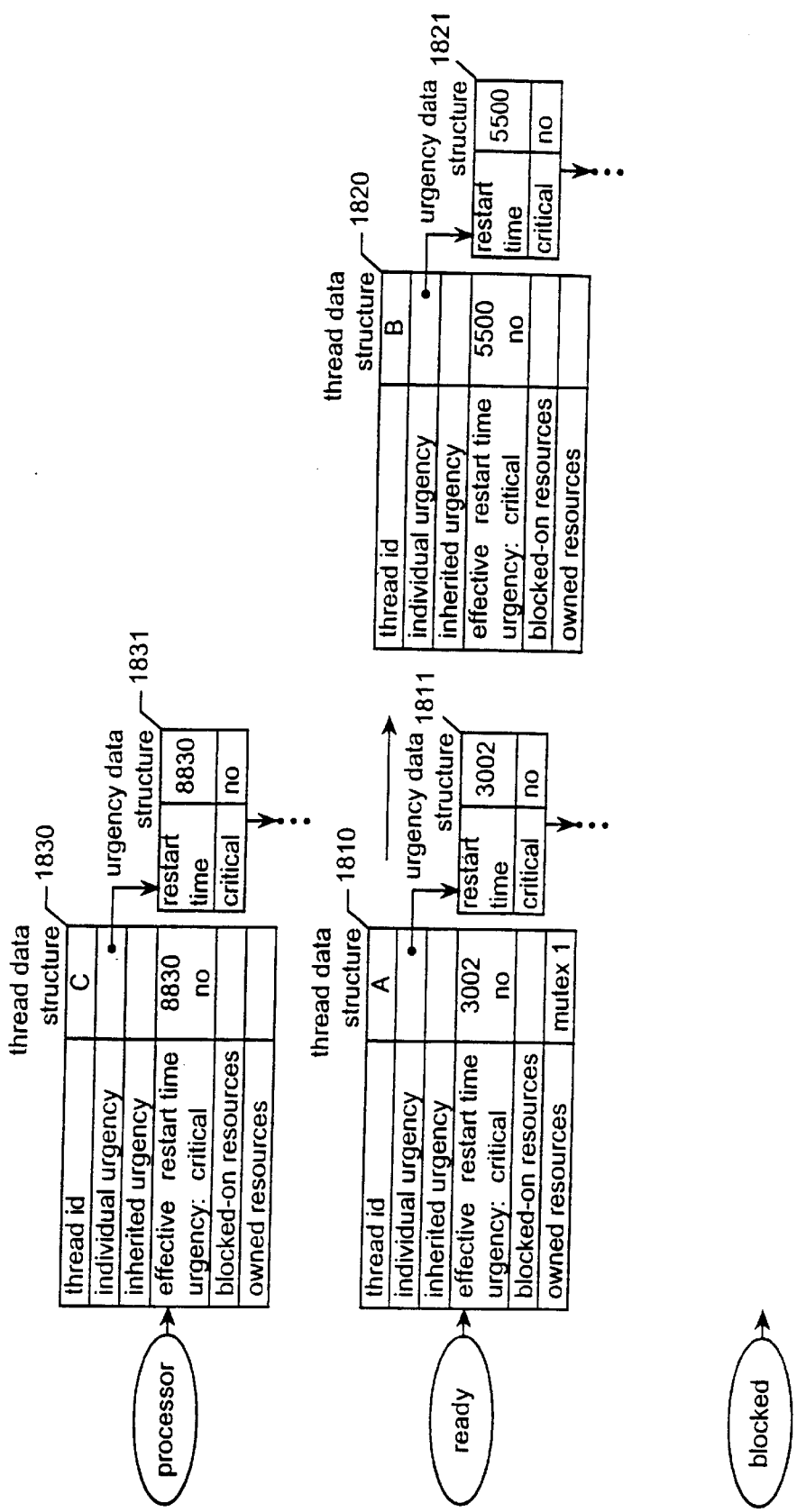
Figure 18F:
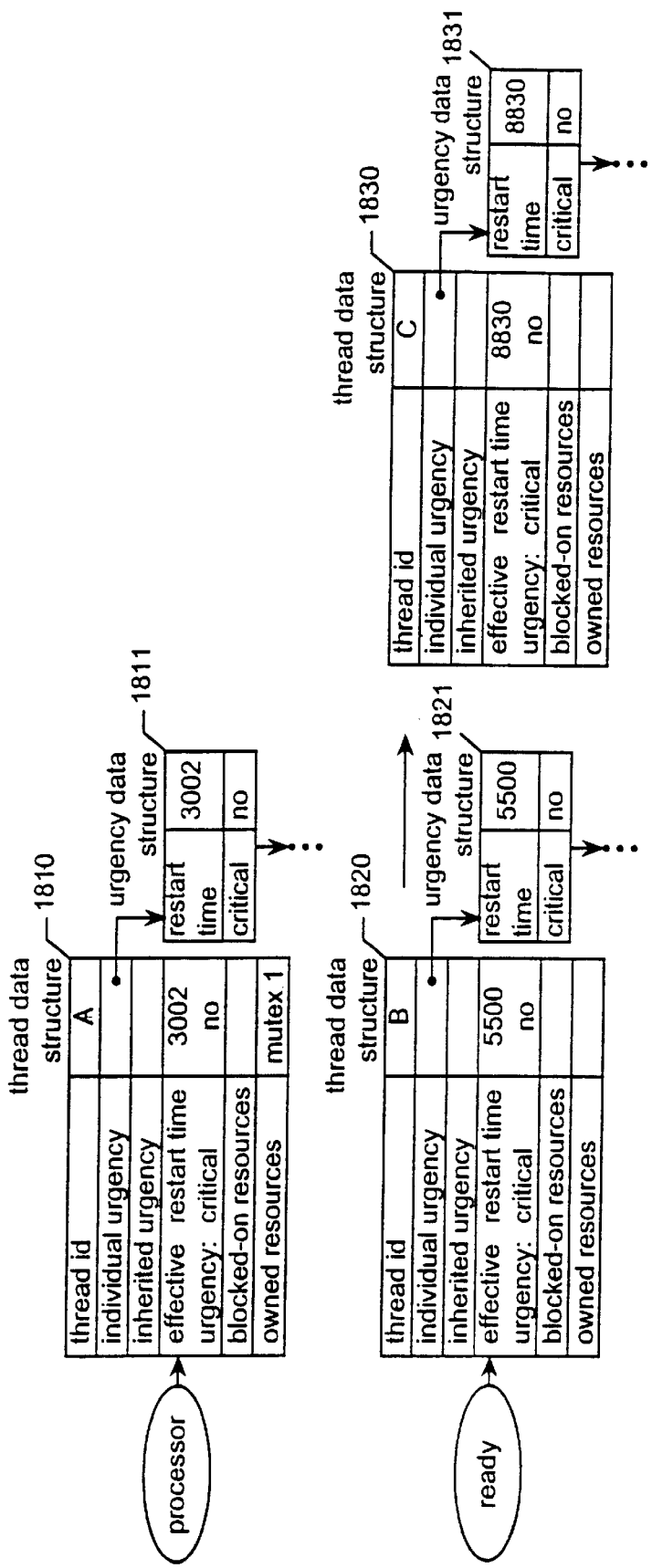
Figure 19:
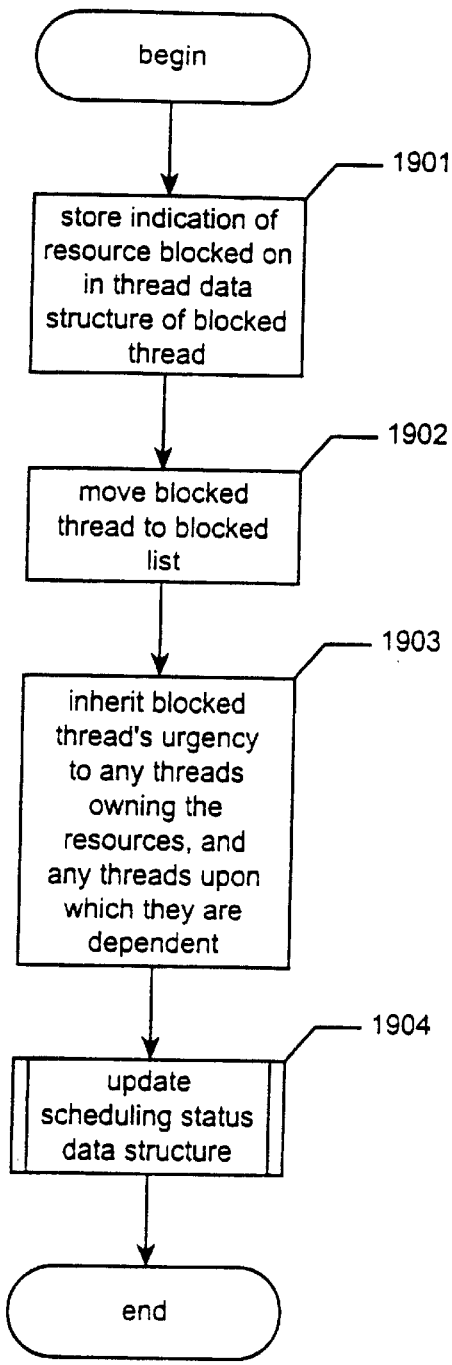
FIG. 19 is a flow diagram showing the steps preferably performed by the scheduler when an executing thread blocks on a resource.
Figure 20:
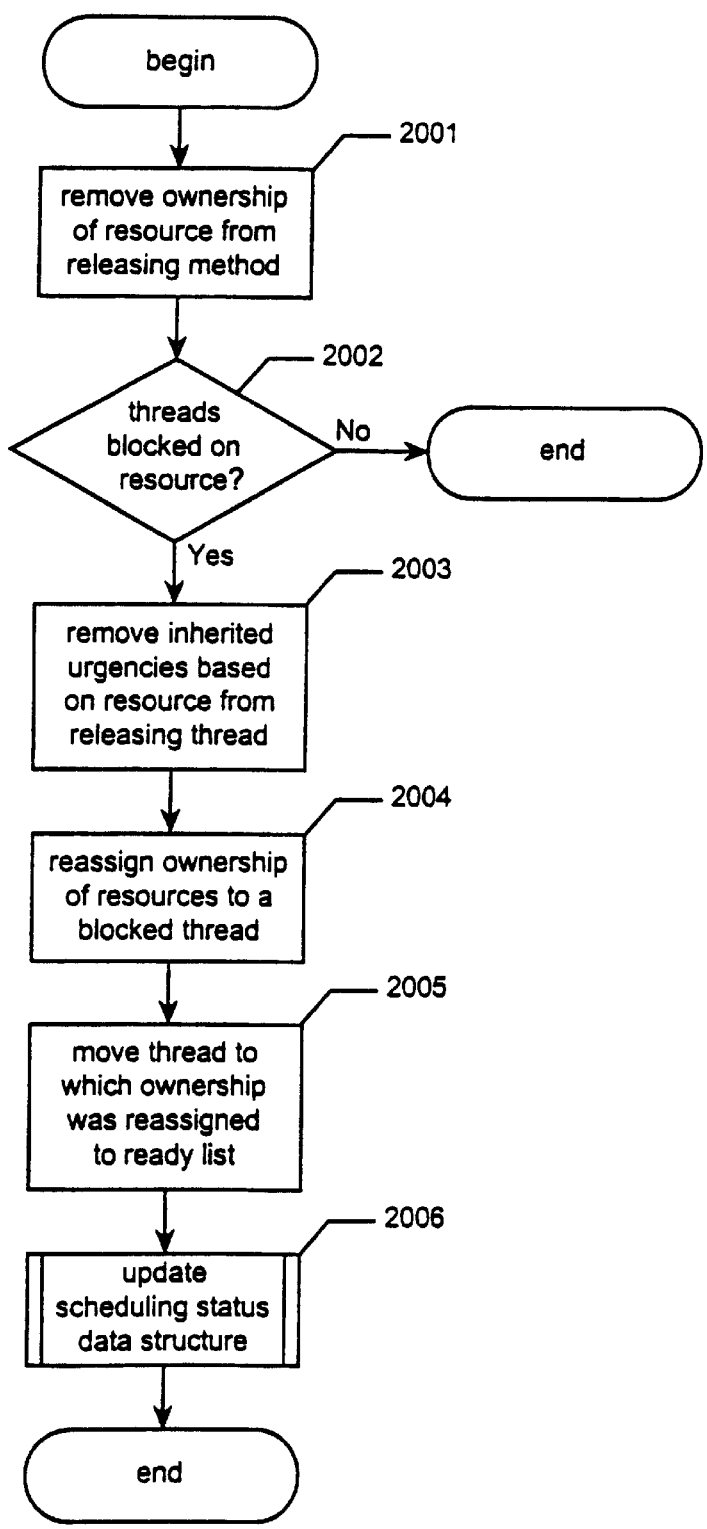
FIG. 20 is a flow diagram showing the steps preferably performed by the scheduler when an executing thread releases ownership of a resource.

FIGS. 18–20 illustrate inheriting the urgency from an urgent thread that has blocked on a resource. When a blocking thread blocks on a resource owned by an owning thread, the owning thread inherits the urgency of the blocked thread, and the processor time consumed by the owning thread while it owns the resource is charged against the owning thread. FIGS. 18A–18F are data structure diagrams showing the contents of the scheduling status data structure that illustrate the inheritance of urgency from a thread that blocks on a resource to the thread that owns the resource. While all of the threads shown in FIGS. 18A–18F are subject to time-specific scheduling constraints to facilitate this example, the approach employed by the scheduler is effective for any combination of threads subject to and not subject to time-specific scheduling constraints.

FIG. 18A is a data structure diagram showing the initial state of the scheduling status data structure. FIG. 18A shows the processor, ready, and blocked lists. In FIG. 18A, no threads are blocked, thread A has the earliest restart time and is therefore on the processor list, and thread C owns a mutual exclusion synchronization mechanism called "mutex 1" which only supports ownership by one thread at a time. Further, no thread has any inherited urgencies.

FIG. 18B is a data structure diagram showing the state of the scheduling status data structure after thread A has attempted to acquire mutex 1 and has blocked on it pending thread C's ownership of mutex 1. FIG. 18B shows that thread A has been moved to the blocked list.

FIG. 18C is a data structure diagram showing the state of the scheduling status data structure after the scheduler has inherited the urgency of a thread blocked on a resource to the thread that owns the resource. FIG. 18C shows that the scheduler has inherited thread A's urgency (restart time= 3002 μs, not critical) to thread C.

FIG. 18D is a data structure diagram showing the state of the scheduling status data structure after the scheduler has moved the thread with inherited urgency to the processor list to execute. FIG. 18D shows that the scheduler has moved thread C, which has the earliest effective restart time after inheriting thread A's urgency, to the processor list.

FIG. 18E is a data structure diagram showing the state of the scheduling status data structure after the thread with inherited urgency has released the resource. FIG. 18E shows that thread C has released mutex 1. In response, the scheduler has revoked thread C's inheritance of thread A's urgency. FIG. 18E further shows that the scheduler has increased the restart time in thread C's top urgency data structure 1831 to account for work done by thread C while it was inheriting the urgency of thread A.

FIG. 18F is a data structure diagram showing the state of the scheduling status data structure after the scheduler has removed the thread whose inherited urgency was revoked by the scheduler. FIG. 18F shows that the scheduler has replaced thread C, whose restart time is once again the latest, on the processor list with thread A, whose restart time is the earliest.

FIG. 19 is a flow diagram showing the steps preferably performed by the scheduler when an executing thread blocks on a resource. In step 1901, the scheduler stores an indication of the resource blocked on in the thread data structure of the blocked thread. In step 1902, the scheduler moves the blocked thread from the processor list to the blocked list. In step 1903, the scheduler inherits the top urgency data structure on the individual urgency stack of the blocked thread to any threads owning the resource blocked on, as well as any threads upon which the owning threads are dependent, either directly or indirectly. Step 1903 involves adding to the inherited urgency component of the thread data structures for the owning threads and any threads upon which the owning threads are dependent. Step 1903 further involves reevaluating the cached effective urgency for each such thread in light of this new inherited urgency. In step 1904, the scheduler performs the steps shown in FIG. 16 to update the scheduling status data structure. After step 1904, there are no more steps that the scheduler must perform for an executing thread blocked on a resource.

FIG. 20 is a flow diagram showing the steps preferably performed by the scheduler when an executing thread releases ownership of a resource. In step 2001, the scheduler removes ownership of the resource from the releasing thread by removing the indication stored in its thread data structure that it owns the resource. In step 2002, if one or more other threads are blocked on the resource, then the scheduler continues at step 2003, else the steps shown in FIG. 20 conclude. In step 2003, the scheduler removes from the releasing thread the urgencies that the thread has inherited based on its ownership of the resource. Step 2003 involves removing references to the effective urgency of this thread from the inherited urgency component of the thread data structures for any threads that have inherited the urgency of this thread as a result of this thread being blocked on the resource. Step 2003 filter involves reevaluating the cached effective urgency of such threads in light of the removed inherited urgency. In step 2004, the scheduler reassigns ownership of the resource to one of the threads that is blocked on it. The scheduler preferably employs conventional techniques for reassigning synchronization mechanisms in step 2004, but may also consider the relative urgencies of the blocked threads, as well as whether any of the blocked threads are also blocked on other resources. In step 2005, the scheduler moves the thread to which ownership was reassigned from the blocked list to the ready list. In step 2006, the scheduler performs the steps shown in FIG. 16 to update the scheduling status data structure. The steps shown in FIG. 20 then conclude.

Figure 21:
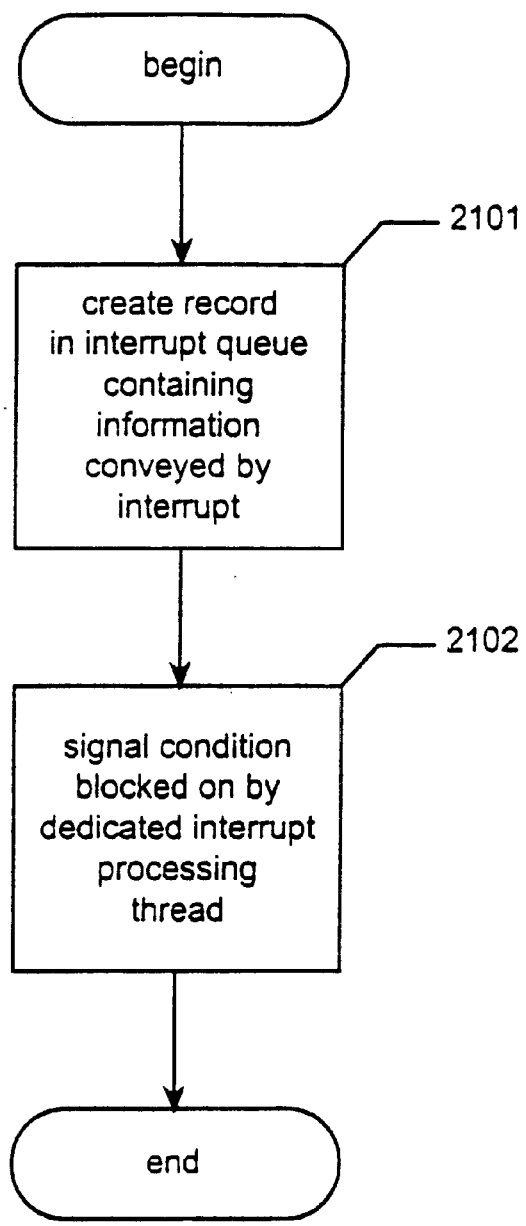
FIG. 21 is a flow diagram showing the steps preferably performed by an interrupt service routine adapted for use with the scheduler.
Figure 22:
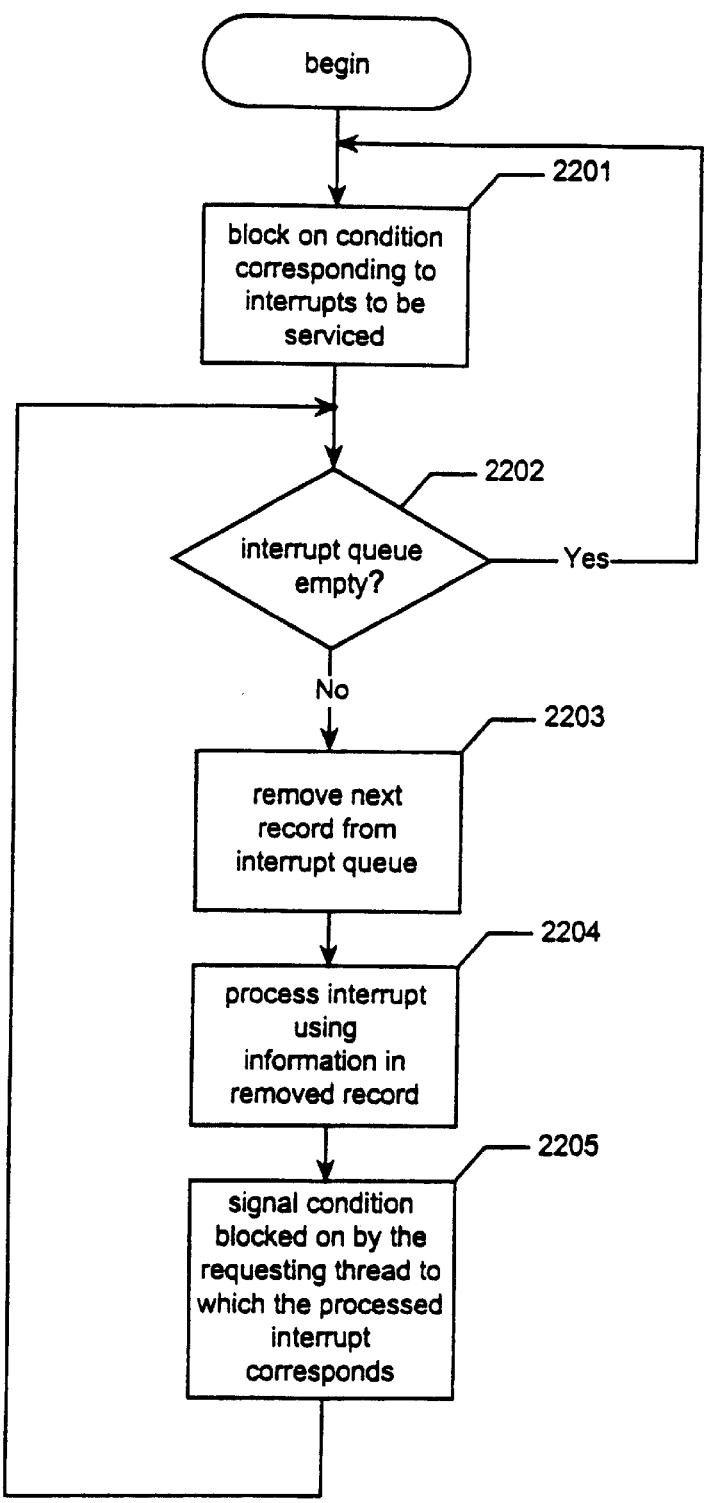
FIG. 22 is a flow diagram showing the steps preferably performed by a dedicated interrupt service thread.

FIGS. 21–22 illustrate scheduled interrupt handling. FIG. 21 is a flow diagram showing the steps preferably performed by an interrupt service routine adapted for use with the scheduler. These steps are preferably performed synchronously in response to the occurrence of a specific interrupt. The interrupt generally occurs subsequent to a request for input/output services made by a requesting thread. The requesting thread generally blocks on a condition after making the input/output request that is signaled when the input/output request is completed. In step 2101, the interrupt service routine creates a new record in a queue that contains one record for each occurrence of the interrupt not yet processed. The created record contains information conveyed by the interrupt needed to process the interrupt. The created record preferably also contains an indication of the condition blocked on by the requesting thread, which the dedicated interrupt processing thread can signal to return the requesting thread from the blocked list to the ready list when the dedicated interrupt processing thread finishes processing the interrupt. In step 2102, the scheduler signals a condition blocked on by a dedicated interrupt processing thread, discussed below in conjunction with FIG. 22. This allows the blocked dedicated interrupt processing thread to move from the blocked list to the ready list to process the occurrence of the interrupt in response to which the interrupt service routine was executed, as well as any other occurrences of the interrupt represented by other records in the queue. As is discussed in more detail below, some interrupts require little or no substantive processing, and do not require a dedicated interrupt processing thread.

FIG. 22 is a flow diagram showing the steps preferably performed by a dedicated interrupt service thread. These steps are preferably performed continuously. In step 2201, the dedicated interrupt service thread blocks on a condition signaled by the interrupt service routine for the interrupts to be processed.

In step 2202, when this condition is signaled by the interrupt processing routine in step 2202, if the interrupt queue is empty, then the dedicated interrupt service thread continues at step 2201 to again block on the condition, else the dedicated interrupt service thread continues at step 2203. In step 2203, the dedicated interrupt service thread removes a record from the interrupt queue. In step 2204, the dedicated interrupt service thread processes the interrupt corresponding to the removed record using the contents of the removed record. In step 2205, the dedicated interrupt service thread signals the condition blocked on by the requesting thread to which the interrupt processed in step 2204 corresponds. Signaling the condition enables the requesting thread to move from the blocked list to the ready list and become eligible to resume execution. After step 2205, the dedicated interrupt service thread continues at step 2202.

As is noted above in conjunction with FIG. 21, a dedicated interrupt service routine such as the one shown in FIG. 22 is only necessary for interrupts whose handling requires a significant amount of processing. For interrupts whose handling does not require a significant amount of processing, no dedicated interrupt service routine is necessary, and the thread waiting for interrupt handling to complete can block on the condition signaled by the interrupt service routine instead of a condition signaled by a dedicated interrupt service thread.

Figure 23:
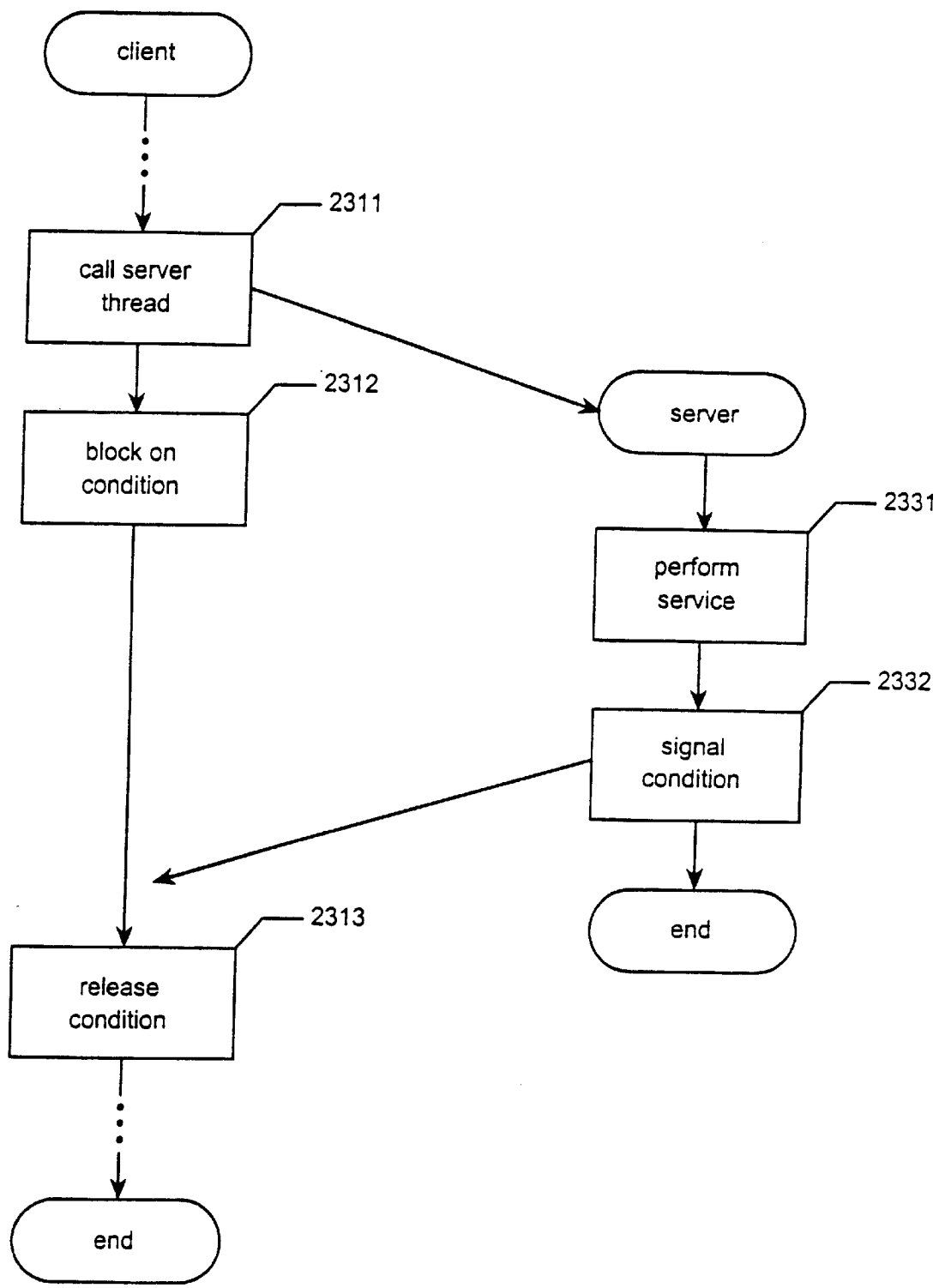
FIG. 23 is a flow diagram showing the steps preferably performed by the scheduler in the server and client threads.
Figure 24:
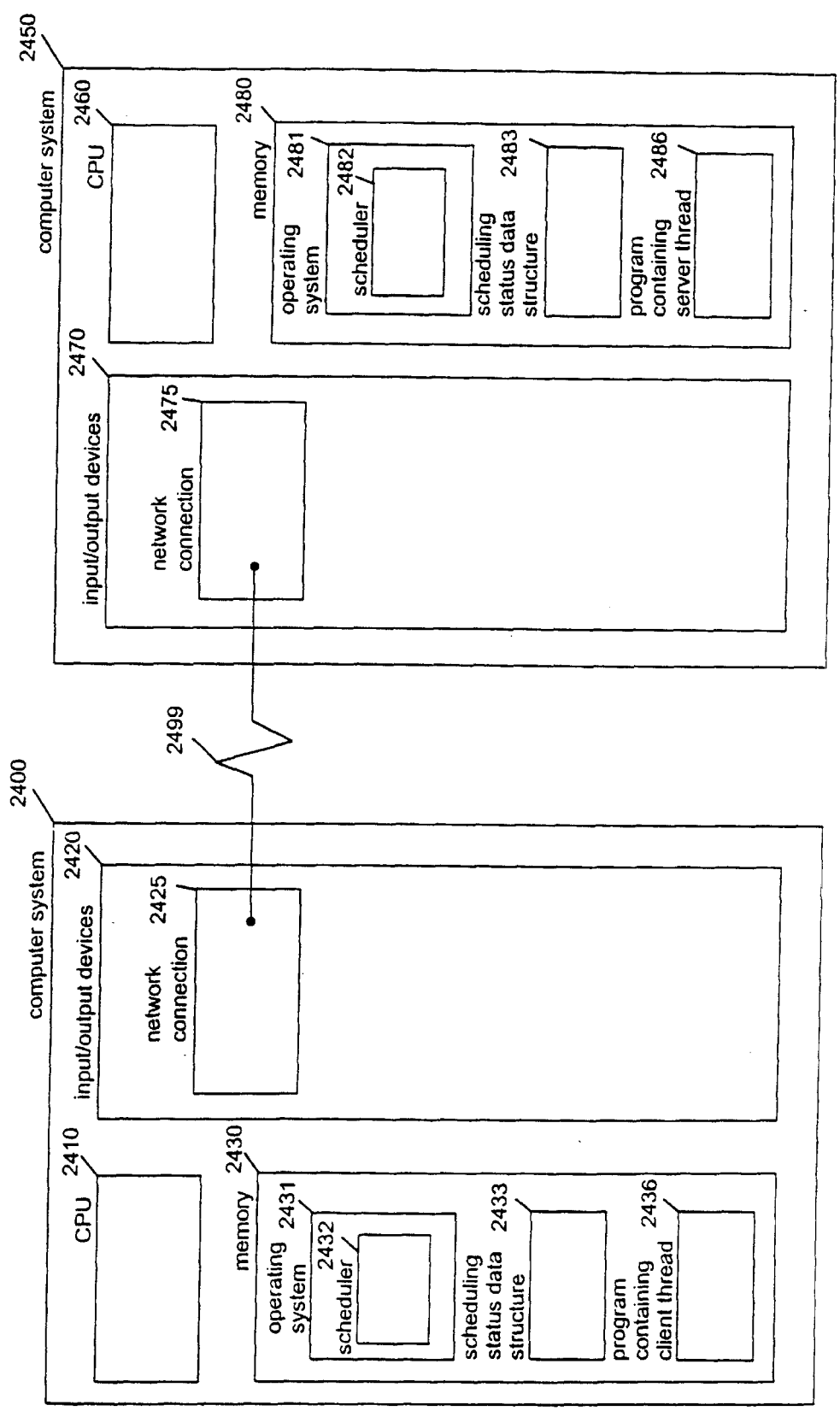
FIG. 24 is a high-level block diagram showing a computer network in which the scheduler preferably performs scheduling across two individual computer systems.
Figure 25:
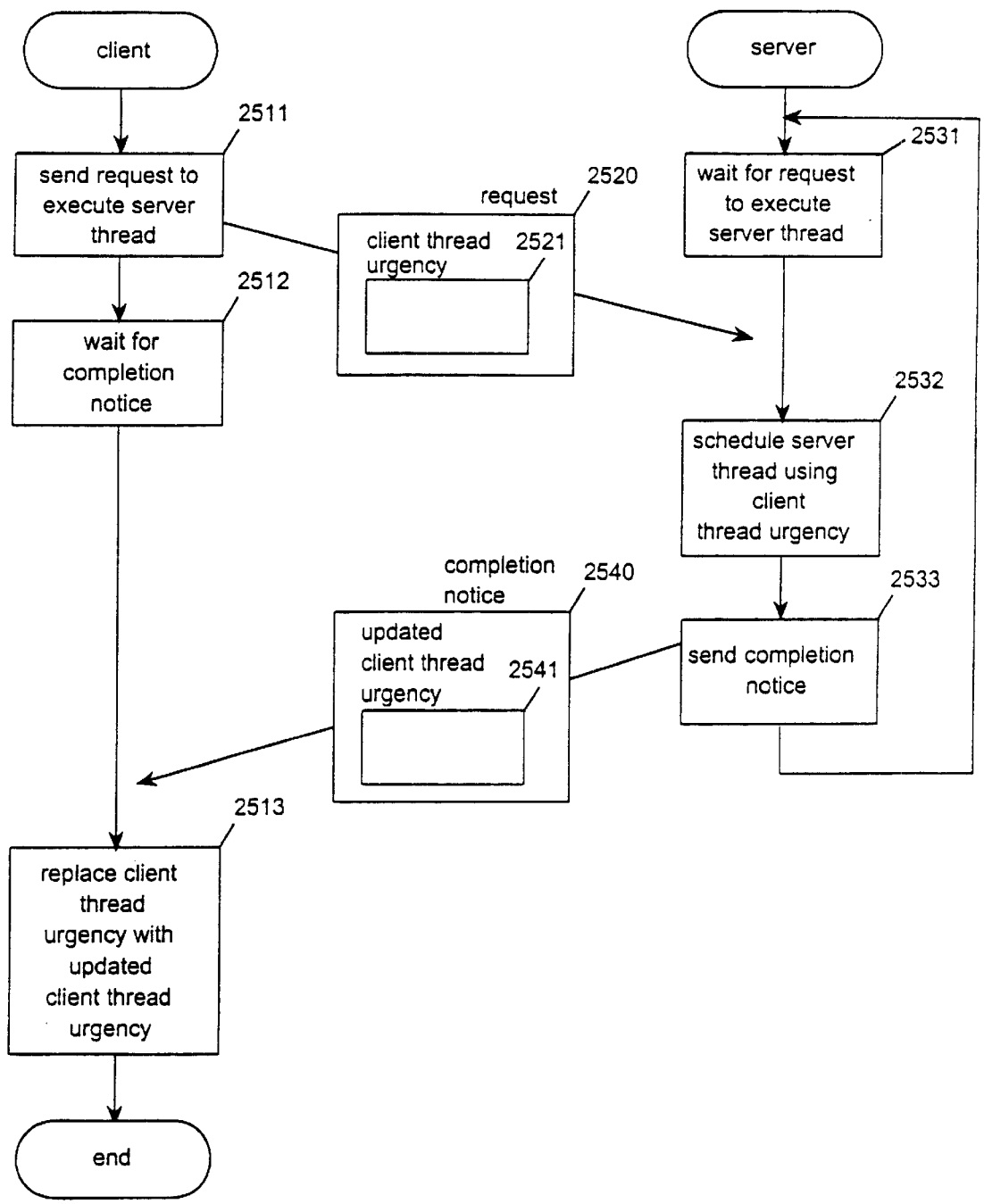
FIG. 25 is a flow diagram showing the steps preferably performed by the scheduler in the server and client threads on separate computer systems.

FIGS. 23–25 illustrate inheriting urgency from a client thread to a server thread executing on its behalf. When a server thread performs a service on behalf of a client thread, the server thread inherits the urgency of the client thread, and the processor time consumed by the server thread in performing the service is charged against the client thread. FIG. 23 is a flow diagram showing the steps preferably performed by the server and client threads. The diagram shows steps 2311–2313 performed by the client thread and steps 2331–2332 performed by the server thread. After performing zero or more preceding steps (not shown), the client thread continues at step 2311. In step 2311, the client thread calls the server thread, which is preferably created in response to the call. In step 2312, the client thread blocks on a condition that will be signaled by the server thread when the call of step 2311 is completed. In step 2331, the server thread performs the service requested by calling the server thread. In step 2332, the server thread signals the condition blocked on by the client thread in step 2312. The server thread then concludes. In step 2313, the client thread releases the condition it blocked on, if necessary. The client thread then performs zero or more succeeding steps (not shown).

The scheduler also preferably enables a server thread on a server computer system to inherit the urgency of a client thread on a separate client computer system. FIG. 24 is a high-level block diagram showing a computer network in which the scheduler preferably performs scheduling across two individual computer systems. The computer network 2499 connects two computer systems 2400 and 2450, both substantially similar to computer system 1000 shown in FIG. 10, via network connections 2425 and 2475. The memory 2430 of computer system 2400 preferably contains an operating system 2431, which itself contains a copy of the scheduler 2432, as well as a thread status data structure 2433. Similarly, the memory 2480 of computer system 2450 preferably contains an operating system 2481, which itself contains a copy of the scheduler 2482, as well as a thread status data structure 2483. The memory 2430 of computer system 2400 preferably further contains a program 2436 containing the client thread, while the memory 2480 of computer system 2450 preferably further contains a program 2486 containing the server thread. Given this arrangement of the program 2436 containing the client thread and the program 2486 containing the server thread, computer system 2400 is called the client computer system and computer system 2450 the server computer system. Each computer system, however, is preferably capable of serving as either the client computer system or the server computer system.

FIG. 25 is a flow diagram showing the steps preferably performed by the scheduler in the server and client threads on separate computer systems. In step 2531, the server thread, executing in the server computer system, waits for a request to execute. In step 2511, the client thread, executing in the client computer system, sends a request to execute the server thread 2520 to the server computer system. The request 2520 contains the top urgency data structure of the client thread 2521, provided by the scheduler of the client computer system. In step 2532, when the request is received in the server computer system, the server thread pushes the received client thread urgency data structure onto its own individual urgency stack, so as to inherit the urgency of the client thread. If the urgency of the client thread subsequently changes, the scheduler for the client computer system preferably sends an additional message to the scheduler for the server computer system containing the updated urgency. In response, the scheduler for the server computer system inherits the updated urgency to the server thread (not shown). When the server thread completes the request, in step 2533, it pops the client thread's urgency data structure, updated to reflect the work done by the server thread on the client thread's behalf, off of its individual urgency stack and sends it in a completion notice 2540 to the client computer system. After step 2533, the server thread continues at step 2531 to wait for the next request to execute the server thread. The completion notice 2540 sent in step 2533 contains the top urgency data structure of the client thread 2541 updated to reflect the work done by the server thread on the client's behalf. In step 2513, when the completion notice is received in the client computer system, the client thread replaces its top urgency data structure with updated urgency data structure 2541, thereby charging itself for the work done on its behalf by the server thread. The steps shown in FIG. 25 then conclude.

While the present invention has been described with reference to a preferred embodiment thereof, those skilled in the art will appreciate that various changes in form and detail may be made without departing from the intended scope of the present invention as defined in the appended claims. For example, the present invention need not be practiced in an object-oriented environment In addition, substantially more sophisticated resource management policies can be implemented, such as policies that do not rely on a strict importance ordering among activities. Further, the scheduler may be readily adapted to schedule the use of other resources, such as hardware devices. The scheduler could also use various other indications of urgency besides the combination of restart times and criticality.

We claim:

1. A computer system comprising:

resources;

at least one real-time program that requires the use of at least one of the resources;

at least one non-real-time program that requires the use of at least one of the resources;

a resource planner module that issues reservations to the at least one real-time program to use shares of at least some of the resources in response to requests submitted by the at least one real-time program; and a scheduler module for scheduling the use of resources by the at least one non-real-time program and the at least one real-time program according to the reservations issued by the resource planner module.

2. The computer system of claim 1 wherein the resource planner module comprises:

a policy module for implementing a policy for arbitrating among requests to reserve resources; and an independent planning engine that is separate from the policy module but that implements the policy of the policy module in issuing reservations to the at least one real-time program to use shares of at least some of the resources.

3. The computer system of claim 1, further including a non-real-time resource reservation subsystem that issues reservations to the at least one non-real-time program to use predetermined shares of at least some of the resources without receiving requests from the at least one non-real-time program, and wherein the scheduler module further schedules the use of resources by the at least one non-real-time program and the at least one real-time program according to the reservations issued by the non-real-time resource reservation subsystem.

4. The computer system of claim 3 wherein the non-real-time resource reservation subsystem is part of the scheduler module.

5. The computer system of claim 1 wherein each resource has a maximum capacity, and wherein at least one of the resources has unreserved capacity corresponding to the difference between the maximum capacity of the resource and the sum of the shares of the resource reserved by the resource planner module, and wherein the scheduler module further schedules any unreserved capacity of each resource without regard for the reservations issued by the resource planner module.

6. The computer system of claim 1 wherein portions of the resources whose use is scheduled by the scheduler module may be either used or unused by the at least one non-real-time program or by the at least one real-time program for whose use the resources are scheduled by the scheduler module, and wherein the scheduler module further reschedules the use of any unused portions of the resources without regard for the reservations issued by the resource planner module.

7. The computer system of claim 2 wherein the resource planner module further comprises a different policy module for implementing a different policy for arbitrating among requests to reserve resources and wherein the independent planning engine implements the different policy of the different policy module.

8. The computer system of claim 2 wherein the resource planner module is an object and the policy module is an interface supported by the resource planner module.

9. A computer system for running real-time applications programs, the computer system comprising:

one or more resources;

an application programming interface usable by real-time applications programs to request use of resources subject to time constraints;

a resource planner for allocating resources in response to requests to use resources received by the application programming interface from real-time applications programs; and a scheduler for scheduling the use of resources requested by the real-time applications programs and allocated by the resource planner.

10. A method for developing a real-time application program for performing a processing objective in a real-time manner, the method comprising the steps of:

preparing a substantive portion of the real-time application program for performing the processing objective, the substantive portion specifying the use of a computer system resource; and adding to the substantive portion of the real-time application program calls to a real-time application programming interface for reserving and scheduling the use of at least a portion of the computer system resource, such that the added calls enable the real-time application program to perform its processing objective in a real-time manner.

11. The method of claim 10 wherein the calls to the real-time application programming interface added in the adding step pass in a resource set identifying amounts of each of a group of resources including the computer system resource specified by the substantive portion to be used by the real-time application program.

12. The method of claim 11 wherein the calls to the real-time application programming interface added in the adding step, when they are unsuccessful, receive from the real-time application programming interface a resource set identifying amounts of each of a group of resources including the computer system resource specified by the substantive portion available for use by the real-time application program.

13. A computer-readable medium containing data causing a computer system to perform a processing objective in a real-time manner by performing the steps of:

executing steps for performing the processing objective, the executed steps specifying the use of a resource of the computer system; and calling a real-time application programming interface to reserve and schedule the use of at least a portion of the resource, such that the processing objective is performed in a real-time manner.

14. A computer memory containing a resource management data structure for use in managing the use of resources by real-time programs and non-real-time programs, the data structure comprising:

information defining a resource planning state useable for issuing reservations to the real-time programs to use shares of at least some of the resources in response to requests submitted by the real-time programs; and information defining a scheduling state useable for scheduling the use of resources by the non-real-time programs and the real-time programs in accordance with issued reservations.

15. The computer memory of claim 14 wherein the data structure further comprises:

policy information useful to arbitrate among conflicting requests to reserve resources.

* * * * *

UNITED STATES PATENT AND TRADEMARK OFFICE
CERTIFICATE OF CORRECTION

PATENT NO. : 6,584,489 B1
DATED : June 24, 2003
INVENTOR(S) : Jones et al.

It is certified that error appears in the above-identified patent and that said Letters Patent is hereby corrected as shown below:

Column 1,
Line 17, "Time-In Specific" should read -- Time-Specific --.

Column 3,
Line 54, "want" should read -- warrant --.

Column 7,
Line 26, "are a " should read -- area --.

Column 8,
Line 49: "PO" should read -- I/O --.

Column 9,
Line 21, "so" should read -- 50 --.
Line 22, "50" should read -- 60 --.

Column 10,
Line 15, "IResource set" should read -- IResourceSet --.
Line 17, "IResource Set" should read -- IResourceSet --.
Line 35, "IReturns =b 0.0as" should read -- Returns 0.0 as --.

Column 11,
Line 65, "Total Amount" should read -- TotalAmount --.

Column 12,
Line 30, "...Amount)" should read -- ...Amount); --.

Column 13,
Line 23, A line containing "// " should be inserted.

Column 16,
Line 27, "Initially" should not begin a new paragraph.

Column 17,
Line 29, "the in parameter," should read -- the input parameter, --.
Line 42, "Reserved" should read -- Reserve() --.

UNITED STATES PATENT AND TRADEMARK OFFICE
CERTIFICATE OF CORRECTION

PATENT NO. : 6,584,489 B1
DATED : June 24, 2003
INVENTOR(S) : Jones et al.

It is certified that error appears in the above-identified patent and that said Letters Patent is hereby corrected as shown below:

Column 18,
Line 47, "and each constraint in a identify" should read -- each constraint identifying --.

Column 19,
Lines 18 and 47, "The" should not begin a new paragraph.

Column 22,
Line 48, "a thread" should be deleted.

Column 24,
Line 64, "2036" should read -- 2033 --.

Column 27,
Line 33, "In" should not begin a new paragraph.

Signed and Sealed this

Twenty-second Day of June, 2004

JON W. DUDAS
*Acting Director of the United States Patent and Trademark Office*